US006816069B2

(12) United States Patent
Quigley

(10) Patent No.: US 6,816,069 B2
(45) Date of Patent: Nov. 9, 2004

(54) COMMAND CONSOLE FOR HOME MONITORING SYSTEM

(76) Inventor: Mark P. Quigley, 3S440 Herrick Rd., Warrenville, IL (US) 60555

( * ) Notice: Subject to any disclaimer, the term of this patent is extended or adjusted under 35 U.S.C. 154(b) by 24 days.

(21) Appl. No.: 10/298,233

(22) Filed: Nov. 15, 2002

(65) Prior Publication Data

US 2003/0128114 A1 Jul. 10, 2003

Related U.S. Application Data

(62) Division of application No. 09/255,421, filed on Feb. 22, 1999, now abandoned.

(51) Int. Cl.[7] .............................................. G08B 19/00
(52) U.S. Cl. .................. 340/521; 340/506; 340/539.41; 340/539.12; 340/309.16; 340/309.7
(58) Field of Search .............................. 340/506, 539.1, 340/539.11, 539.12, 309.16, 309.7; 700/244; 211/2, 9, 15

(56) References Cited

U.S. PATENT DOCUMENTS 4,682,299 A * 7/1987 McIntosh et al. ........... 702/177
5,400,246 A    3/1995 Wilson et al. .............. 364/146
5,408,443 A * 4/1995 Weinberger ................. 368/10
5,657,236 A * 8/1997 Conkright ................... 700/244

* cited by examiner

Primary Examiner—Daryl Pope
(74) Attorney, Agent, or Firm—McDonnell Boehnen Hulbert & Berghoff

(57) ABSTRACT

A method and apparatus for a home monitoring system is provided. The home monitoring system may include a command console for monitoring and processing the output of sensors. The processing of the sensors includes (1) providing a history of the sensor as an indicator to the operator of the sensor output over time; (2) analyzing the trends of the sensor to increase the effectiveness of the sensor beyond simply the current sensor output; and (3) analyzing the output of one sensor which may impact interpretation of a second sensor's output. The monitoring system may also be a prescription reminder system. The prescription reminder system may be used in homes or institutional medical facilities (assisted living or nursing homes) to provide patients with a manner to remind them to take pharmaceutical drugs at prescribed times.

19 Claims, 44 Drawing Sheets

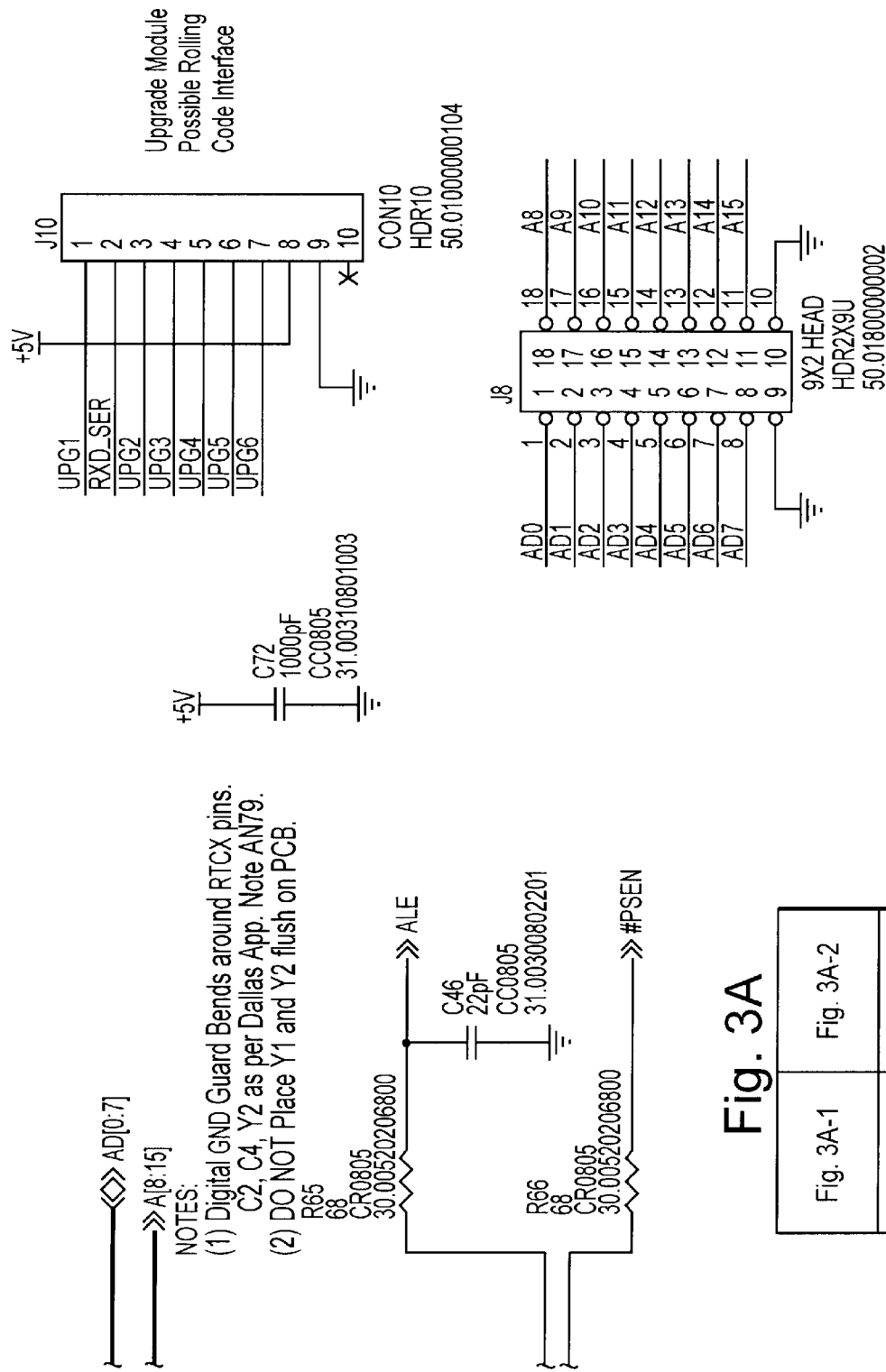

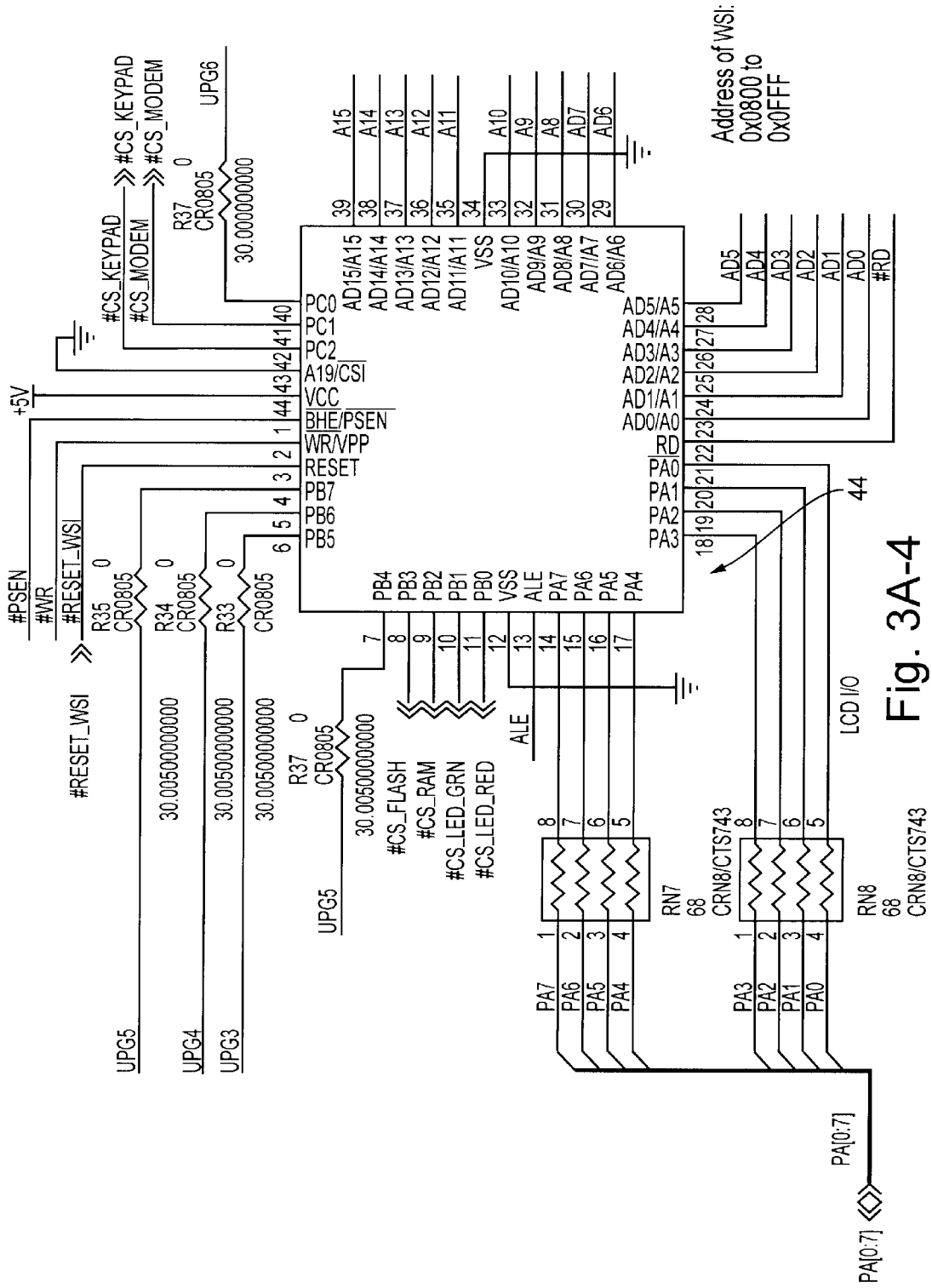

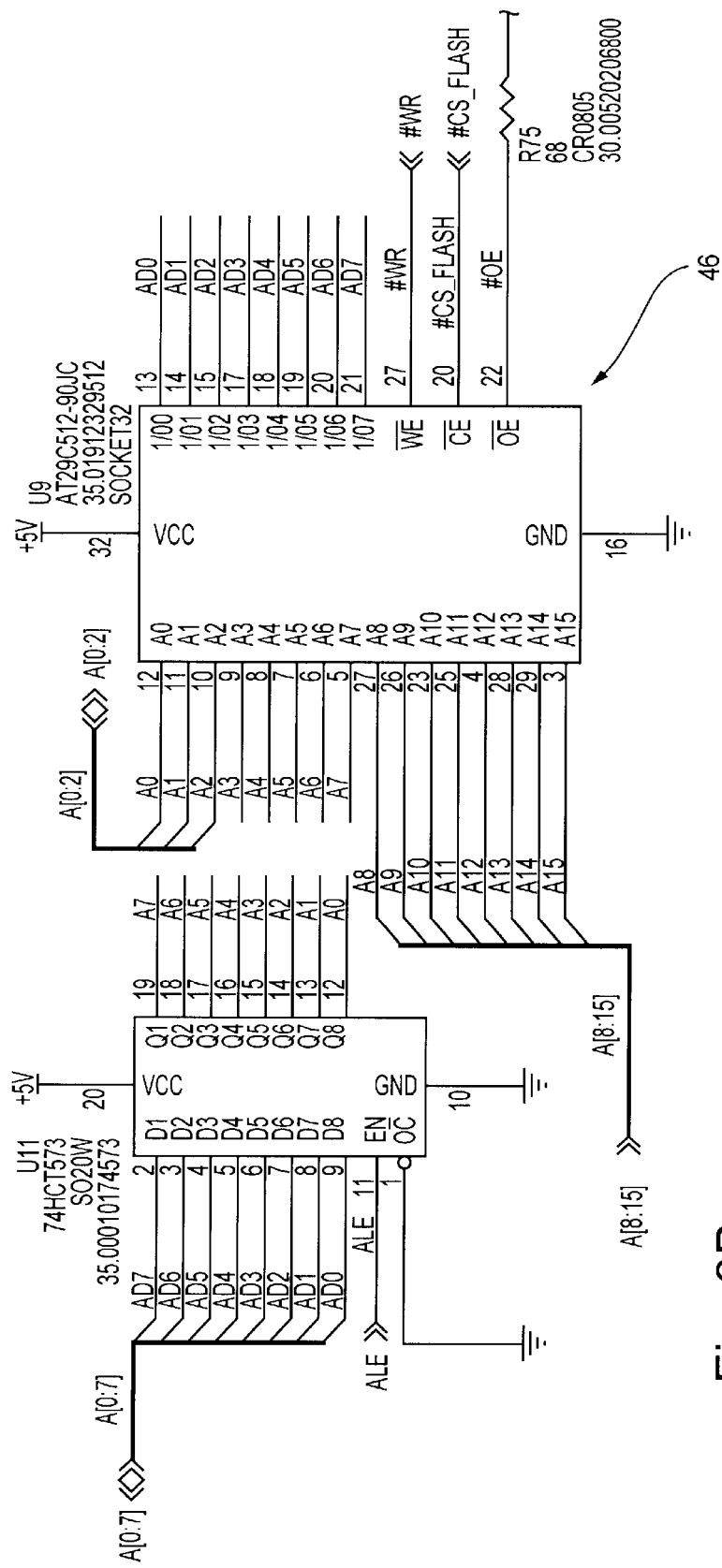

Fig. 3B-2

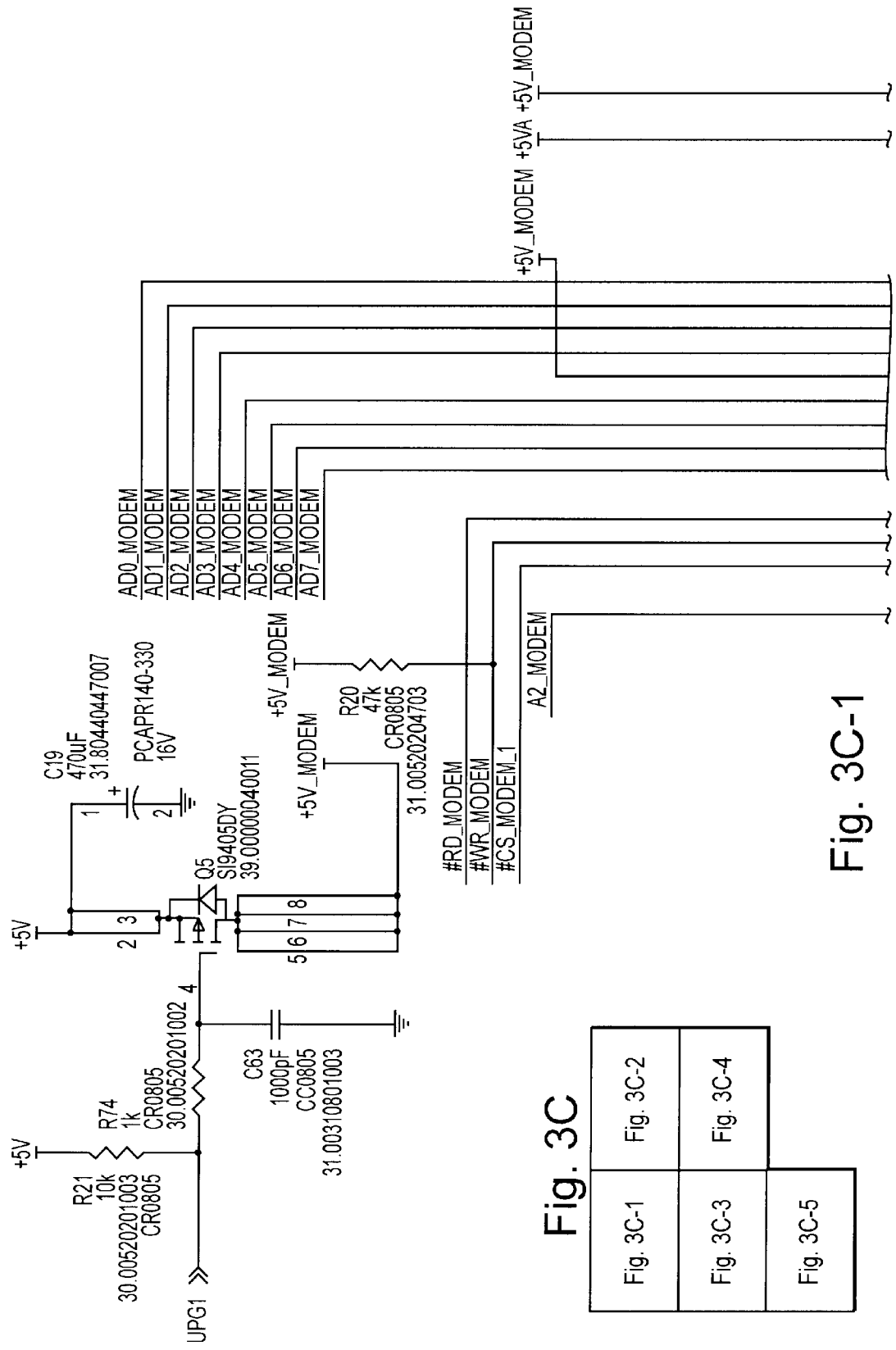

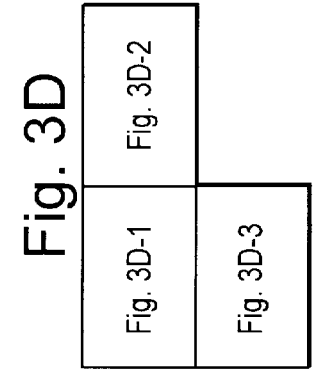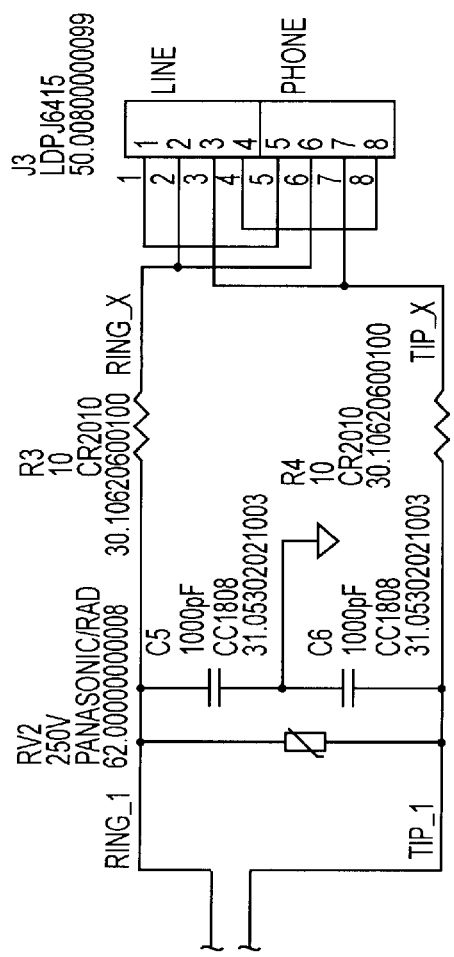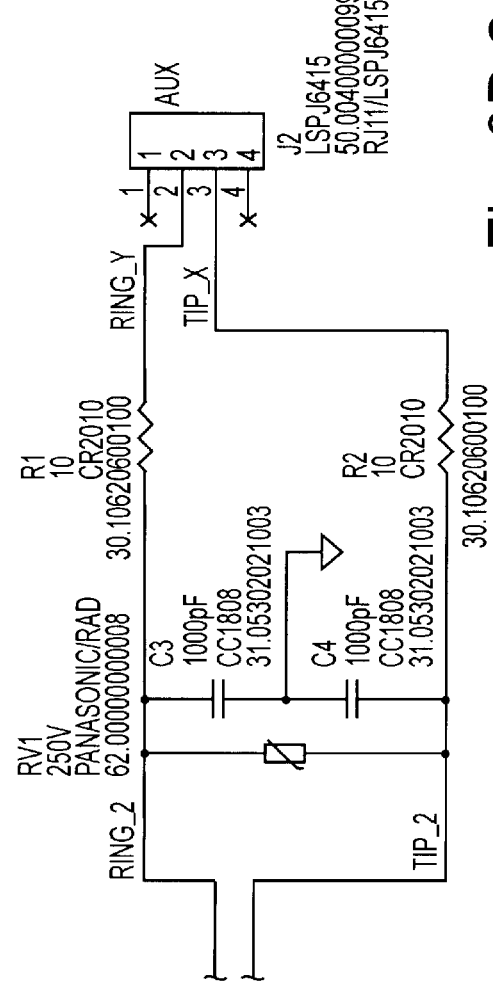

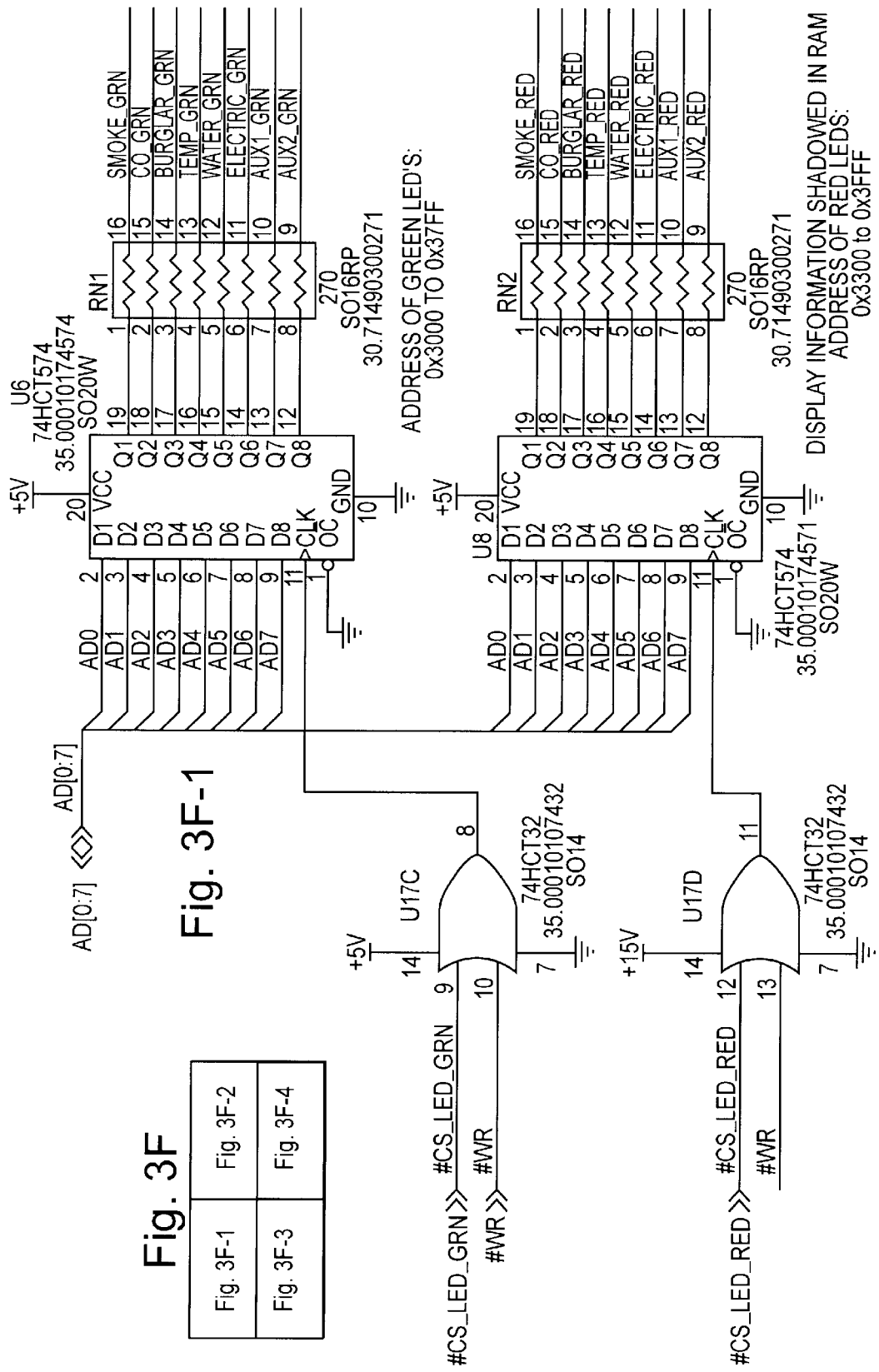

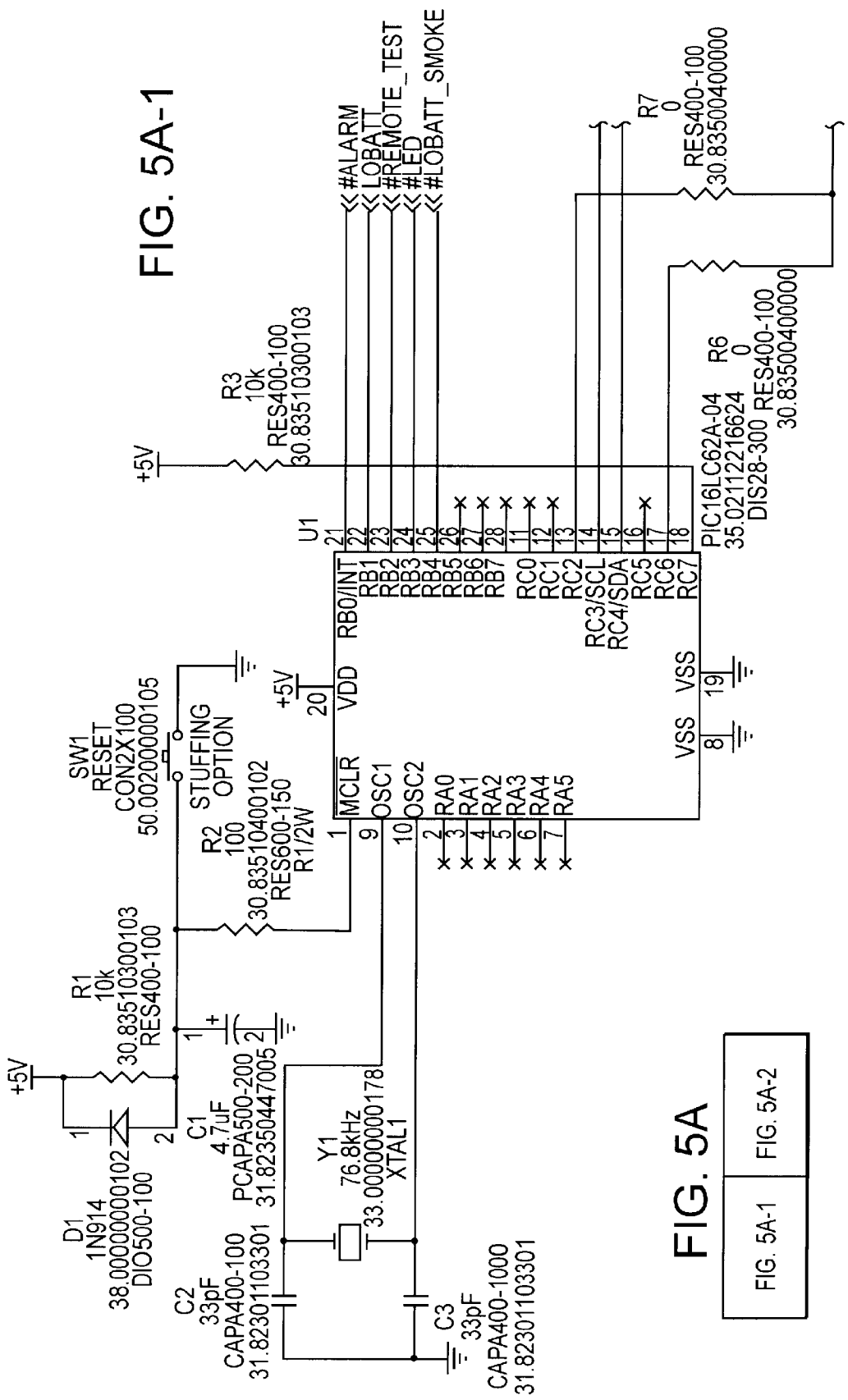

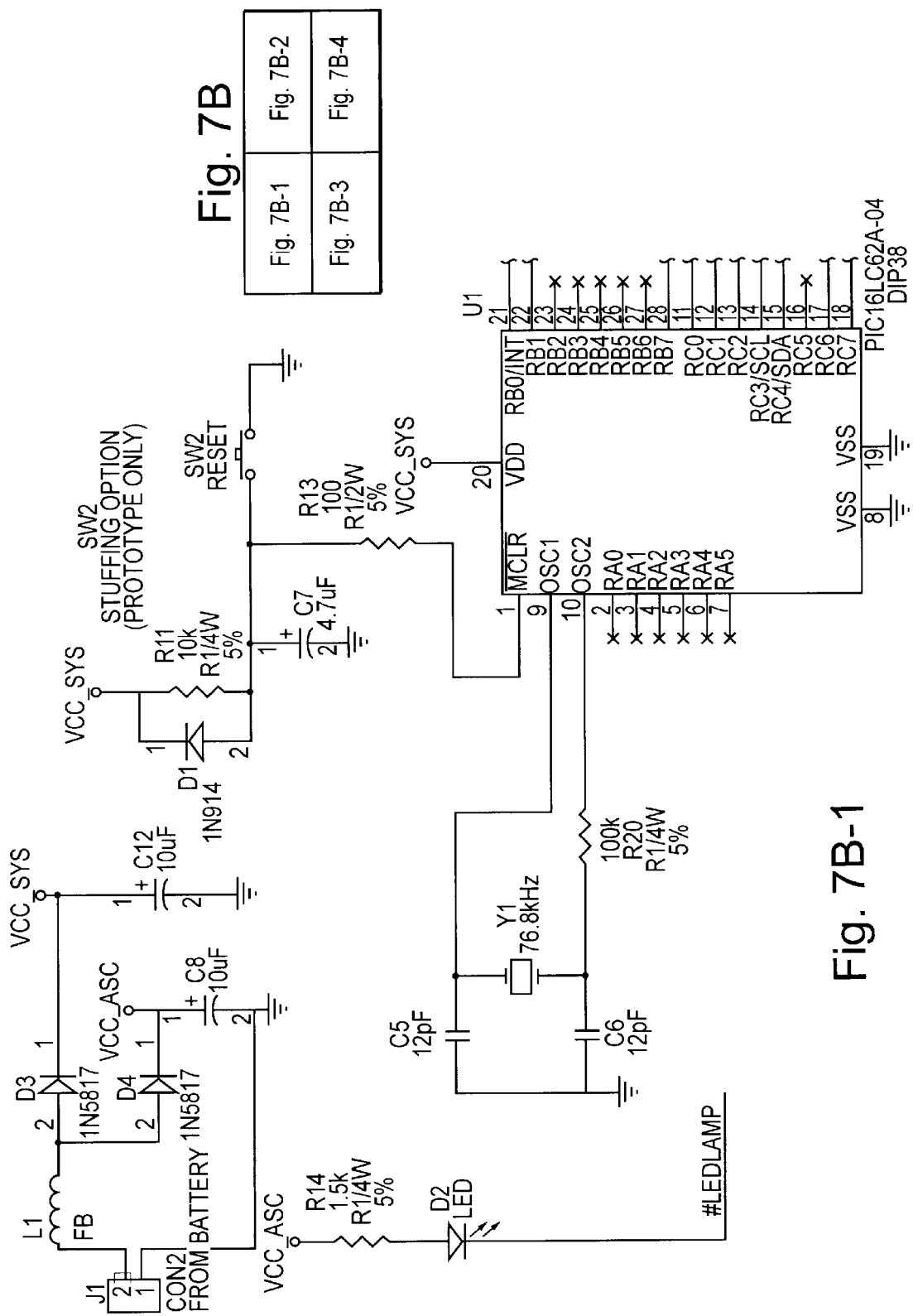

COMMAND CONSOLE FOR HOME MONITORING SYSTEM

This application is a division of application Ser. No. 09/255,421, filed Feb. 22, 1999, now abandoned.

BACKGROUND OF THE INVENTION

A. Field of the Invention

This invention relates to a home monitoring system, and more particularly relates to a command console for monitoring and processing the output of sensors.

B. Description of Related Art

Sensors are available in order to monitor various conditions of any structure such as a house or a boat. The sensors include water detectors for measuring, the level of water, temperature sensors for measuring temperature, carbon monoxide detectors for measuring the levels of carbon monoxide, electricity sensors for determining if power is available, smoke alarms, burglar alarms (motion sensors, door/window magnetic alarm, glass break detector), gas meters to measure the amount of gas used, electricity meters to measure the amount of electricity used, and water meters to measure the amount of water used. However, the sensors are discrete components and require integration of the sensor outputs in a central location to create a complete home monitoring system. Current home monitoring systems fail to integrate the output of the sensors in order to achieve a symbiotic effect. Therefore, there is a lack of analysis of the sensor outputs in the way of (1) providing a history of the sensor as an indicator to the operator of the sensor output over time; (2) analyzing the trends of the sensor to increase the effectiveness of the sensor beyond simply the current sensor output; and (3) analyzing the output of one sensor which may impact interpretation of a second sensor's output. Without the integration of the sensor outputs into a console, and without the analysis of the sensor outputs, a home monitoring system fails to achieve its goals of being tailored to the needs of the end user. Moreover, home monitoring systems are limited in their applicability. For example, one home monitoring system which is unavailable is a prescription reminder system.

SUMMARY OF THE INVENTION

In accordance with a first aspect of the invention, a monitoring system is provided. The monitoring system includes a plurality of sensors, a command console in communication with the plurality of sensors, the command console comprising a predetermined values look-up table, the look-up table including predetermined values for the plurality of sensors during normal operation; means for receiving data from the plurality of sensors to the command console; a historical look-up table, the historical look-up table for storing data from the means for receiving data; a processor, the processor connected to the predetermined values look-up table, to the means for receiving data and to the historical look-up table, the processor for comparing actual values received by the plurality of sensors with the predetermined values; and an alarm connected to the processor, the alarm for notifying a user based on the comparison of the actual values received by the plurality of sensors with the predetermined values.

In accordance with a second aspect of the invention, a method of monitoring a security system, the security system having a plurality of sensors and a command console, is provided. The method includes the step of sending of data regarding current status of the plurality of sensors to the command console. The method also includes the step of recording the data regarding the current status of the plurality of sensors in a first look-up table. Further, the method includes comparing the data regarding the current status of the plurality of sensors with values in a second look-up table. And, the method includes activating an alarm on the security system based on the comparison of the data regarding the current status of the plurality of sensors with values in a second look-up table.

In accordance with a third aspect of the invention, a patient monitoring system is provided. The patient monitoring system includes a service center device including a service center processor and a service center memory device connected to the service center processor, the service center memory device including a patient data look-up table containing patient data regarding types of prescriptions taken by the patient and times for taking the prescriptions by the patient; and at least one patient home device including a patient home processor having a clock, a patient home memory device connected to the patient home processor, means for notifying a patient, and means for communicating with the service center in order to transfer patient data, wherein the patient home memory device includes a patient home look-up table containing patient data regarding types of prescriptions taken by the patient and times for taking of the prescriptions, the patient data being obtained from the patient data look-up table via the means for communicating with the service center and wherein the processor notifies the patient via the means for notifying a patient based on the patient data in the patient home look-up table and based on the clock.

In accordance with a second aspect of the invention, a method, in a system having a service center and at least one patient home, of monitoring a patient's taking of prescriptions is provided. The method includes the step of compiling a look-up table at the service center that contains prescription data schedules for taking the prescription. The method also includes the step of sending the prescription data to the patient home. In addition, the method includes the step of compiling a look-up table at the patient home that contains prescription data including schedules for taking the prescription. The method further includes the step of determining when to notify the patient to take the prescription based on the schedules in the look-up table at the patient home. And, the method includes the step of notifying the patient when the patient is scheduled to take the prescription.

Accordingly, a goal is to process and reprocess specimens for microscopic examination. These and other objects, features, and advantages of the present invention are discussed or apparent in the following detailed description.

BRIEF DESCRIPTION OF THE DRAWINGS

A presently preferred embodiment of the present invention is described herein with reference to the drawings wherein:

FIGS. 3A–3G are schematics of a command console in FIG. 1;

FIG. 14b is a block diagram of a set-top box for patient home of FIG. 14a; and

FIG. 14c is a block diagram of a cable set-top box for patient home of FIG. 14a.

DETAILED DESCRIPTION OF PREFERRED AND ALTERNATIVE EMBODIMENTS OF THE INVENTION

Figure 1:
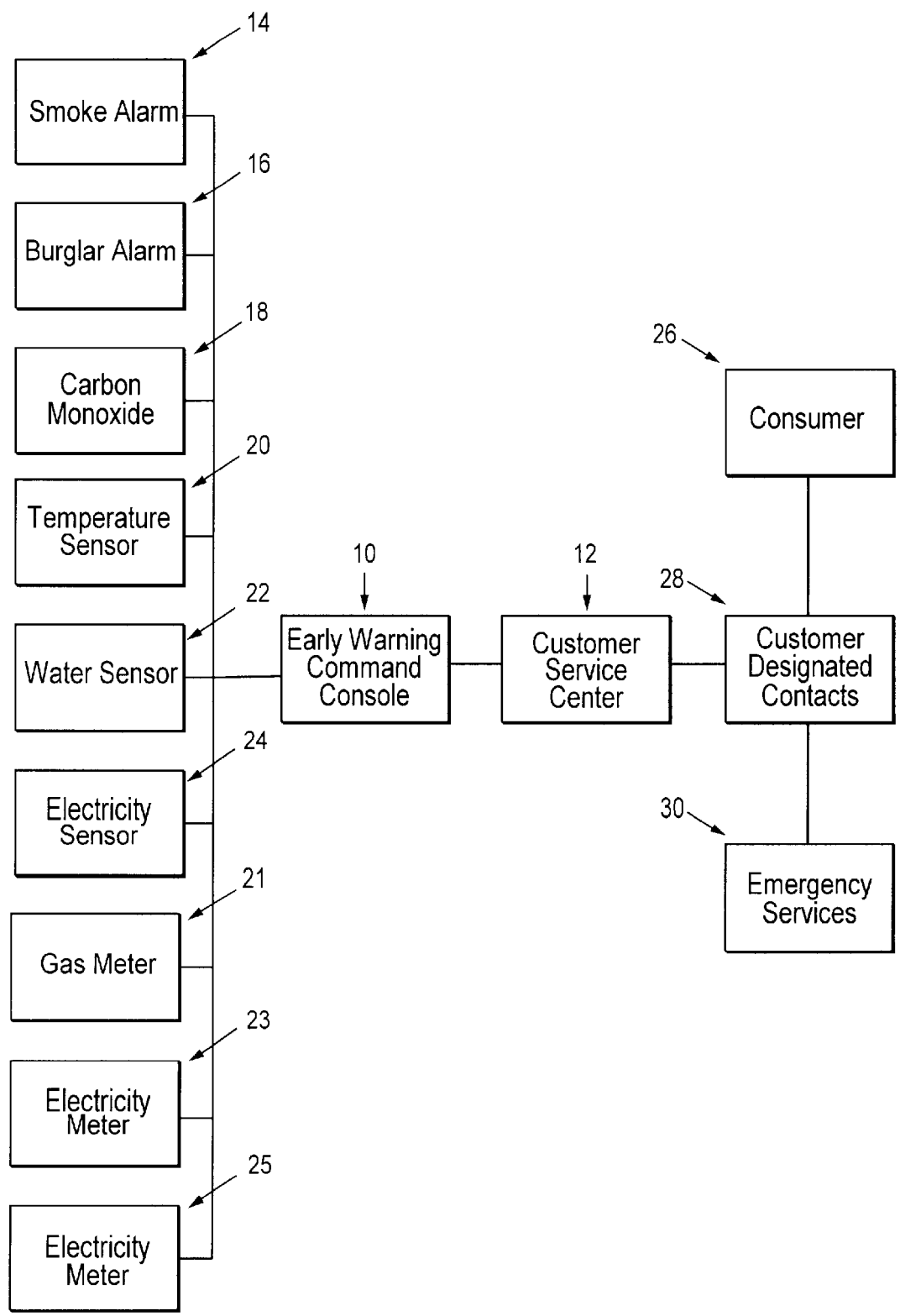
FIG. 1 is a block diagram of the home monitoring system integrating the sensors, command console and other devices connected via the Public Switched Telephone Network.

FIG. 1 refers to a home monitoring system consisting of a command console and external sensors and accessories. There can be many different types and numbers of external sensors or detectors. The sensor units may include: burglar alarm series (motion sensor, door/window magnetic sensor and glass break detector, keyless transmitter and remote panel); carbon monoxide (CO) detector; electricity alarm, smoke alarm, temperature sensor and water detector. All alarms, detectors and sensors may have a singular "test" button and an LED (red). The purpose of the Test button is to test local audible signaling, and, transmit a "registration" signal format in order for the alarm, sensor or accessory to register itself with the command console. In addition to the sensors, there can be many different types and numbers of external meters. The meter units may include: gas, electricity or water.

The command console 10 receives data, which may be status information or alarm information, from a plurality of external sensors as described subsequently. The external sensors, in one embodiment, includes a smoke alarm system 14, a burglar alarm system 16, a carbon monoxide system 18, a temperature sensor system 20, a water sensor system 22, and an electricity sensor system 24. In an alternative embodiment, the command console has inputs, in addition to the inputs from the sensor systems, from meters such as a gas meter system 21, electricity meter system 23 and water meter system 25. The command console 10 processes the data and determines if there is a reportable alarm. It also has a user interface to allow the user to input commands to the system and receive responses via an input/output device such as an alphanumeric display. The command console 10 is in communication with external sensors and accessories (such as meters) via wireless communication, such as using radio frequency (RF) signals. There are other means of communication including hardwiring the output of the sensors to the command console via a wire, using electromagnetic signals other than RF, and audio signals. Moreover, depending on the needs of the system and the cost constraints, the communication between the external sensors and the command console 10 can be unidirectional or bidirectional. The communication can be unidirectional in that the sensors and accessories send output via an RF signal to the command console 10. The communication may also be bidirectional in that the sensors and accessories both send output to and receive input from the command console 10. In this manner, the sensors and accessories may receive feedback in terms of operation, as described subsequently, thereby increasing the effectiveness of the home monitoring system.

The command console, in one embodiment, has six input/output functions including: sensor alarm status, input device, panic buttons, displays, aural feedback system, and a low battery LED. With respect to the sensor alarm status, each of the sensors described subsequently has an associated icon on the command console. These icons indicate the state of the sensor. For example during registration of the sensor, the icon flashes in the green color. When the sensor is properly registered and in normal operation, the icon remains green. When the sensor indicates an "event", the icon flashes red. When the battery is low for the sensor, the icon remains red. The command console also includes a user input device in the form of an input keypad, as described subsequently. The keypad is used for entering data, such as the personal identification number of the user, call forwarding telephone numbers. The command console also has three types of panic buttons (fire, police and medical). The user provides telephone numbers associated with each of the panic buttons so that in the event of an emergency, the user simply depresses the button and the number to the appropriate agency (i.e. fire department, police department or doctor) is called via the customer service center 12. The command console also contains a menu key which is use to scroll through various software menus on the command console. In this manner, the user may program the settings of the command console including the types of telecommunications protocols needed to contact and the desired operating settings.

The command console 10 is also in communication with an operator and a registration system at a customer service center 12, as shown in FIG. 1. Communication is achieved either through a public switched telephone network (PSTN) or a cellular telephone line. In either case, the command console 10 sends information to and receives information from the customer service center 12. The customer service center 12 processes an alarm request sent from the command console 10 and communicates with emergency services 30, such as police, fire departments, paramedics, etc. in the event of an alarm condition. In addition, the customer service center 12 communicates with customer designated contacts, in the event of an alarm condition. For example, if someone is designated as necessary to contact in case of an emergency, the person is automatically contacted. The customer service center 12 is further in communication with consumer 26 via conventional mail, electronic mail or telephone depending on the information sent from the command console. Consumer 26 is the person whose home is being monitored by the command console 10. For example, in the event that one of the sensors has a low battery, the command console indicates this status to the customer service center 12, which in turn indicates to the consumer 26 that the battery needs to be replaced. This notification may take the form of an electronic mail message or a telephone call.

Figure 2:
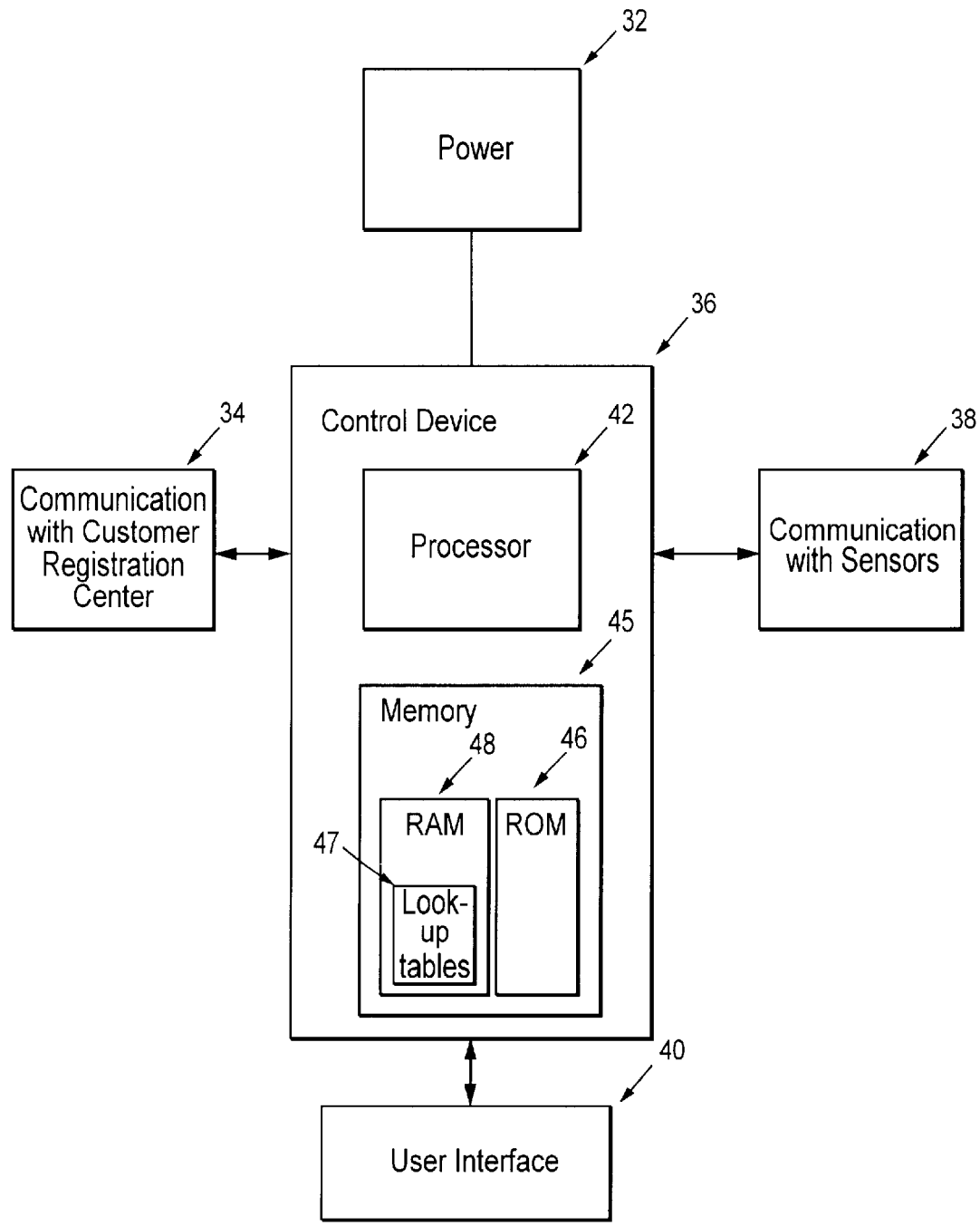
FIG. 2 is a block diagram of the command console for the home monitoring system in FIG. 1.

In accordance with one embodiment of the invention, there is a block diagram of the command console, as shown in FIG. 2. The command console 10 has several subsystems including power 32, communication with the customer registration center 34, control device 36, communication with sensors (in one embodiment, an RF receiver) 38, and a user interface 40. The power block 32 of the command console command console has a power source which is comprised of a plug connected to the standard 120 VAC, an AC/DC converter which converts the 120 VAC to 15 VDC, and batteries. The batteries are for power outages of the 120 VAC power. In the event of a power outage, the low battery LED light, as shown in FIG. 3F, is illuminated to alert the consumer. The command console also has an RF receiver for receiving the RF signals sent by the sensors. The control device 36 of the command console 10 further has a processor which controls the operations of the command console. The controller is described hereinafter with respect to FIG. 3A. The serial communications block 34 of the command console 10 further has a serial communicator which communicates via the PSTN or the Cellular telephone line to the off-site operator or the IVR System. The communication with customer service center 34 includes in one embodiment a modem (MOdulator/DEModulator) which includes any device that modulates digital information for transmission over a telephone line or demodulates information received over a telephone line, as shown in FIGS. 3C and 3D. The command console also includes a user interface 40 which enables the operator, on-site in the home, to input and receive data. The operator may input data via a keyboard, which is described subsequently with reference to FIGS. 3F and 3G. Further, the operator may receive information, such as data from the sensors or meters, status information of the command console, or information from the off-site operator via a display or via a printed output. The display may take the form of an LCD display or a monitor. Further, the display may be external to the command console in the form of connection to a television set, as described subsequently. The operator may also receive information in the form of printed output via a printer connected to the command console.

The control device 36 includes a processor 42, as shown in FIG. 2, such as a microprocessor by Dallas Semiconductor, model number DS87C530. The processor 42 also has a memory device 45 in the form of a volatile memory device, such as a random access memory (RAM) 48, and a non-volatile memory device, such as a read only memory (ROM) 46. The RAM contains look-up tables 47, described subsequently, which contain the information received from the sensors. The ROM contains programs, described subsequently, which operate the command console 10. The ROM also contains values based on operator input for the operation of the sensors. The processor 42 in the control device receives from the RF receiver the data sent from each of the sensors. As described subsequently, the processor 42 then lo processes the sensor input by storing the sensor input in look-up tables 47, determining if the sensor input is within acceptable boundaries as set by the operator, calculating trend analysis of the sensor input, and notifying the customer service center 12 of the status of the home monitoring system and of any anomalies in the sensor input.

Figures 1, 3A:
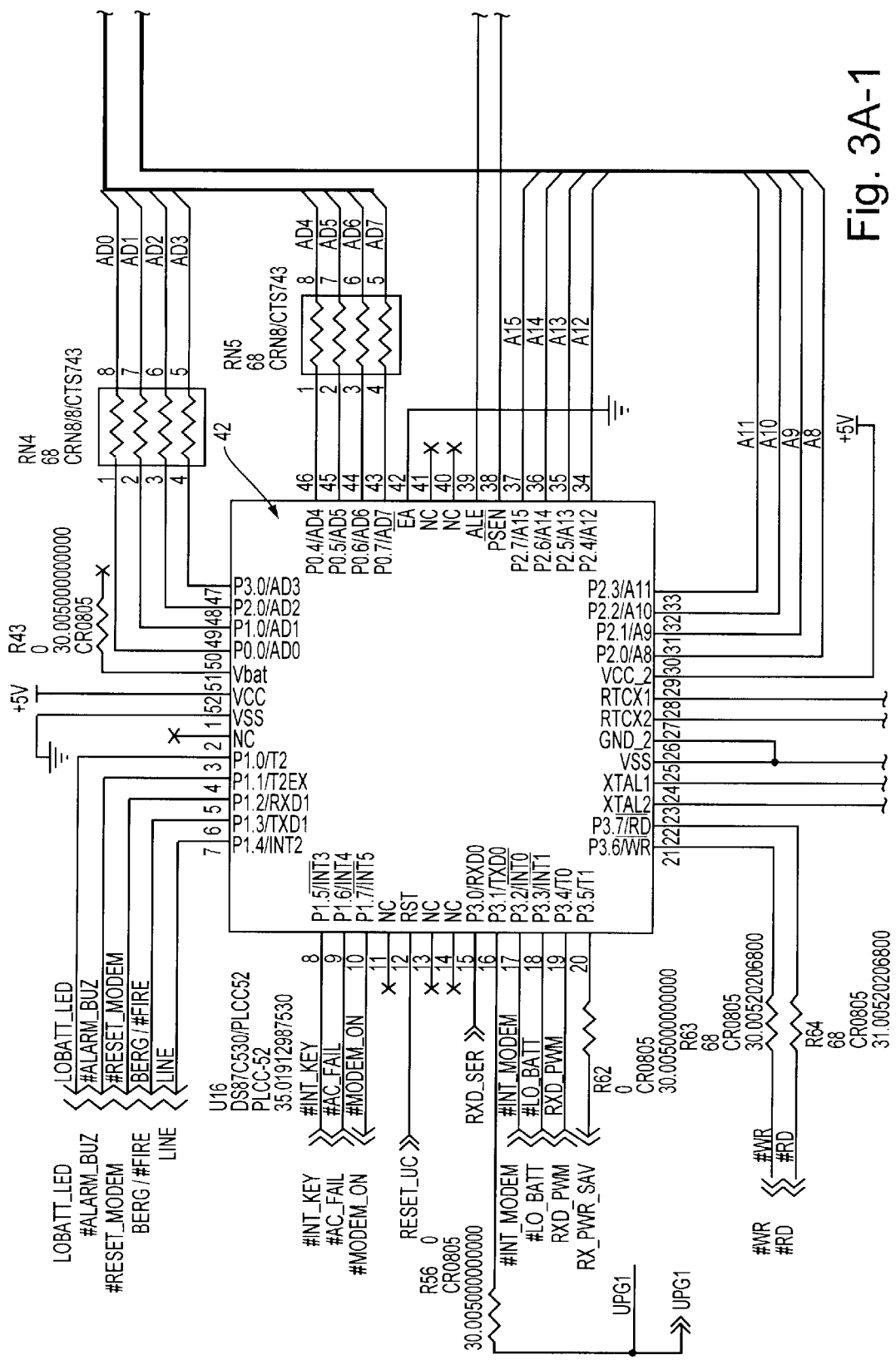
Figures 3, 3A:
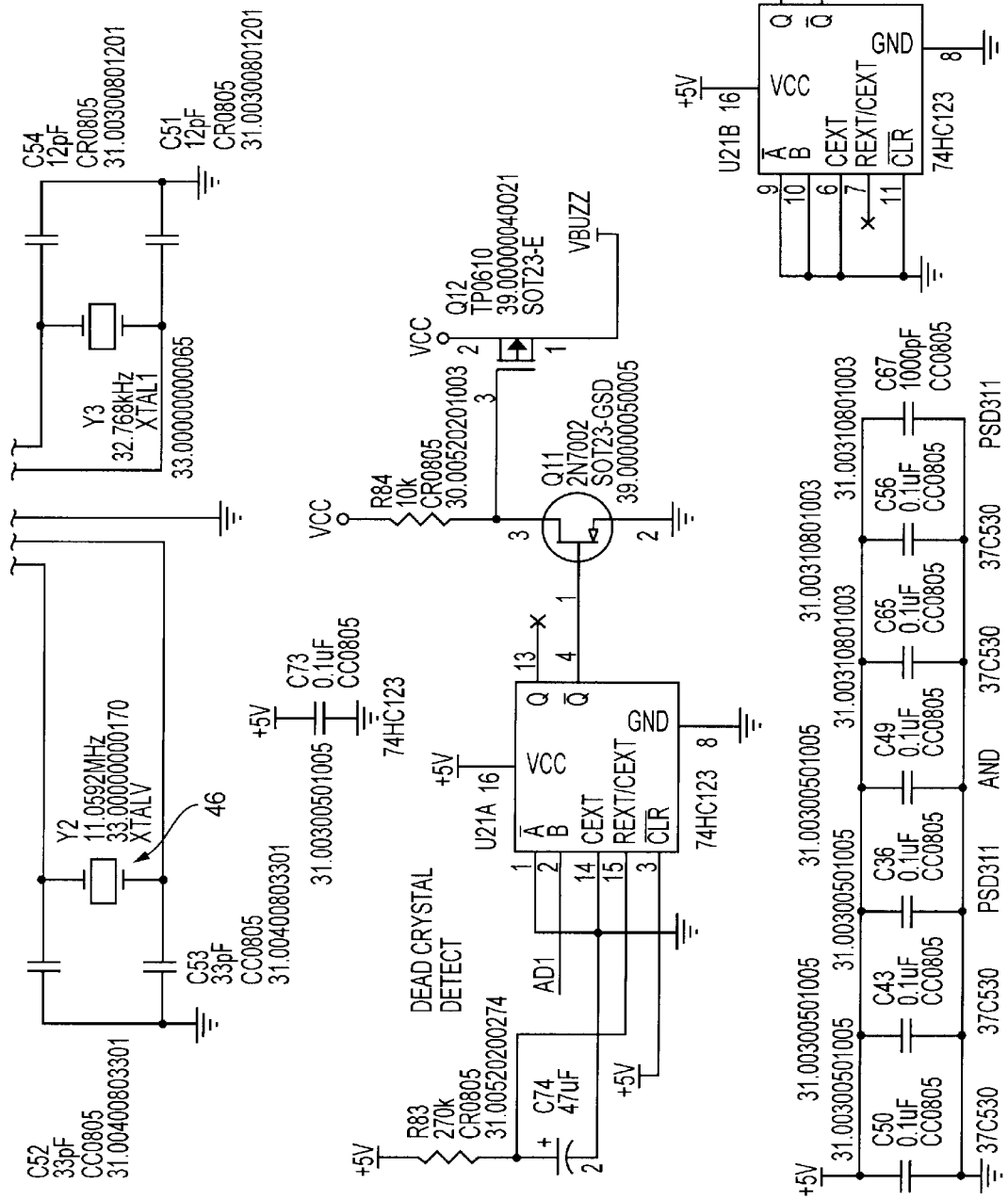
Figure 3B-2:
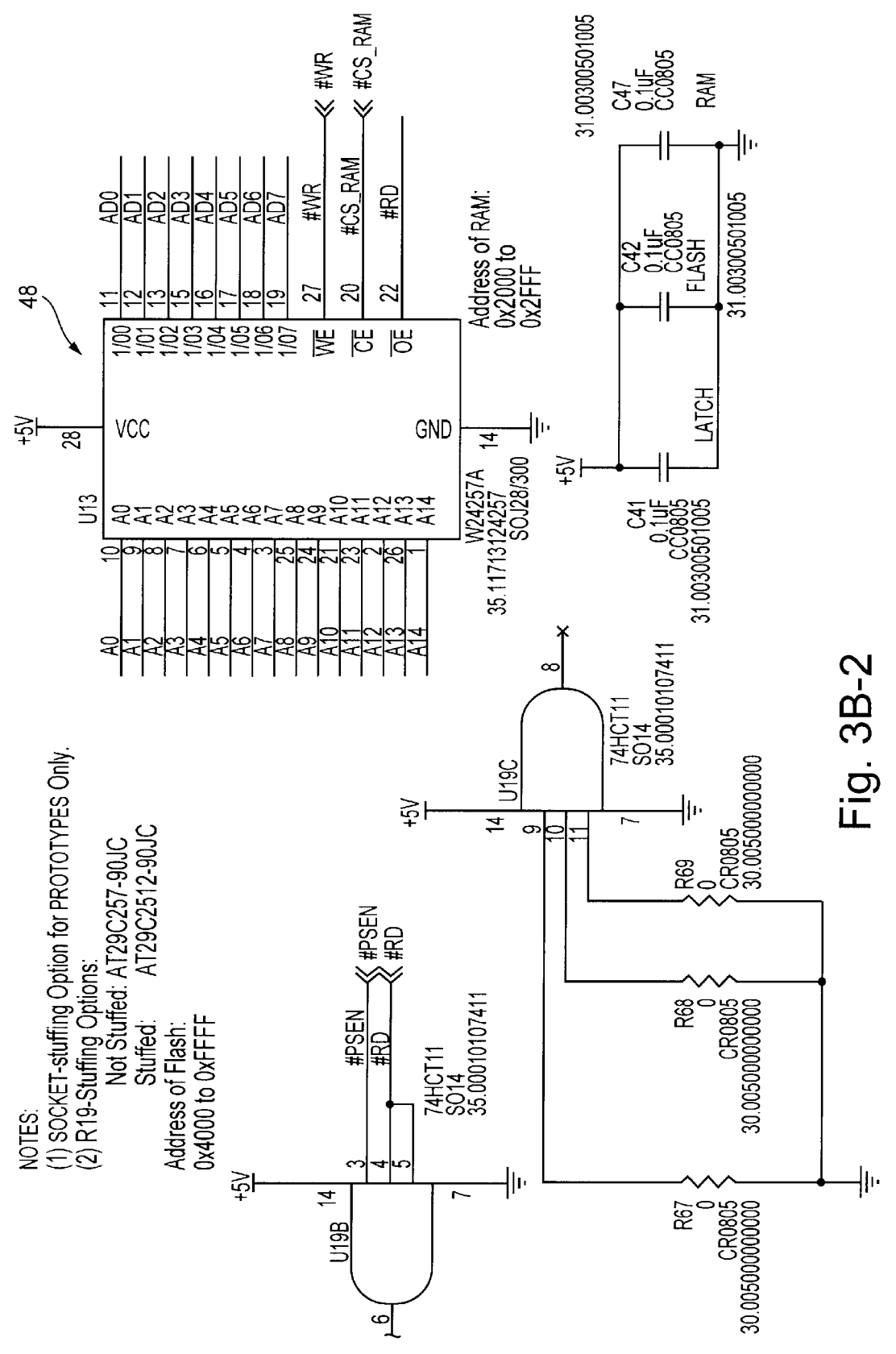
Figures 2, 3C:
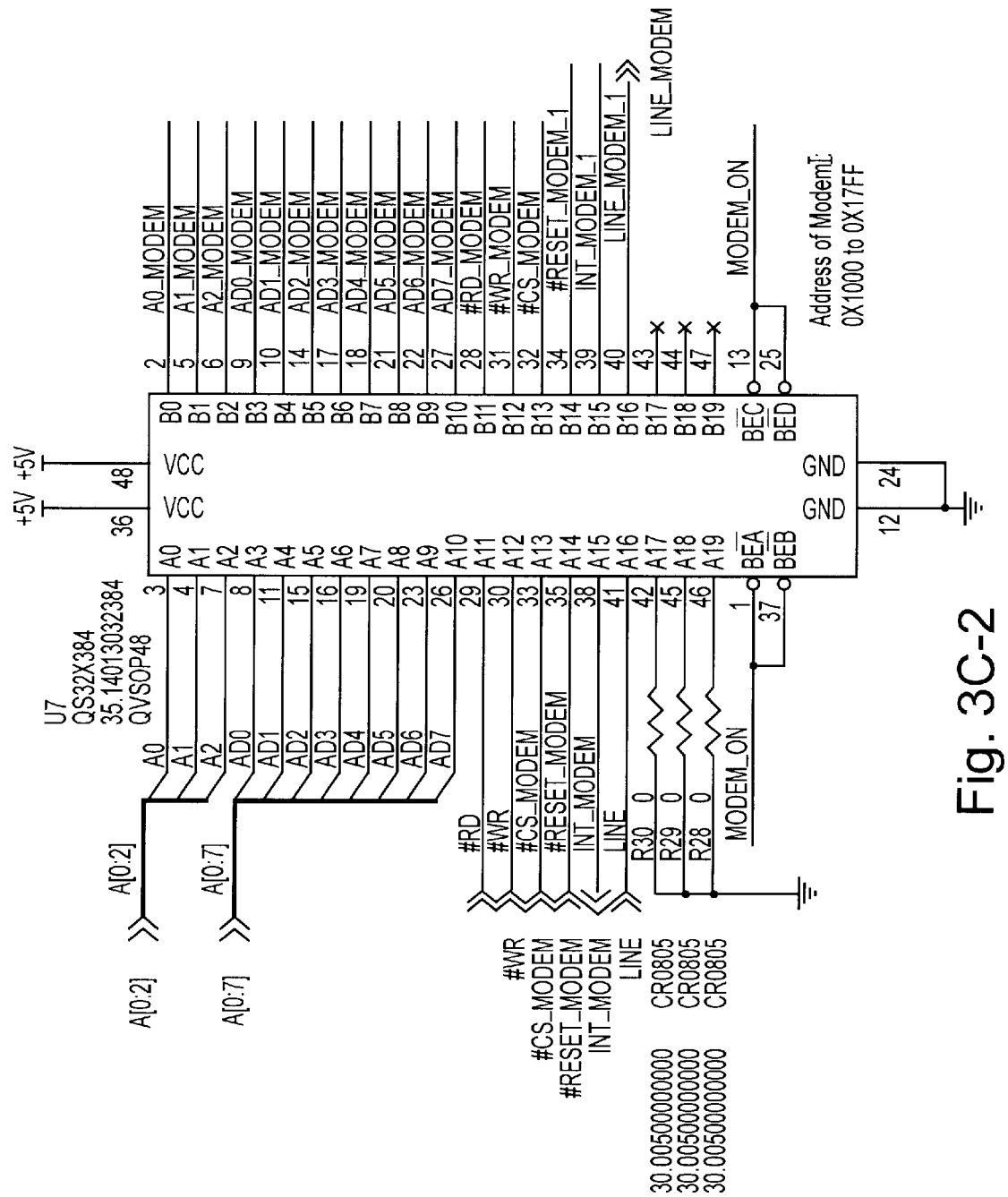
Figures 3, 3C:
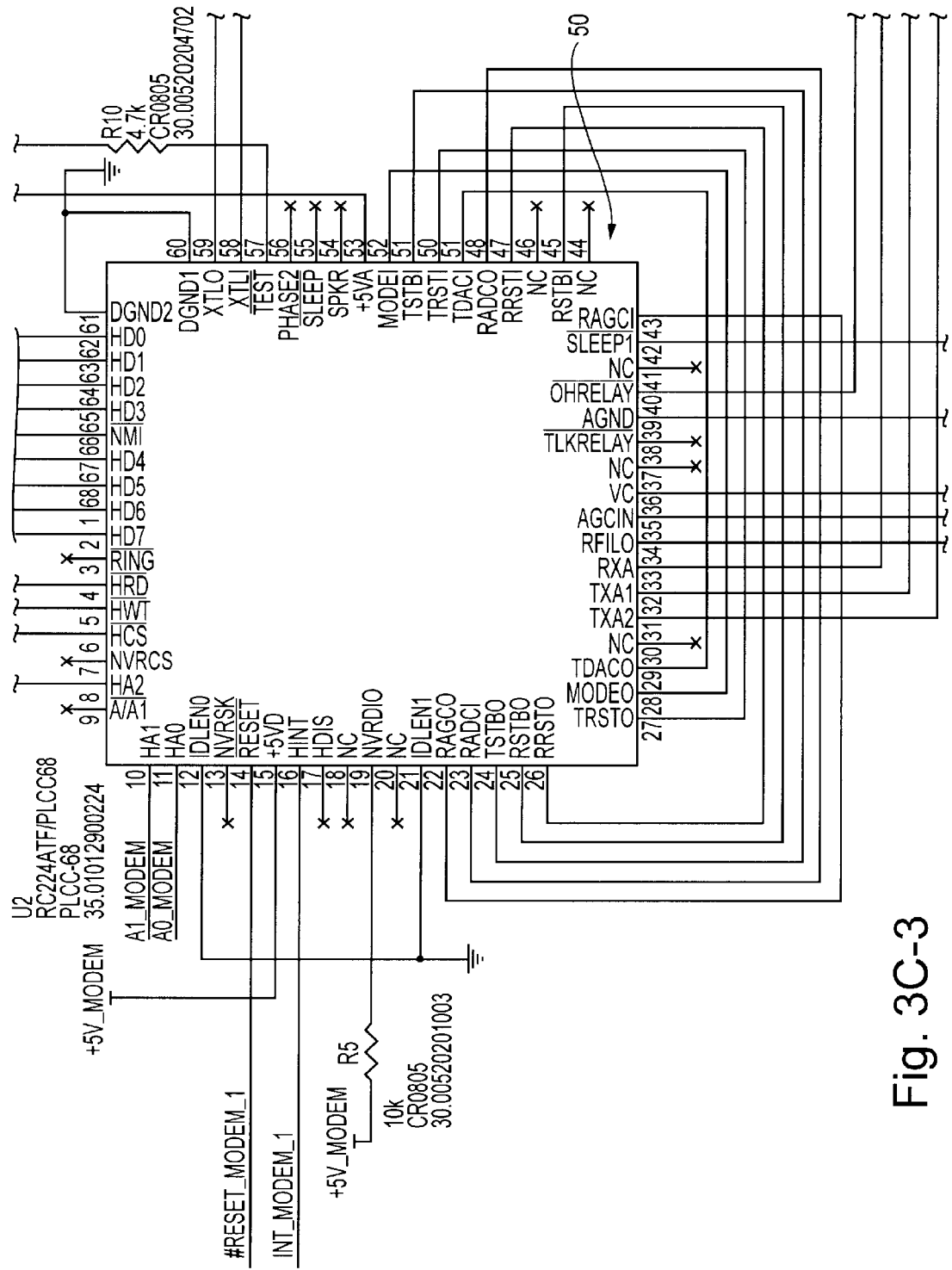
Figures 3, 3C, 4:
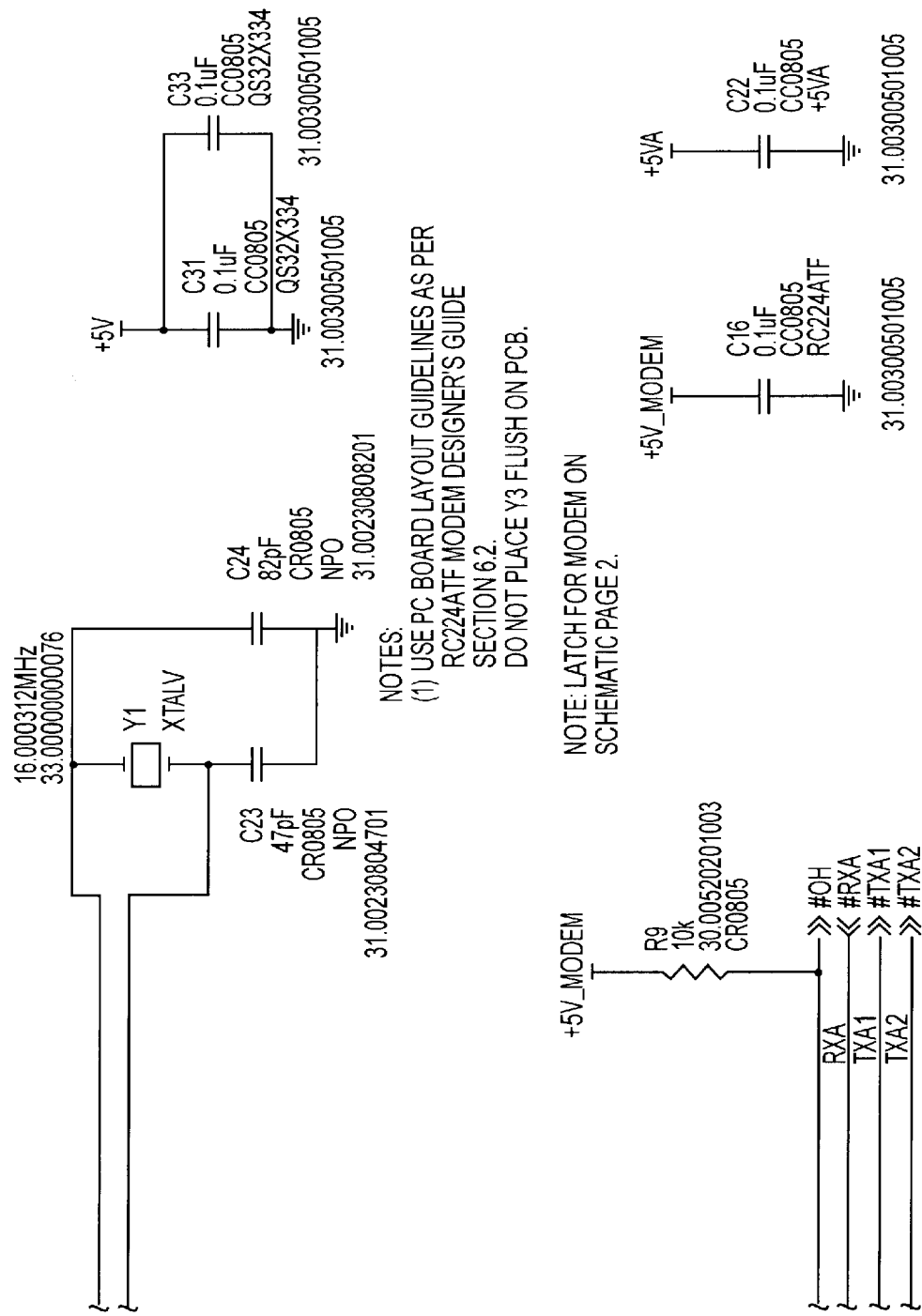
Figures 3, 3C, 4, 5:
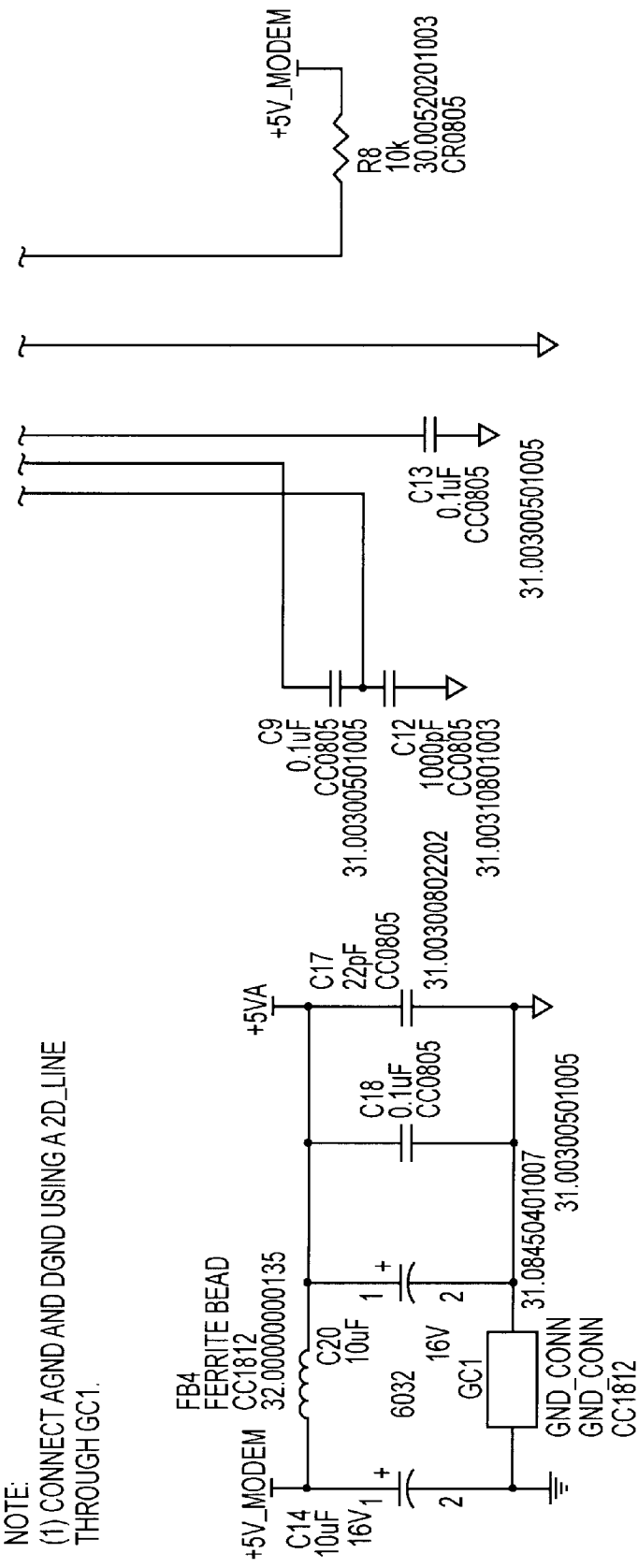
Figures 1, 3D:
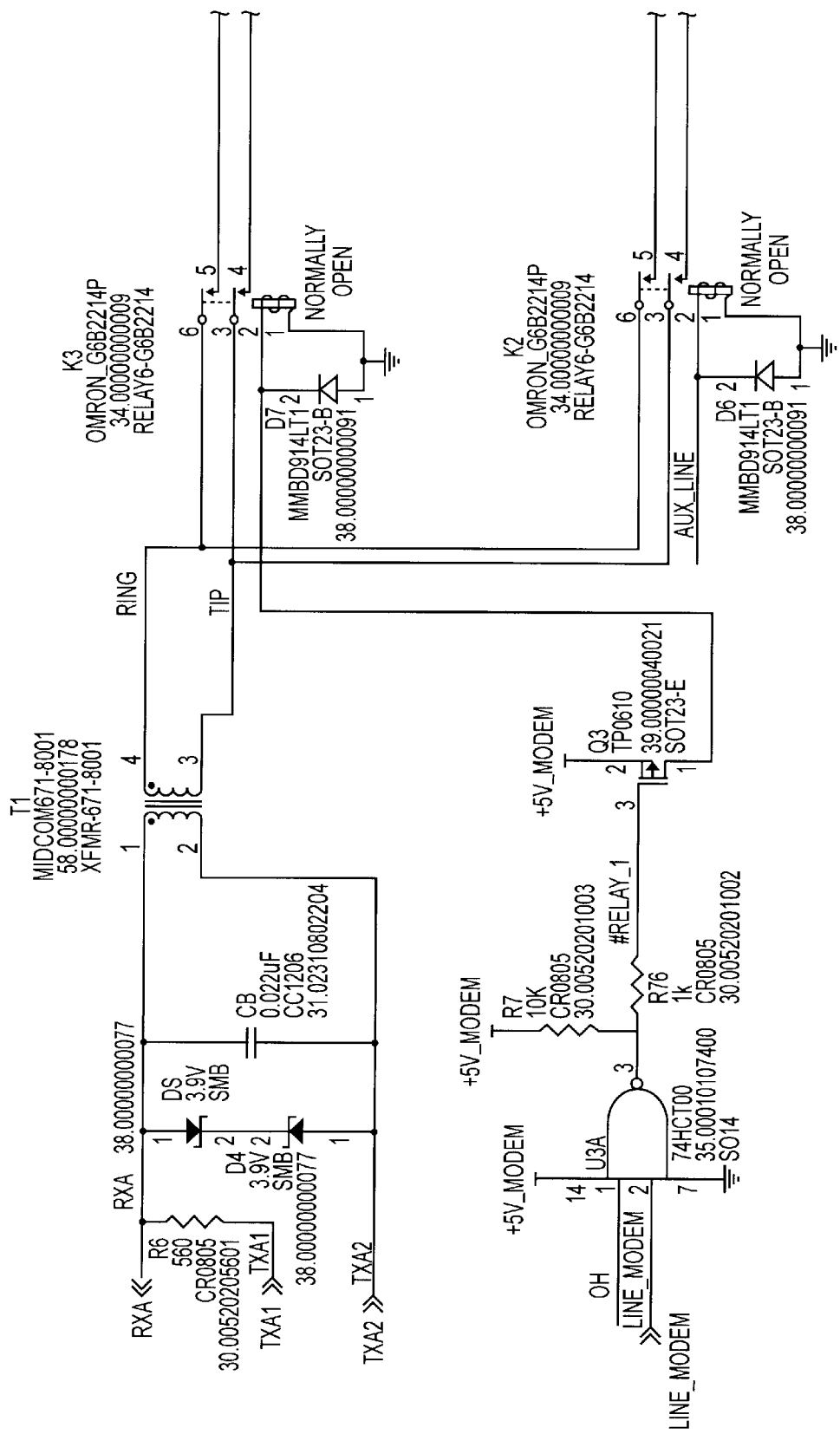
Figures 3, 3D:
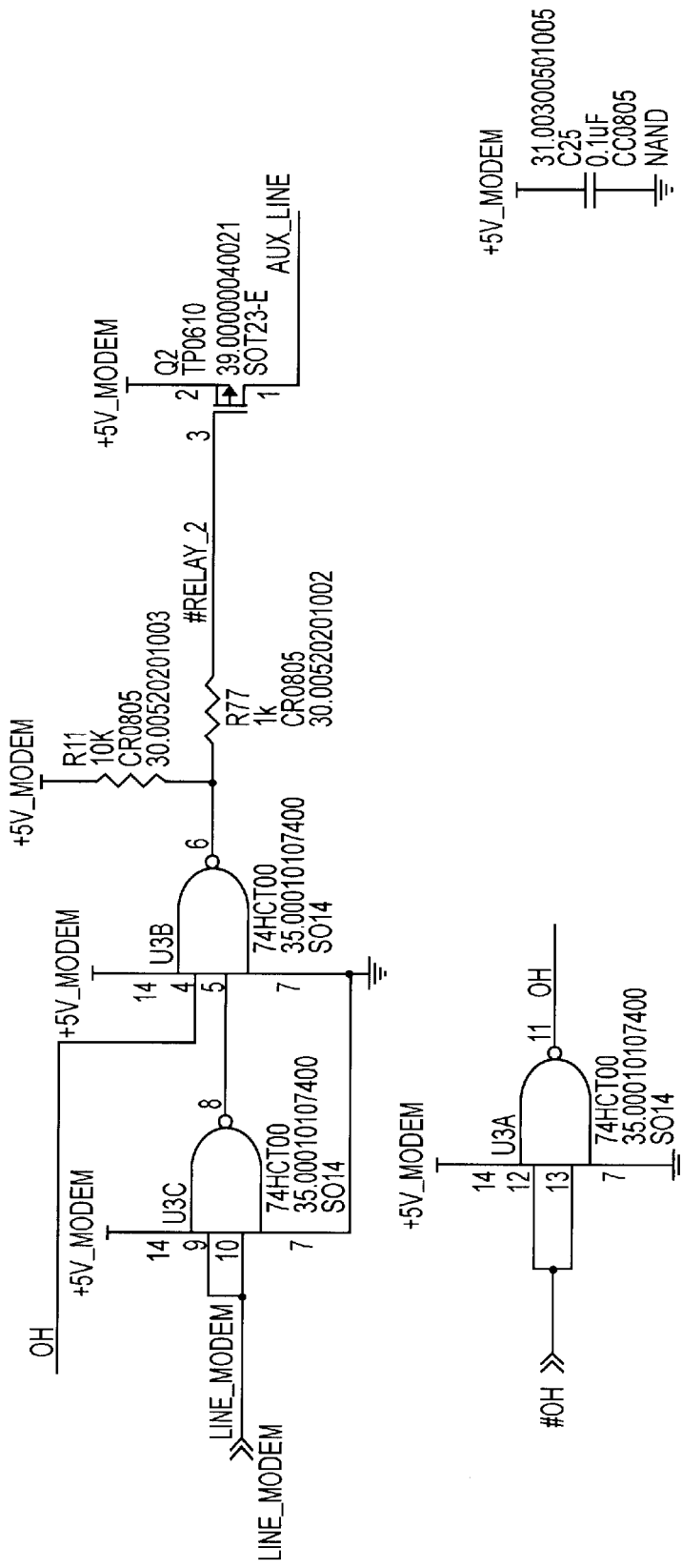
Figures 1, 3E:
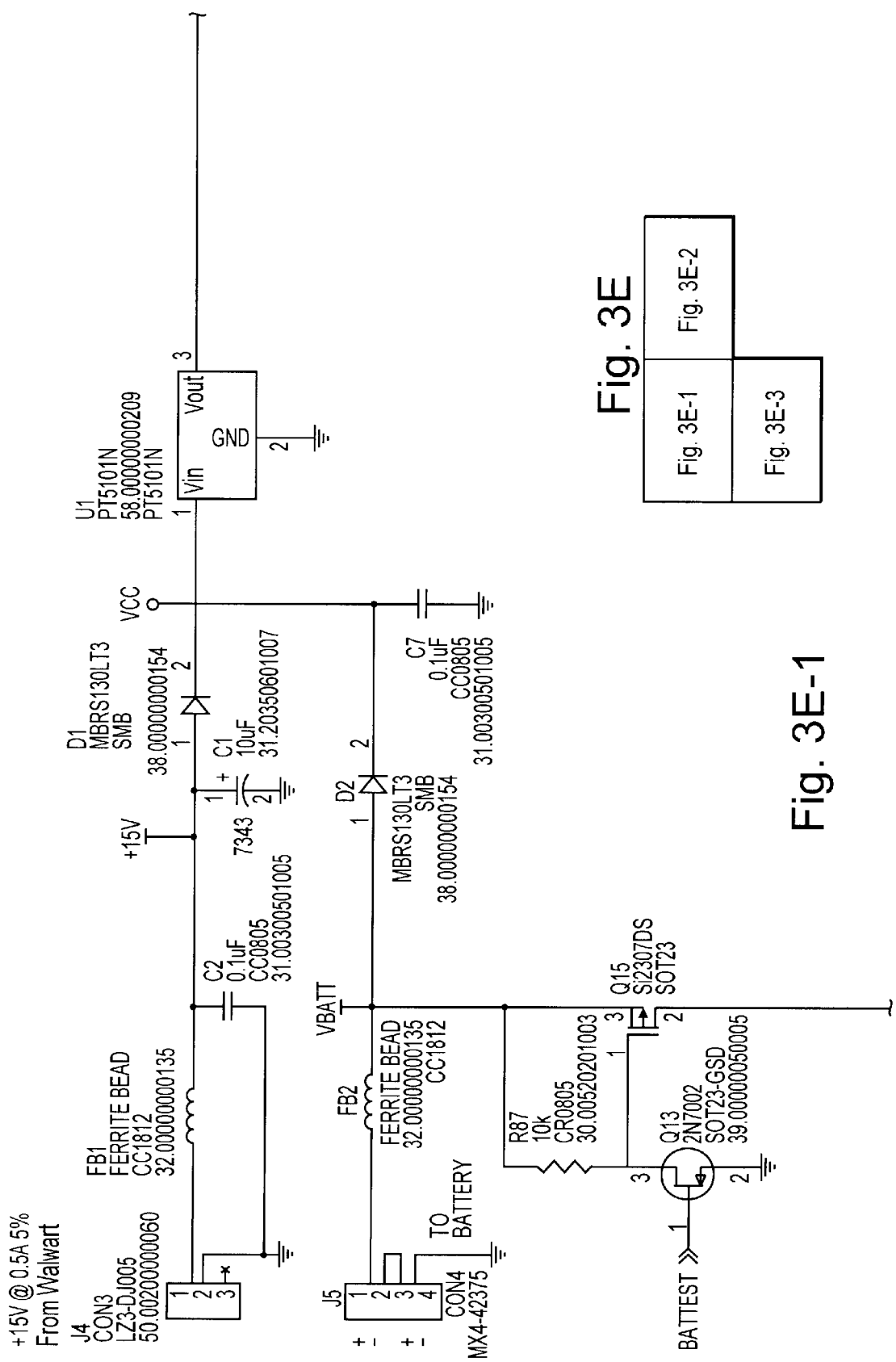
Figures 2, 3E:
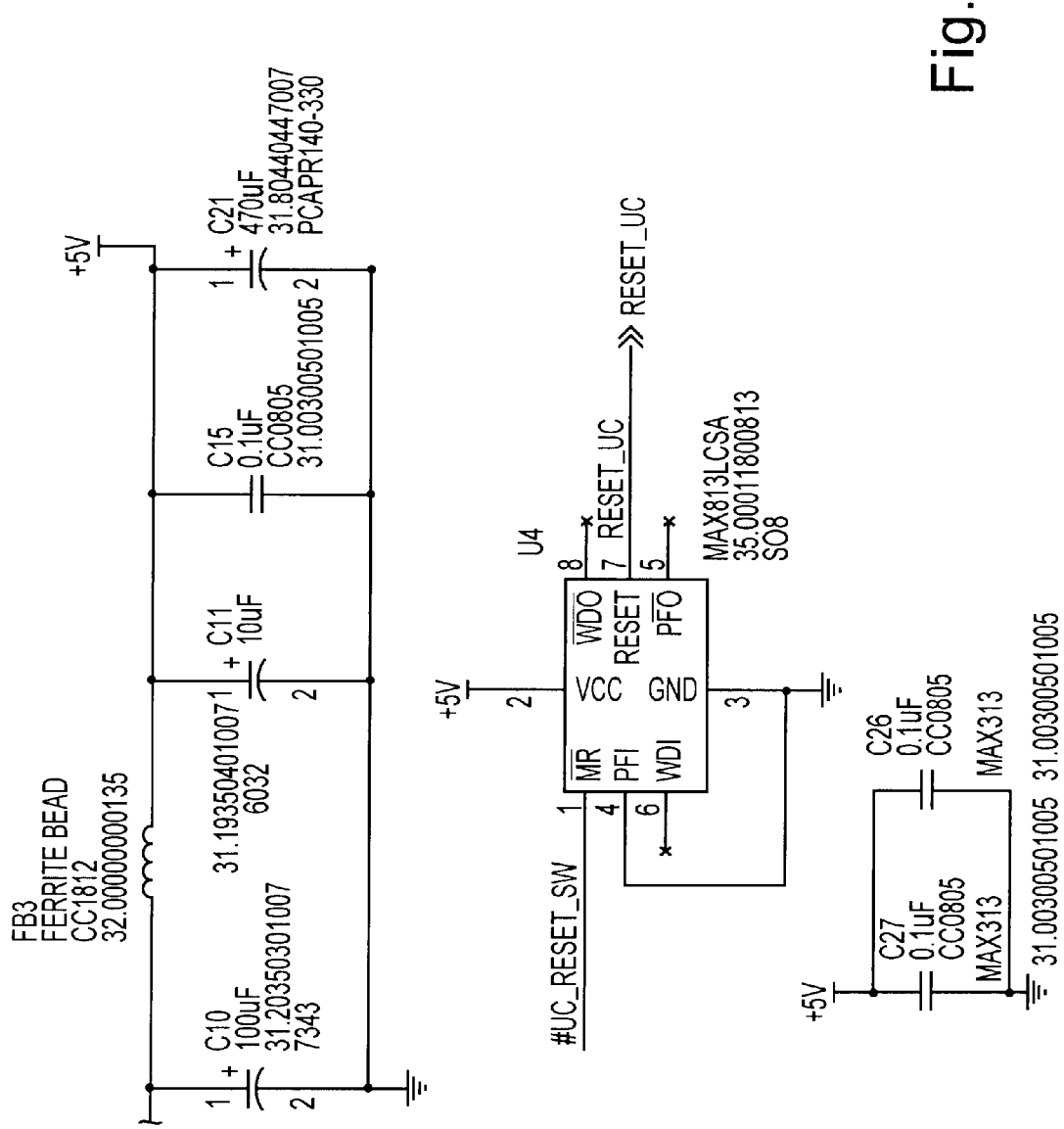
Figures 3, 3E:
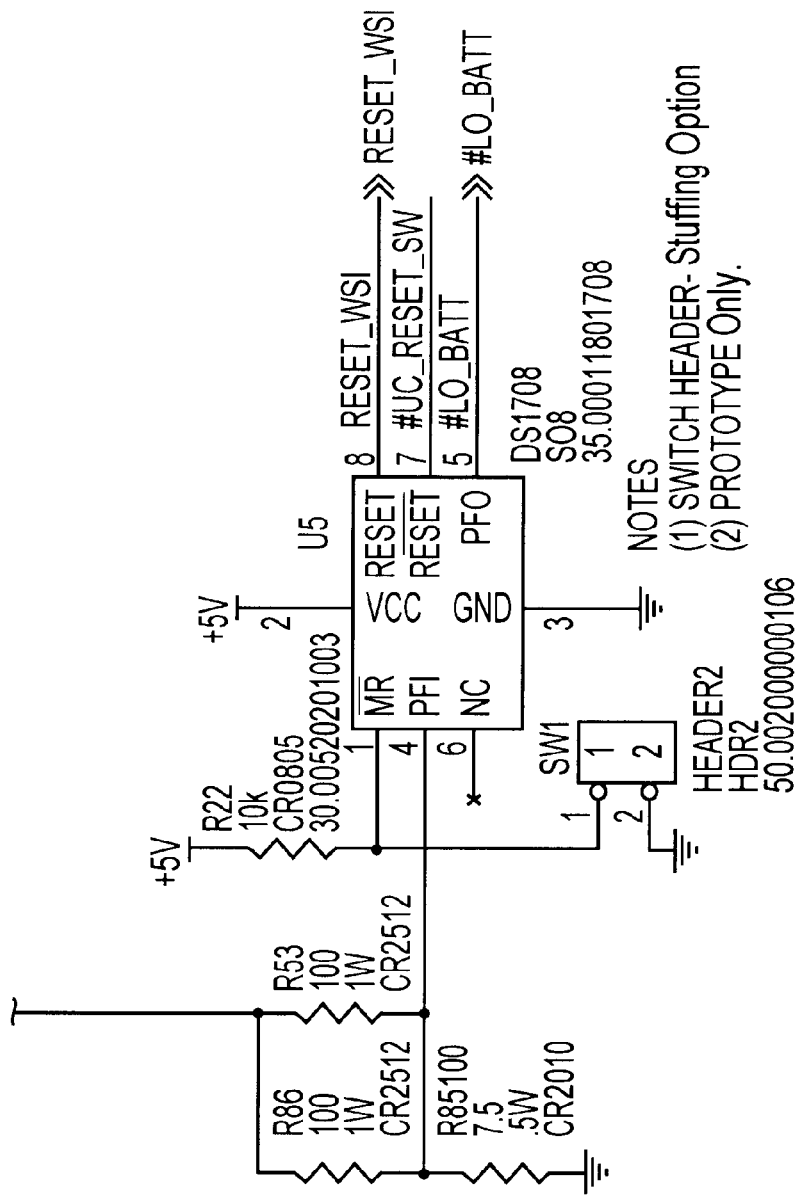
Figures 2, 3F:
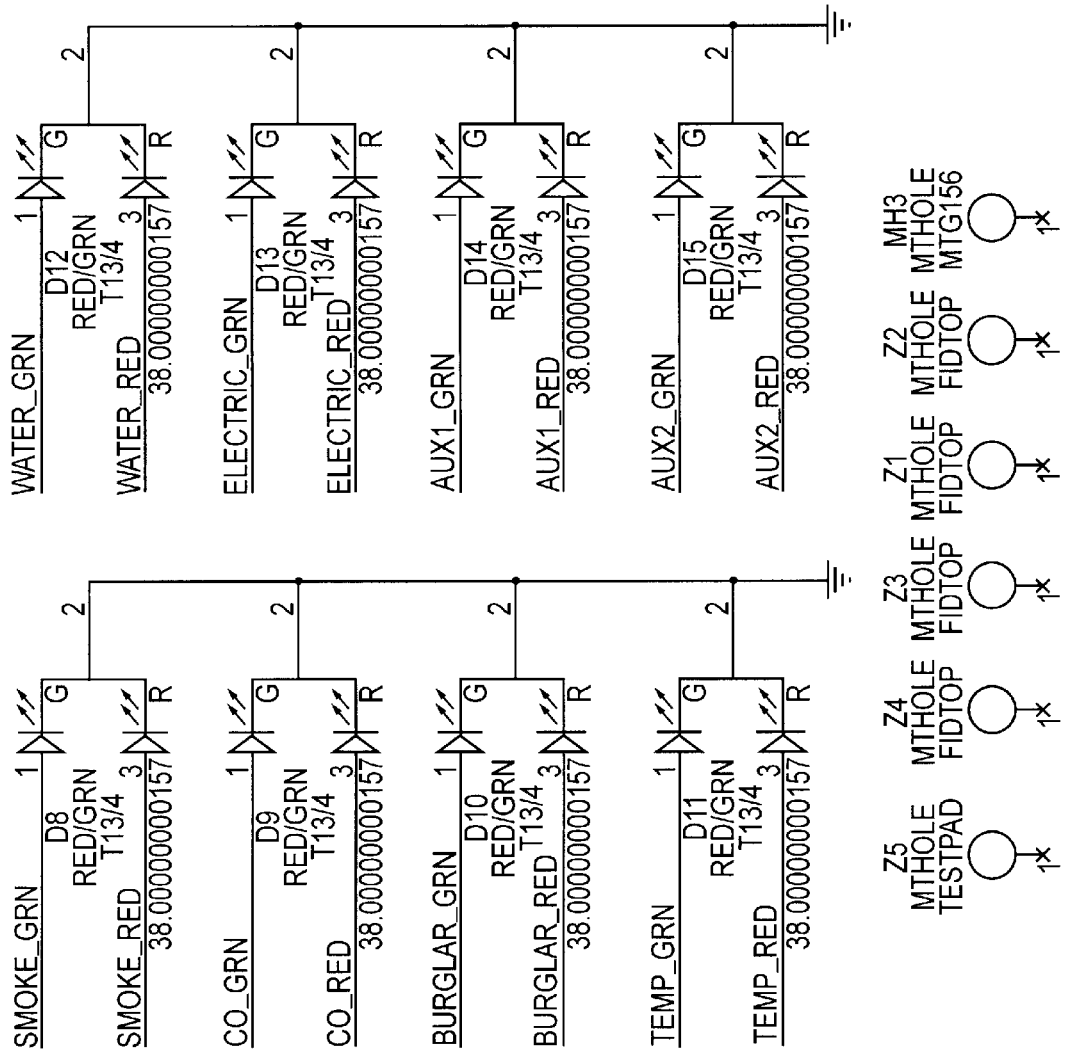
Figures 3, 3F:
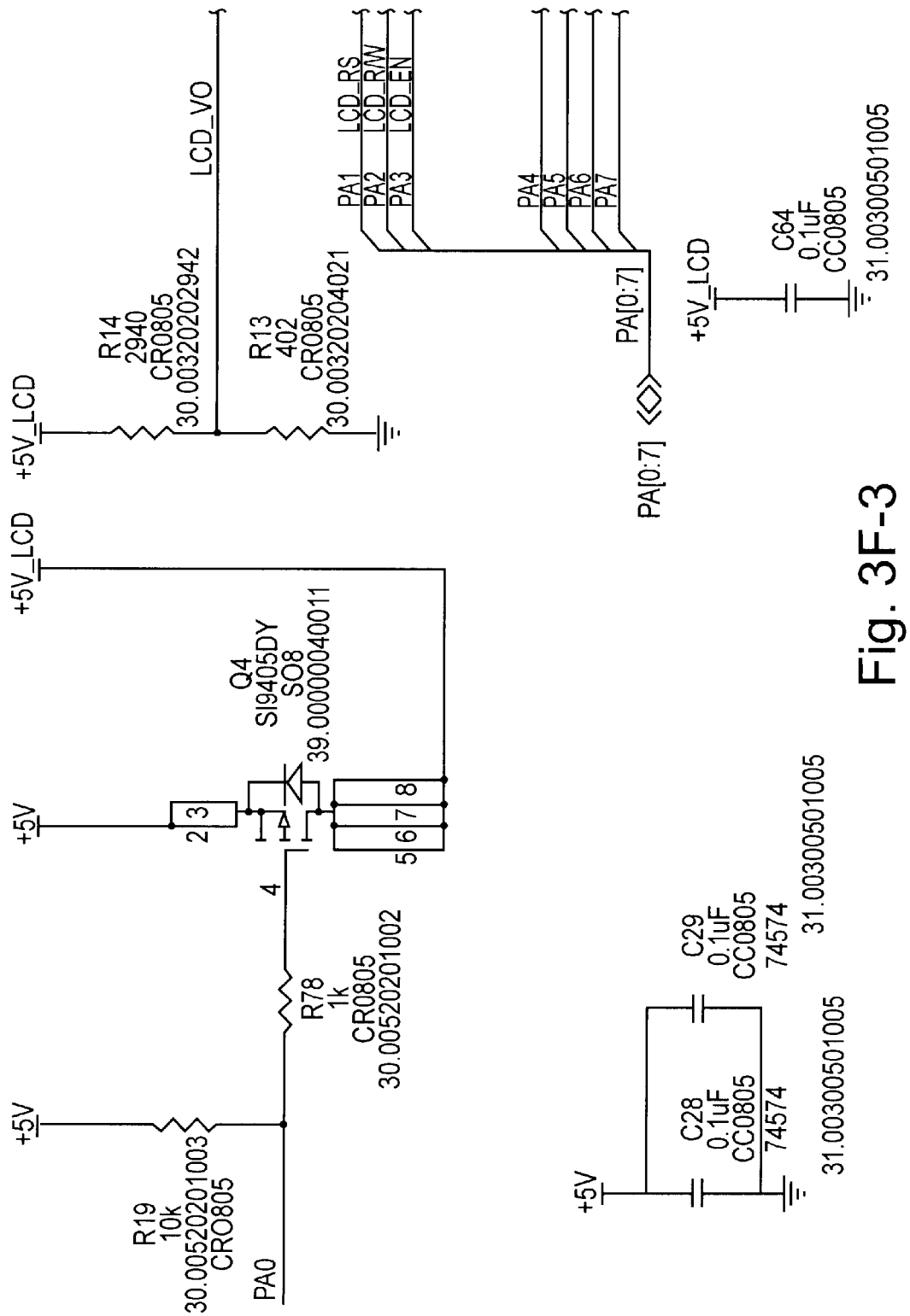
Figures 3, 3F, 4:
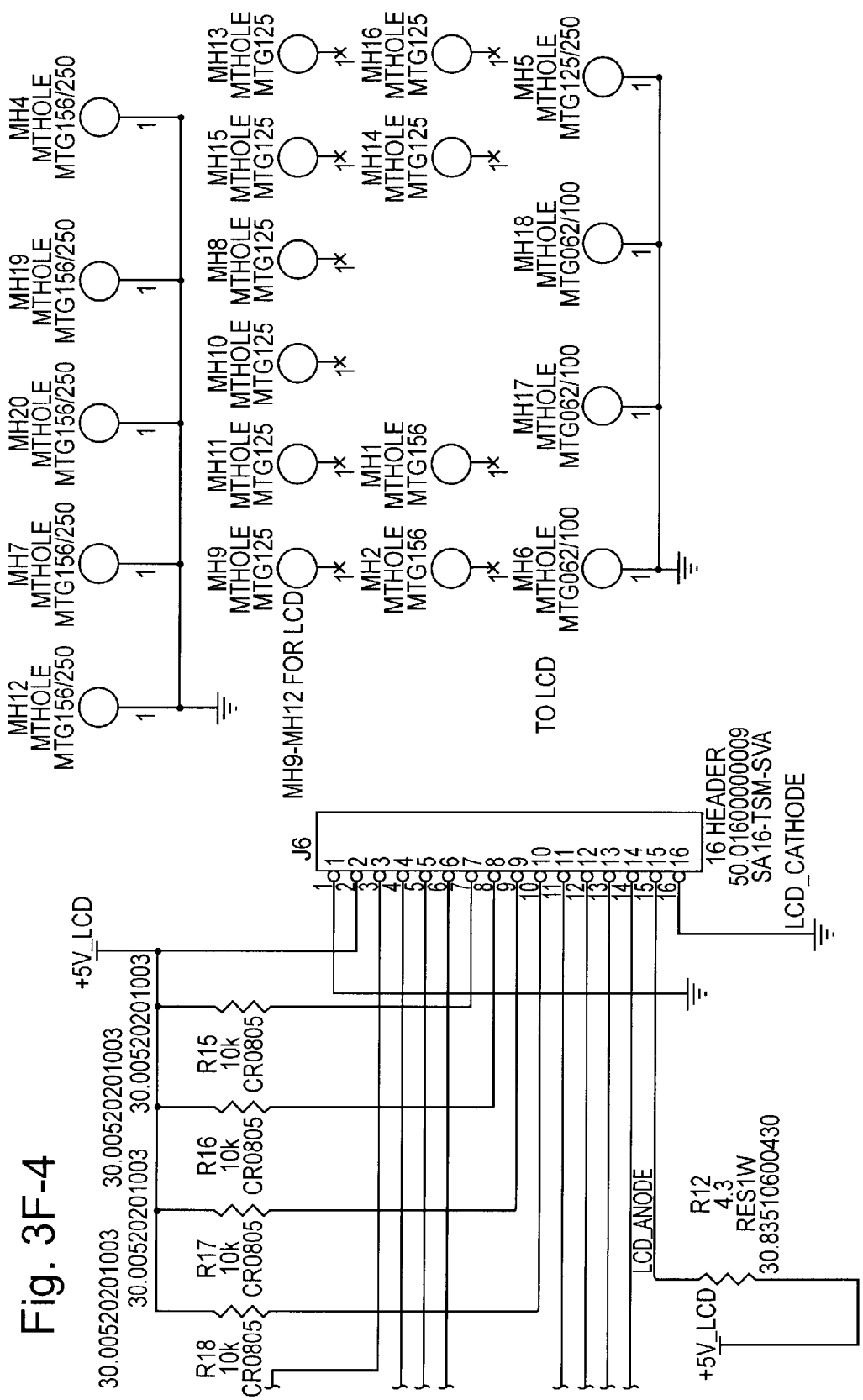

FIGS. 3A–3G show the schematics for the command console 10. As shown in FIG. 3A, the command console 10 includes a processor 42, which is Dallas Semiconductor DS87C530 microprocessor, that controls the operation of the command console 10. The processor 36 may take the form of an electromechanical timer, an embedded microprocessor circuit, a programmable logic controller, an external computer, or any combination of the above. The processor 42 is connected, via a bus, to a controller 44. The controller 44 is a Wafer Scale Intergration ZPSD311 peripheral controller, acting as an address decoder, EPROM, parallel port, etc. The microprocessor 42 also has a clock 46 at 11.0592 MHz crystal. The clock is used by the processor to count time periods, such as for counting time periods of power outages, as described subsequently. Referring to FIG. 3B, the processor accesses a memory 45 or other computer readable storage medium. This memory 45 includes both random access memory (RAM) 48 and read only memory (ROM) 46. The ROM 46 is used to contain the application software, and is in the form of Atmel AT29C512 flash memory, as shown in FIG. 3B. It is a type of flash memory that does not require special pins to be enabled to allow programming, and does not require any special programming voltage. The device can be write disabled, or enabled via software. RAM 48 is also provided.

Figure 3G:
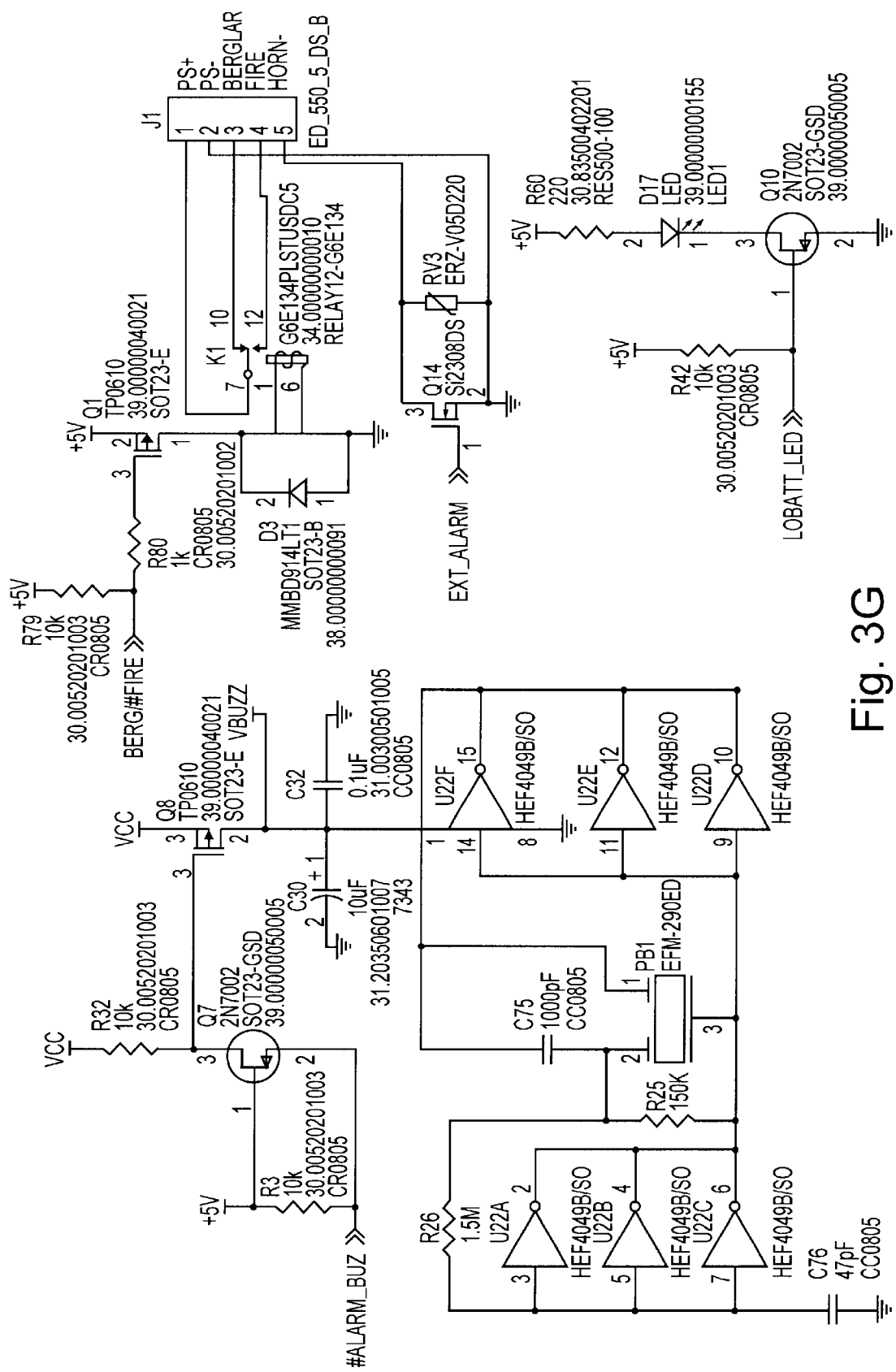
Figure 4:
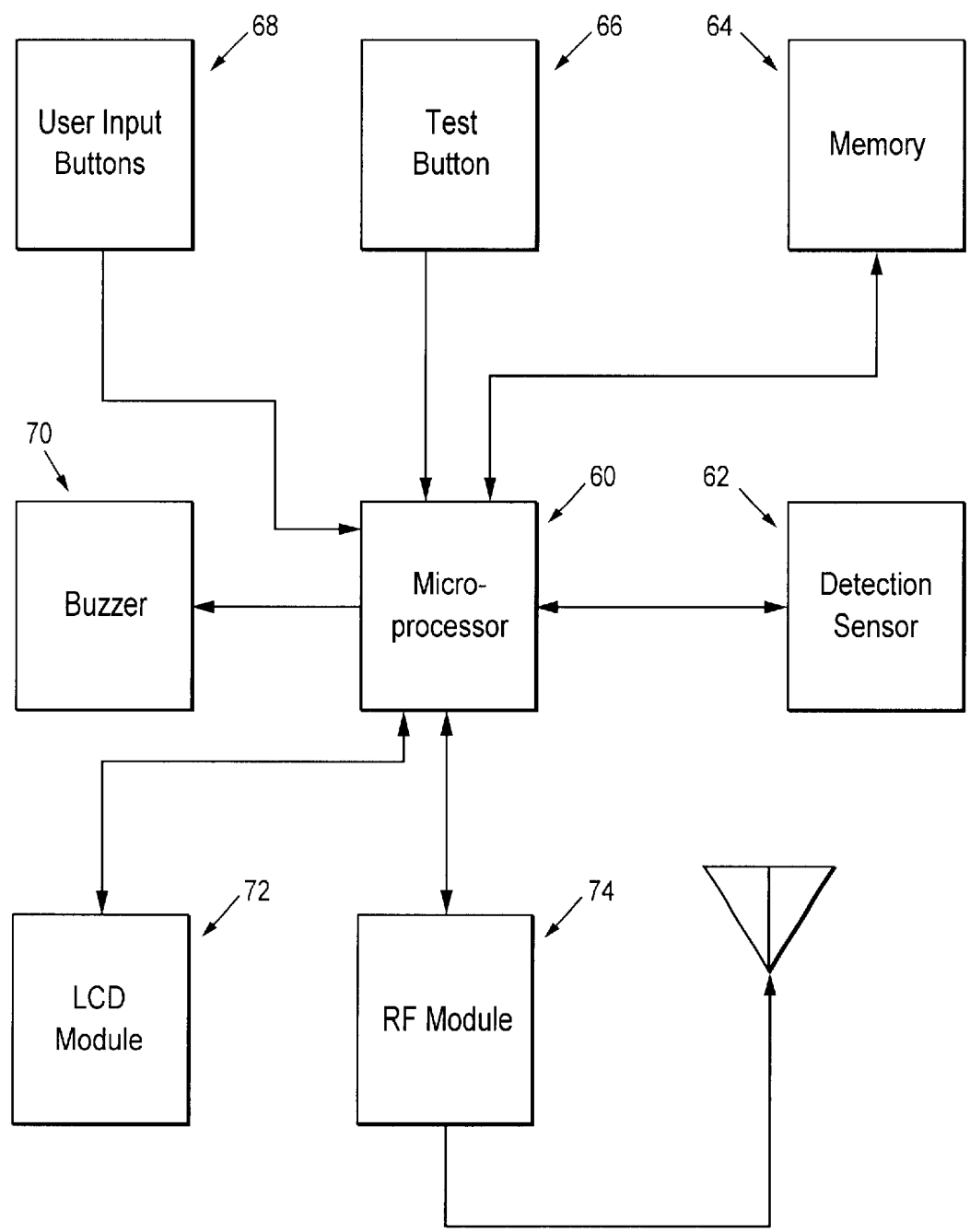
FIG. 4 is a block diagram of the sensors in FIG. 1.

Referring to FIGS. 3C and 3D, there are shown the schematics for the modem. In FIG. 3C, a modem 50, in the form of Rockwell RC224ATF modem chip, is shown. This device is a combination of the Western Digital 8250 UART and a 2400 baud Hayes modem, all on one chip. In FIG. 3D, two telco interfaces, a main telco interface, and an aux telco interface. These interfaces allow the modem to be connected to standard telco POTS (plain old telephone service) lines. Each interface has a hook switch relay which is under modem and program control. Enabling a relay connects that phone line interface to the modem and provides off hook indication to the central office. Referring to FIG. 3E, there is shown the schematics for the power 32 of the command console. Referring to FIG. 3F, there is shown the schematics for the user interface 40, which includes a Wintek WM-C1602M LCD display, eight dual color LED's, each one individually under software control, and is capable of red and green display, one red LED under program control, and one 16 button keypad which indicates key closure by providing a row and column bit map. Referring to FIG. 3G, there is shown one buzzer under program control. In addition, the command console includes an RF receiver, which receives transmissions from the detectors and provides serial data to the processor 42, and an SPDT switch under program control. This switch is connected to jack J1.

As discussed previously, the command console receives sensor input from a plurality of sensors. Referring to FIG. 4A, there is shown a block diagram of the electricity sensor system 24. The electricity sensor system 24 has a microprocessor 60, a detection sensor 62 (which senses the electricity level), a memory device 64 containing the serial number, a test button 66, user input buttons 68, a buzzer 70, an LCD module 72 and an RF module 74.

Referring to FIGS. 4B–4E, there are shown the schematics for the electricity sensor system, including the microprocessor 60 (in FIG. 4B), a memory device 64 containing the serial number (in FIG. 4B), the buzzer 70 (in FIG. 4C), and the LCD module (in FIG. 4C). The electricity sensor system plugs into a wall plug (to monitor a specific critical circuit) and when AC is interrupted, begins a "countdown" process, as programmed by the consumer in minutes and hours. The electricity sensor detects the loss of electricity either on an area circuit (i.e., circuit breaker) or an individual outlet. The consumer may select in hour and five minute increments a predetermined period (e.g., in hours and minutes) when the electricity sensor will activate the alarm. This time period is stored in the memory device 64. The microprocessor then monitors the detection system 62, determining when the detection system 62 indicates whether there is a loss of power. If a loss of power occurs, the microprocessor 60 determines whether the time period for loss of power, as stored in memory device 64, has been exceeded. If this is the case, the microprocessor 60 activates an aural alarm in the form of buzzer 70. In addition, an RF signal is sent to the command console 10 indicating the alarm condition. Additionally, the time period set by the consumer (and stored in memory device 64) for the alarm condition is transmitted so the command center knows how long power has been absent. In an alternative embodiment, the electricity sensor records the time of each power outage and the time of each resumption of power in the memory 64. This information is periodically sent to the command console 10 via the RF module 74. The command console 10 may then record the history of the times and durations of power outages.

Occasionally, the re-establishment of power occurs within the prescribed time set by the consumer. If this occurs, then the electricity sensor system 24 will "reset" itself to the original time and will reenter a waiting condition. In some cases, the re-establishment of power may occur in an intermittent fashion. For example, the consumer may have set the sensor to alarm after 4 hours. Power then goes out for 1 hour 15 minutes. Then power is reestablished for 35 minutes and again, goes out. The microprocessor 60 counts down for 3 hours and 20 minutes and power is again reestablished, for 2 hour and 10 minutes. The system 24 has reset itself upon activation of the AC in each case but, in one case, the power was out at least 75% of the time set by the consumer.

In order to account for intermittent power outages, the electricity sensor is programmed, via the memory 64, to determine whether an intermittent power outage has occurred. For example, if an intermittent power outage has occurred two times in a row where 75% of the time set by the consumer has elapsed, then the electricity sensor system 24 alarms and transmits a signal to the command console 10 which in turn calls the customer service center 12. Alternatively, the command console 10 receives the sensor output from the electricity sensor system periodically. The command console 10 then calculates the intermittent power outages, determining whether to notify the customer service center 12 if the intermittent power outages exceed a predetermined total time. Both the time set by the consumer (in the example, 4 hours), the percentage of time (in the example given 75%), and the number of times (in the example given two times) may be programmed and stored in memory 64, depending on the needs of the system. Alternatively, the consumer may program two numbers: (1) the time of power outage; and (2) the number of times the power outage occurs. In the previous example, the consumer may program the time of power outage to be 3 hours and the number of times the power outage occurs to be two times. Thus, if the power goes out for two times for more than three hours, the processor sends an alarm condition. For additional control, the consumer may program three numbers: (1) the time of power outage; (2) the number of times the power outage occurs; and (3) the time period between outages. In the previous example, the consumer may program the time of power outage to be 3 hours, the number of times the power outage occurs to be two times and the time period to be one day. Thus, if the power goes out for two times for more than three hours in the span of a 24 hour period, the processor sends an alarm condition.

Figures 2, 5A:
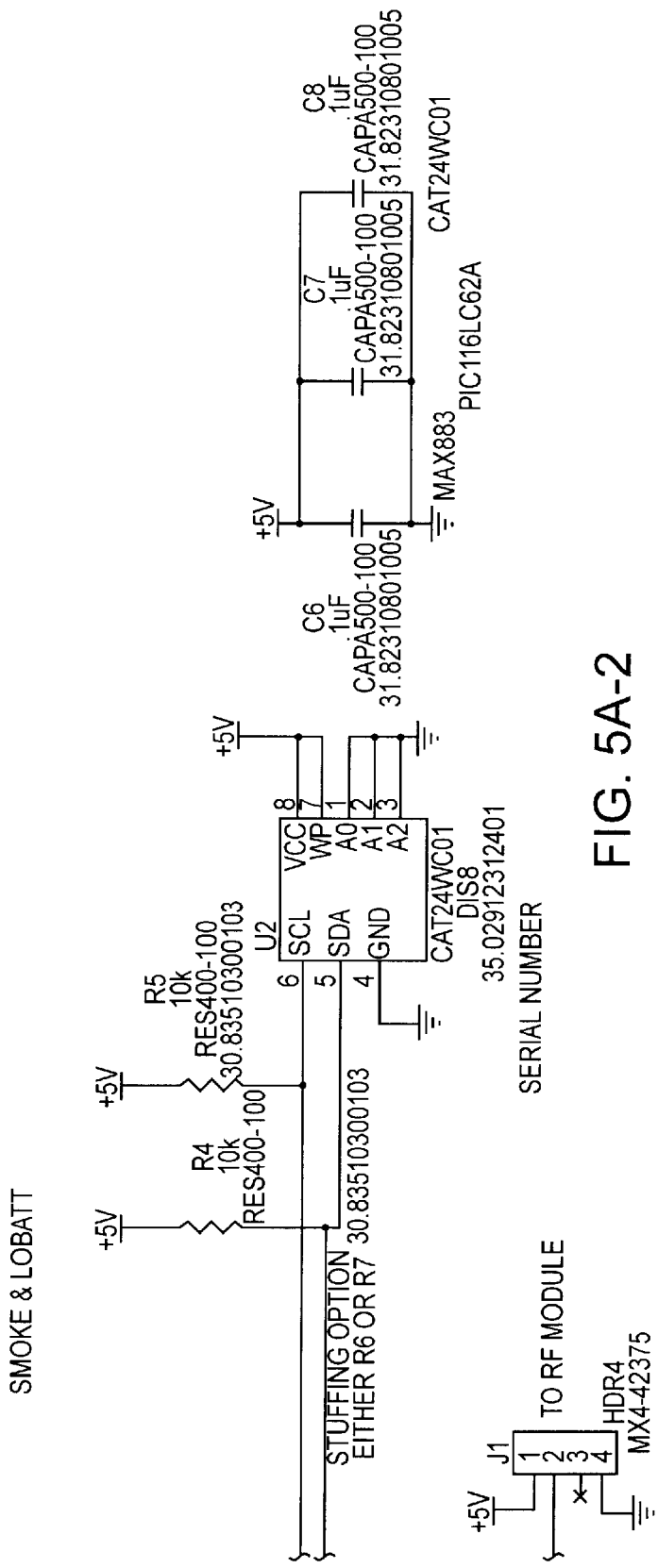
FIGS. 5A–5B are schematics of a smoke detector system in FIG. 1.
Figure 5B:
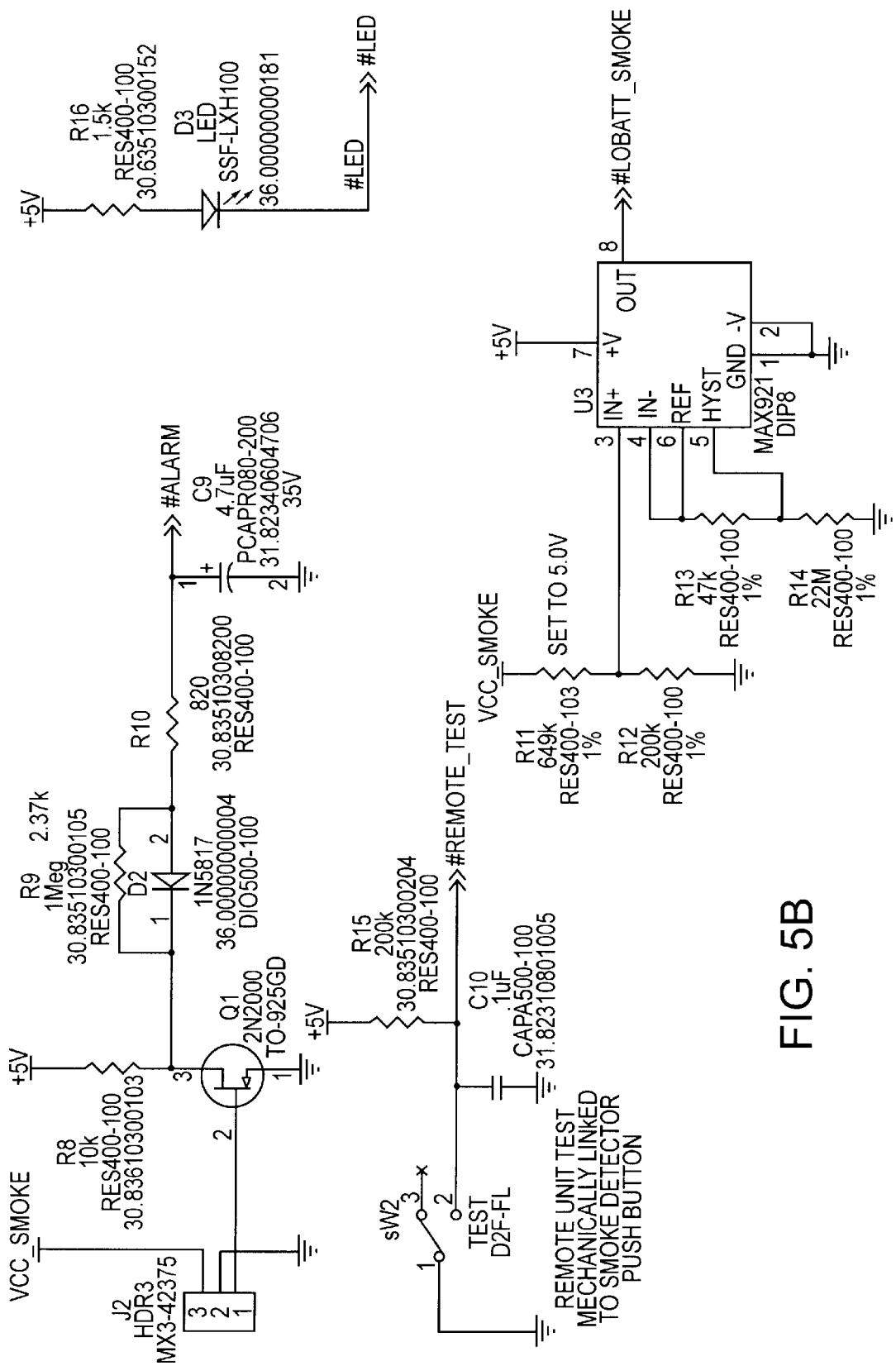

Referring to FIGS. 5A–5C, there are shown the schematics for the smoke alarm system. The smoke alarm assists in determining if smoke particulates are in the surrounding air as generated by a fire (i.e., photoelectric type). Those particulates may be from the result of a fire within the home. The smoke alarm activates when enough particulate is circulated through the air chamber as set forth by UL 217 standards. Both an aural alarm and an RF signal are transmitted upon an alarm condition. The smoke detector is an photoelectric type sensor and is powered by a battery. The smoke alarm uses a traditional 9 VDC battery and the RF transmitter for the smoke alarm uses two 3 VDC batteries.

Figure 6:
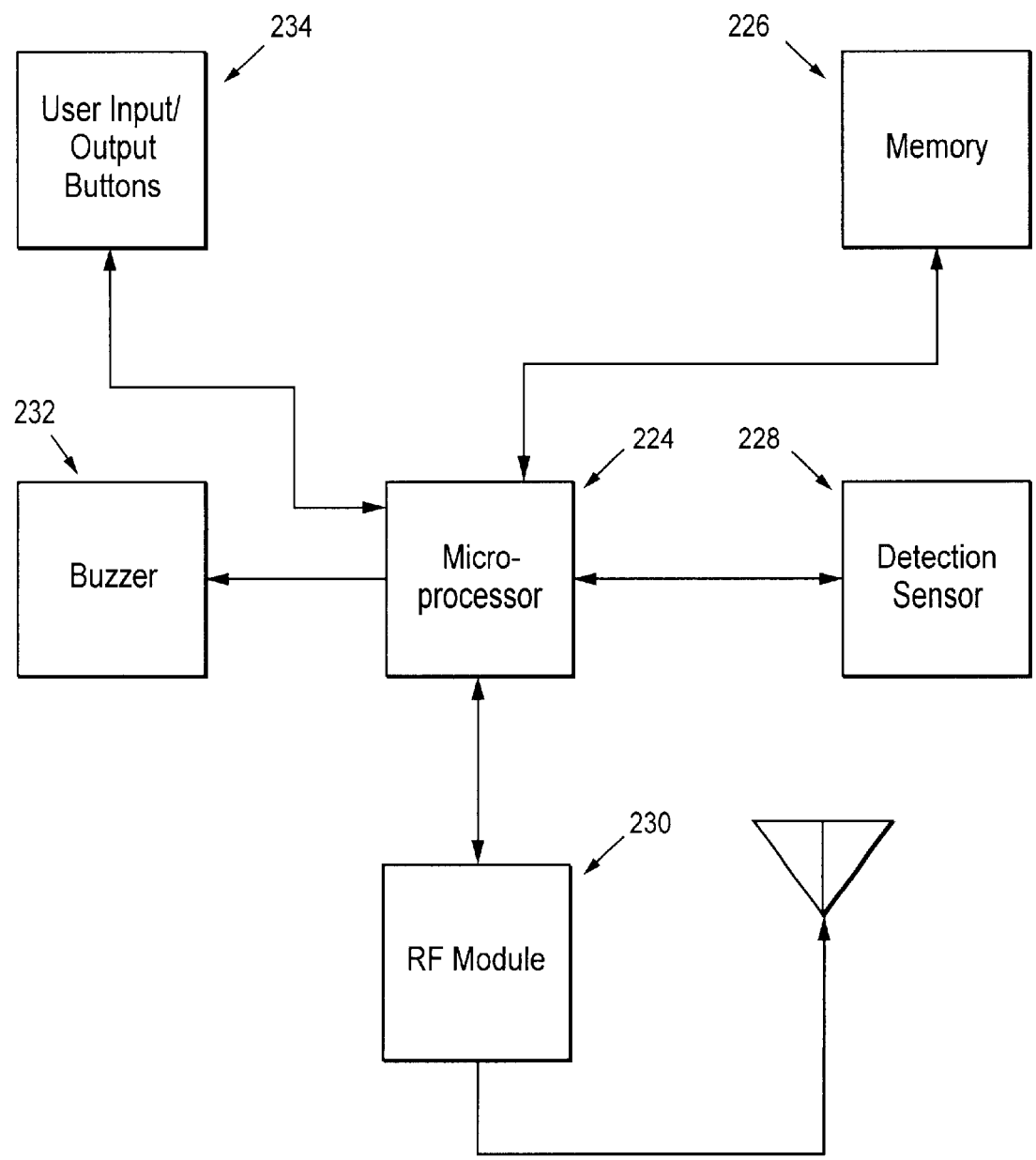
FIG. 6 is a block diagram of a temperature sensor system in FIG. 1.

Referring to FIG. 6, there is shown a block diagram of the temperature sensor system 20. The temperature sensor system 20 senses the ambient temperature of the home assisting the homeowner in determining if the ambient temperature exceeds levels set by the consumer. The temperature sensor system 20 has a microprocessor 224, a detection sensor 228, a memory device 226, a user input/output 234, a buzzer 232, and an RF module 230. The temperature sensor has factory presets for the upper and lower temperature settings. The consumer may set the temperature via the user input/output 234, both high and low, in one degree increments which when reached activates the detection sensor 228 in an alarm condition. The temperature, as set by the consumer, is stored in memory 226. The user input/output 234 in one embodiment may be a control panel with an alphanumeric keyboard and LCD display. The temperature detection sensor 228 uses batteries for power. The sensing of the ambient temperature is used to monitor several aspects of the home. First, the monitoring of the temperature allows a consumer to leave a home for months at a time while still ensuring that the heater, furnace, wood stove or other type of air conditioning system is operating properly. In one embodiment, the detection sensor 228 indicates an alarm condition (i.e., the temperature is outside of the preset limits) to the microprocessor 224, which in turn indicates, via the RF module 230, to the command console 10 of the alarm condition. In an alternative embodiment, the microprocessor 224 receives input from the detection sensor 228 and determines whether there is an alarm condition. Therefore, the temperature can thereby remain in an acceptable range for appliances to operate and for water pipes to avoid bursting. Second, the monitoring of the temperature allows for better prevention of fires. For example, several house fires have been attributed to "thermal runaway" of the home heating system. Often, this "thermal runaway" is due to a broken thermostat. Therefore, the temperature detection sensor 228 may sense the temperature at discrete points, and the microprocessor 224 may determine whether over preset periods of time (which are input via the user input/output 234 and stored in memory 226) whether there are any trends, either upward or downward, in temperature. Based on these trends, the microprocessor 224 may notify the command console 10 of an alarm event. In an alternative embodiment, the command console 10 may receive the data regarding the temperature at discrete points, and calculate the trend analysis itself.

Moreover, the temperature can be monitored in conjunction with other sensors, such as the smoke alarms and the electricity sensor, in order to achieve a symbiotic effect amongst the sensors. For example, if the command console senses a noticeable increase in the temperature of the home, the command console may activate a "heightened sensitivity" for the smoke alarms and/or electricity example (i.e., the amount of particulates necessary to activate the smoke alarm may be reduced in a "heightened sensitivity" mode). In this manner, the command console enables the sensors to act in a symbiotic fashion by complementing the functions of each of the sensors and thereby notifying the command center of an alarm event in advance of normal circumstances.

Figure 7A:
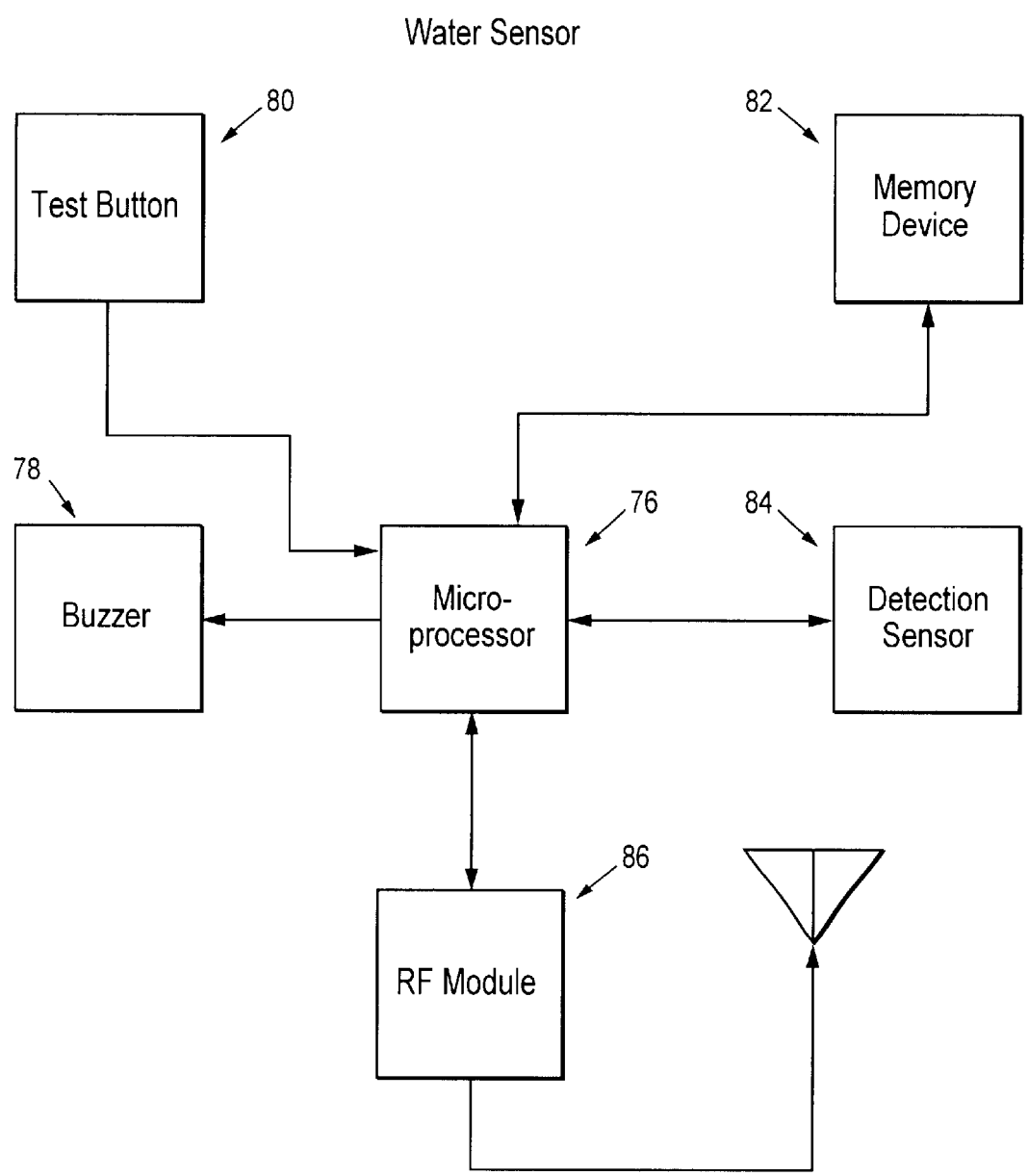
FIG. 7A is a block diagram of a water sensor system in FIG. 1.
Figures 2, 7B:
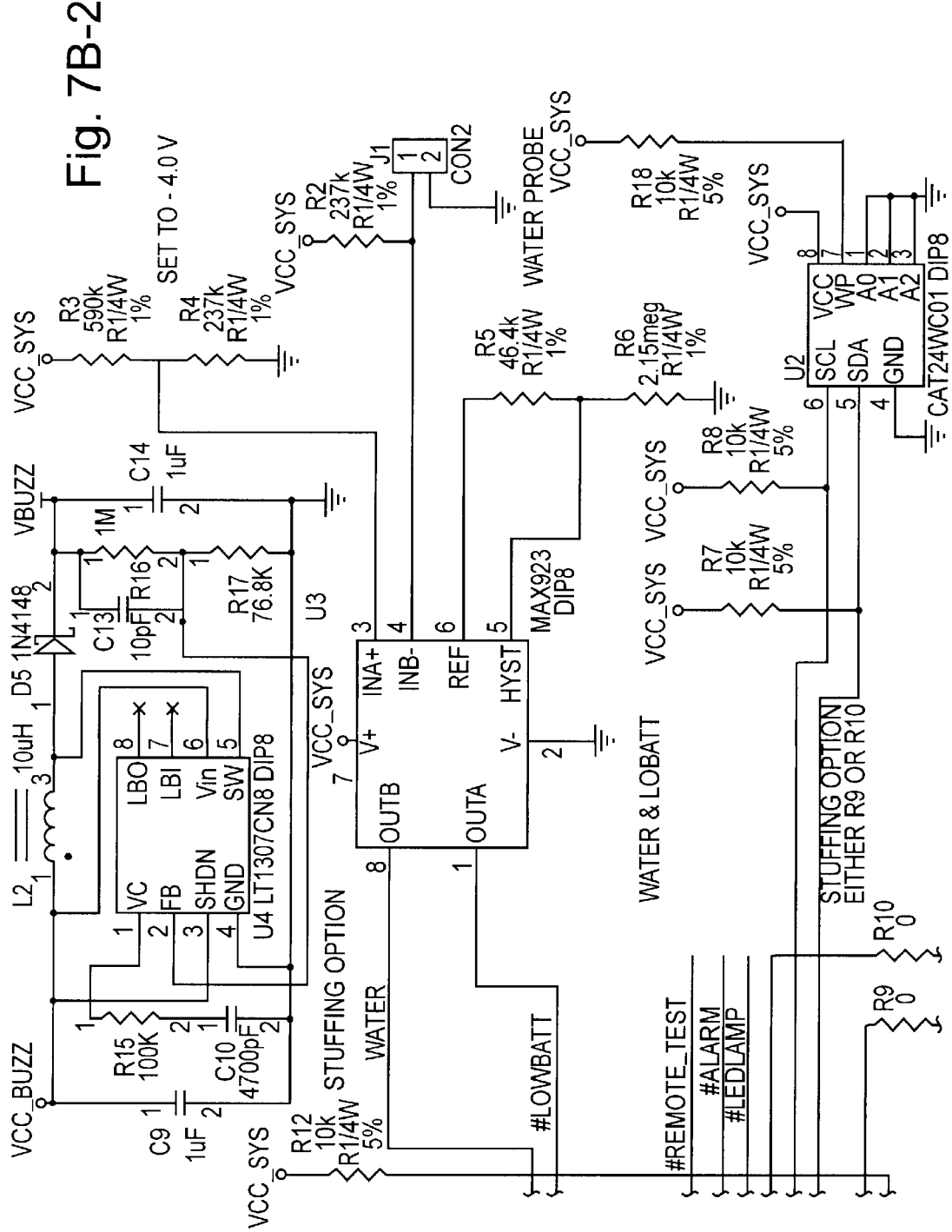
FIG. 7B is a schematic of a water sensor system in FIG. 1.
Figures 3, 7B:
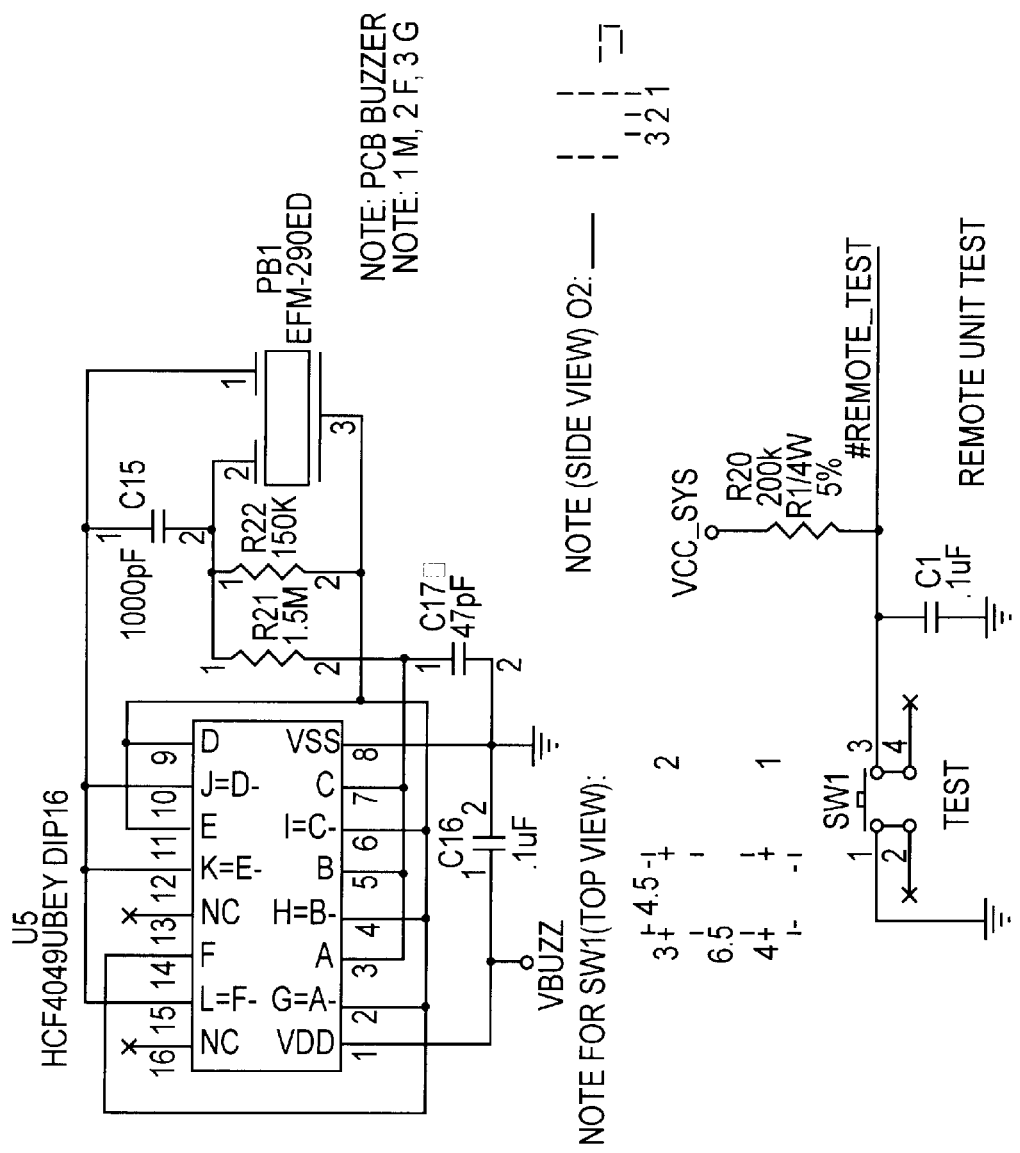
Figures 4, 7B:
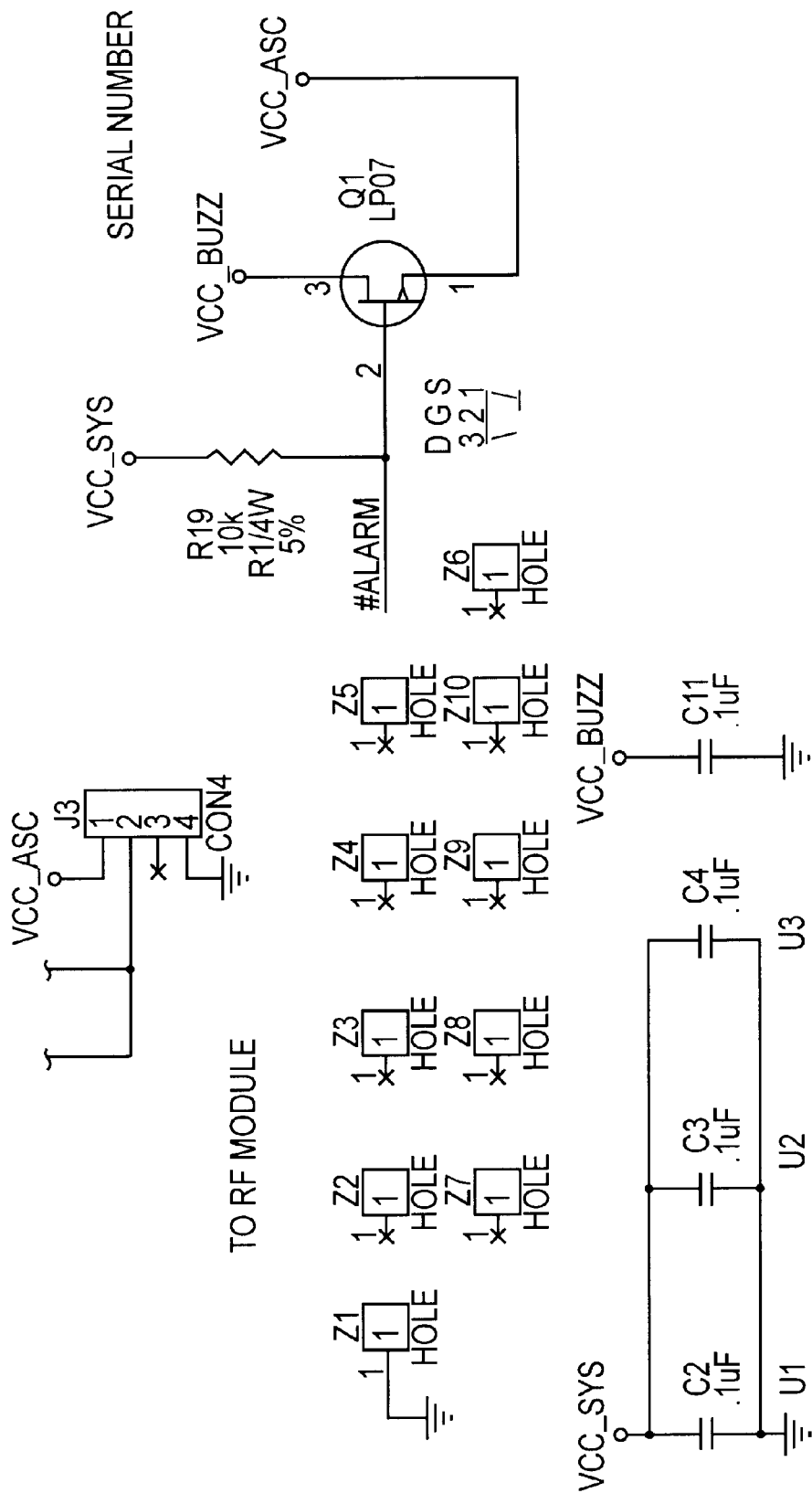

Referring to FIG. 7A, there is shown a block diagram of the water sensor system 22. The water sensor system 22 has a microprocessor 76, a detection sensor 84, a memory device 82 containing the serial number, a test button 80, a buzzer 78, and an RF module 86. The water detector detects unwanted water and may be placed by a sump pump, leaky wall, toilet, water heater, etc. The water detector is positioned by the consumer and "alarms" upon contact with a liquid. The water detector uses batteries for power.

Figure 8:
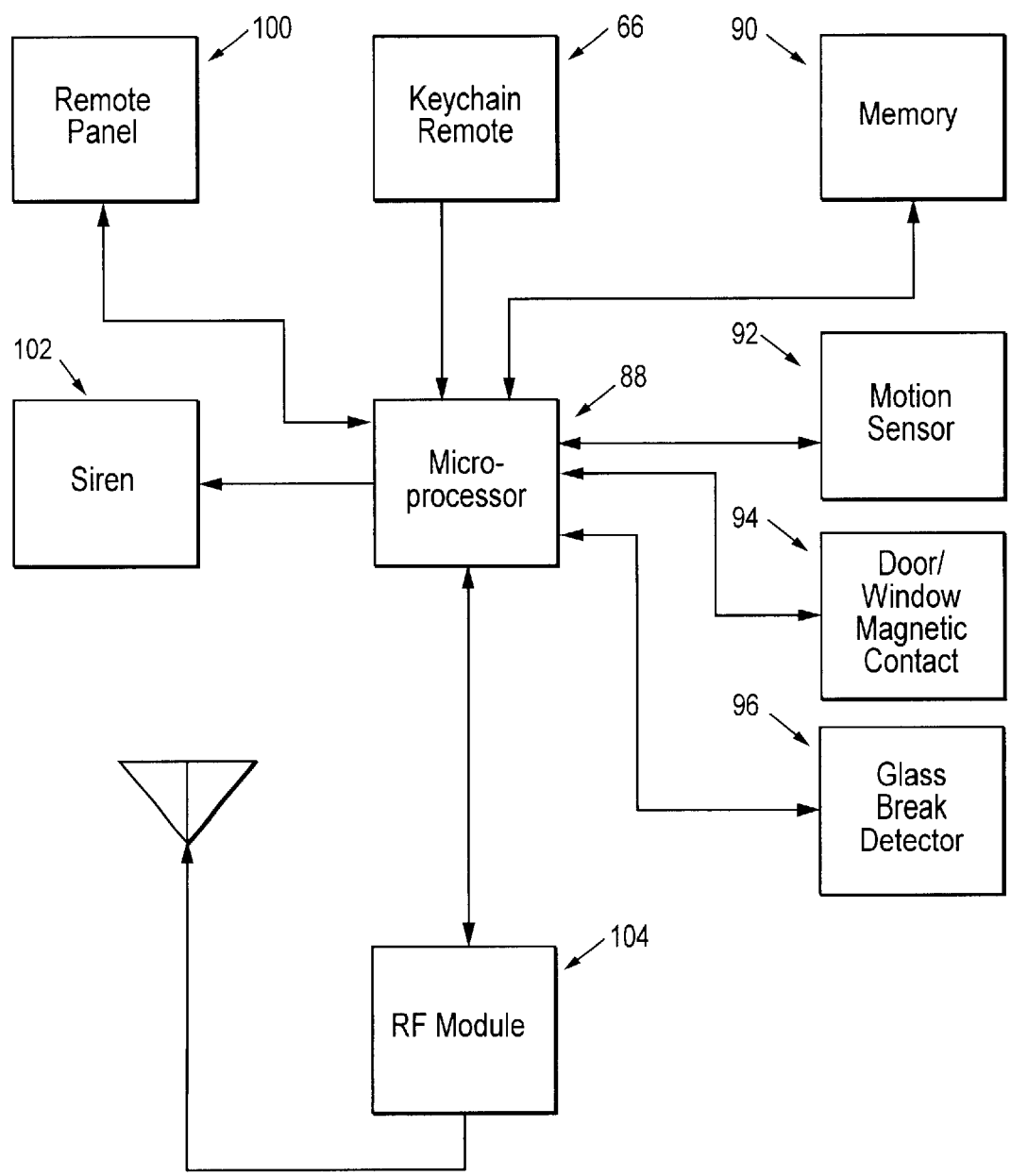
FIG. 8 is a block diagram of a burglar alarm system in FIG. 1.

Referring to FIG. 8, there is shown a block diagram of the burglar alarm system. In one embodiment, the burglar alarm may be comprised of a microprocessor 88, a memory device 90, a motion sensor 92, a door/window magnetic contact sensor 94, glass break detector 96, siren 102, remote panel 100 and a keychain remote 98. The burglar alarm system communicates with the command console 10 via an RF module 104. The motion sensor is passive infrared (P.I.R.) variety. Included in the burglar alarm is a remote panel 100. The remote panel 100 controls the activation/deactivation of the burglar alarm system from a doorway upon which the remote panel 100 is mounted. The remote panel 100 consists of a keypad for entry of a personal identification number (PIN) entry, panic mode buttons as described above (i.e., fire, burglar, and medical) and three modes for selecting the operating states (OFF, ARMED-AWAY and ARMED-HOME). The first operating state (OFF) disables the burglar alarm system. The second operating state (ARMED-AWAY) activates all of the sensors in the burglar alarm system. The third operating state is for when the user is home and wishes to keep certain sections of the house safe from intrusion. In this mode, only motion sensors or magnetic door window detectors 92 that are set to "HOME" at the time of installation will be responded to by the command console 10. However, any break-in from a window or broken glass will activate an alarm mode and the command console 10 will make a call to the customer service center.

A keychain remote 98 provides the user with a convenient means to turn OFF the burglar alarm system or place the burglar alarm system in the ARMED mode. The keychain remote 98 also includes a panic button which sends activates the alarm mode so that the command console contacts the command center. Lastly, the keychain remote has an auxiliary button which will either open or close a garage door equipped with a universal garage door opener.

Ordinarily, motion sensor(s) 92 are installed in a hallway or in a stairwell. When the beam on the motion sensors has been interrupted, the motion sensor 92 will transmit an RF signal via the RF Module 104 to the command console 10. The motion sensor 92 has a selectable switch which controls the operation of the sensor. The motion sensor has a selectable switch that arms the sensor in the ARMED mode or the ARMED-HOME mode. The first setting is for areas which the resident uses year-round so that, when the system is in the ARMED HOME mode, the motion sensor 92 does not activate the burglar alarm system. The second setting is for a three seasons room whereby the room is not used for most of the year, yet protection is desired. Therefore, even when the resident is at home and the burglar alarm system is in the ARMED HOME mode, the motion sensor in the three seasons room is armed.

The switch modifies the operation of the motion sensor 92 so that, when the motion sensor 92 is triggered, the motion sensor 92 sends an RF signal to the command console. Included in that RF signal is the setting of the switch so that, based on the setting of the switch, the command console can interpret the RF signal for proper handling. Alternatively, based on the setting of the switch, the motion sensor will determine whether to send an RF signal to the command console.

For the door/window magnetic contact sensor 94, a break of the magnets will force a call by command console 10 to the command center. The magnetic door/window sensor has a selectable switch that arms the sensor in the ARMED mode or the ARMED-HOME mode. The first setting is for areas which the resident uses year-round so that when the system is in the ARMED-HOME mode, the magnetic door/window sensor 94 does not activate the burglar alarm system. The second setting is for a three seasons room whereby the room is not used for most of the year, yet protection is desired. Therefore, even when the resident is at home and the burglar alarm system is in the ARMED-HOME mode, the magnetic door/window sensor 94 in the three seasons room is armed. When glass is broken, the glass break detector 96 will activate and force a call by the command console 10 to the command center. The modes of the system (OFF, ARMED, ARMED HOME or PANIC) are set either through the command console, the remote panel or the keychain transmitter. Further, all of the burglar alarm sensors are powered by battery. Specifically, the motion sensor 92, glass break detector 96 and magnetic door/window sensors 94 are powered by alkalinebatteries and the remote panel 100 is powered by AA batteries.

Figure 9:
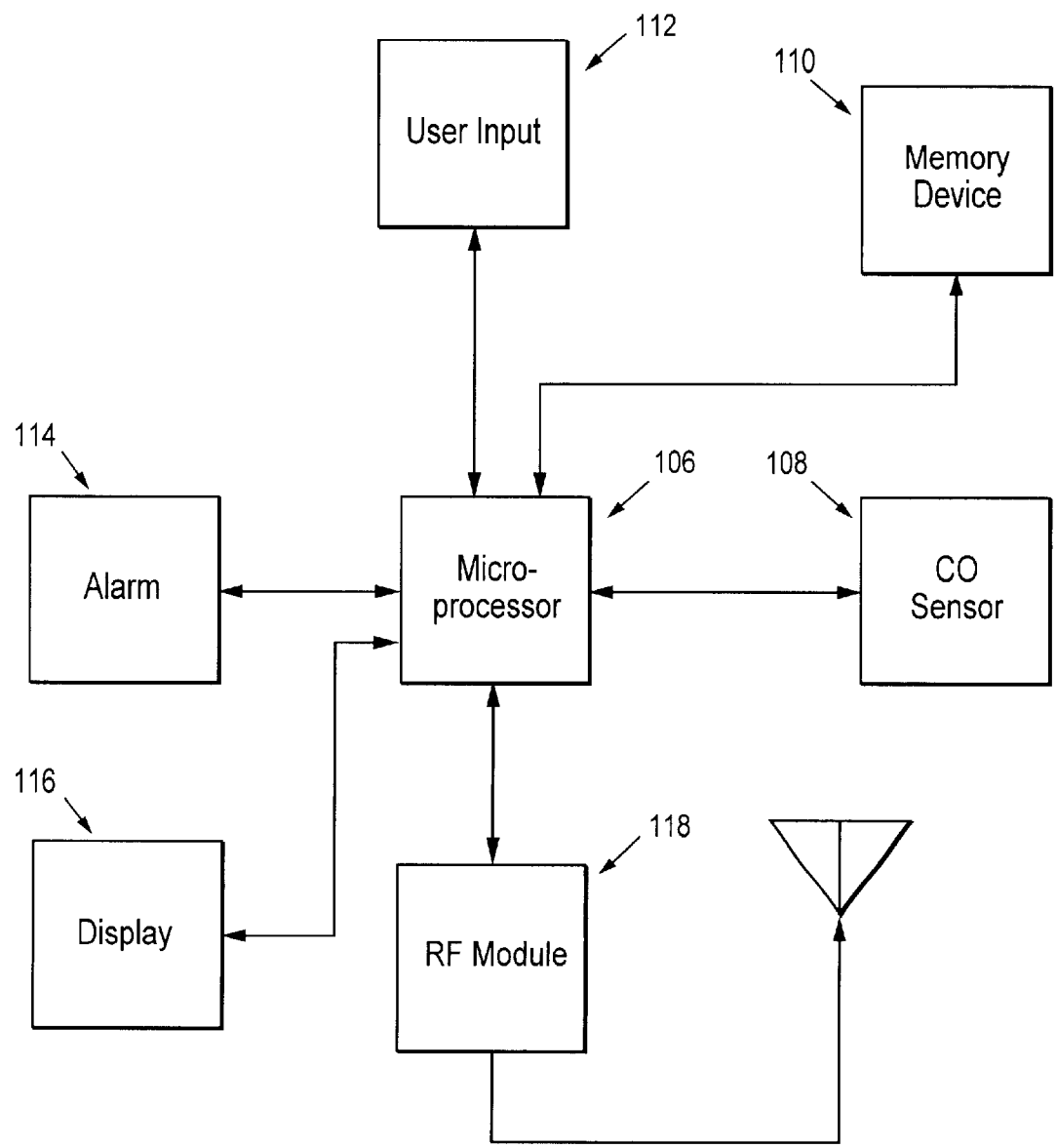
FIG. 9 is a block diagram of a carbon monoxide system in FIG. 1.

Referring to FIG. 9, there is shown a block diagram of the carbon monoxide sensor system including the microprocessor 106, CO detection sensor 108, memory 110, user input 112, alarm 114, display 116 and RF Module. The CO (carbon monoxide) detector 108 samples the air on a periodic basis to detect levels of CO that could indicate a dangerous air state to occupants. The CO sensor 108 provides two types of output to the processor 106 which in turn notifies the command console 10 via the RF Module 118. The first output indicates an immediate warning condition whereby the CO sensor senses that the CO levels are currently above an acceptable level. For example, the CO sensor activates, sending an RF signal to the command console, when the CO gas concentration as measured in PPM (parts per million) has reached 100 PPM, as proscribed by UL 2034 (or any other concentration, as set through the user input 112). The second output indicates the current status of the CO sensor. The CO sensor reports to the command console in a "supervised" manner whereby the CO sensor periodically sends its output to the command console, which stores the output in a look-up table 47 describes previously. For example, the command console will track, on an hourly, daily, weekly, monthly or any other periodic basis, the highest level of CO in PPM. The command console then transmits that information to the command center on periodic basis, either hourly, daily, weekly, monthly or any other period. Moreover, the command console can display the periodic CO sensor output on the LCD display. The command console may also perform a trend analysis whereby the CO sensor output is analyzed to determine whether there is an upward, downward, or flat trend in terms of the CO output. If the trend is upward, and the slope of the trend is greater than a predetermined amount (i.e., fitting a line to the discrete data points for the CO sensor output and determining a slope for the fitted line), then the command center is notified of this upward trend. The CO sensor uses 110 VAC as its power source. Alternatively, the CO sensor system may perform the trend analysis itself In particular, the discrete data points from the CO sensor 108 may be stored in memory 110. The microprocessor 106 may perform the trend analysis of the CO sensor discrete data points and notify the command console 10 of an upward trend.

Figure 10:
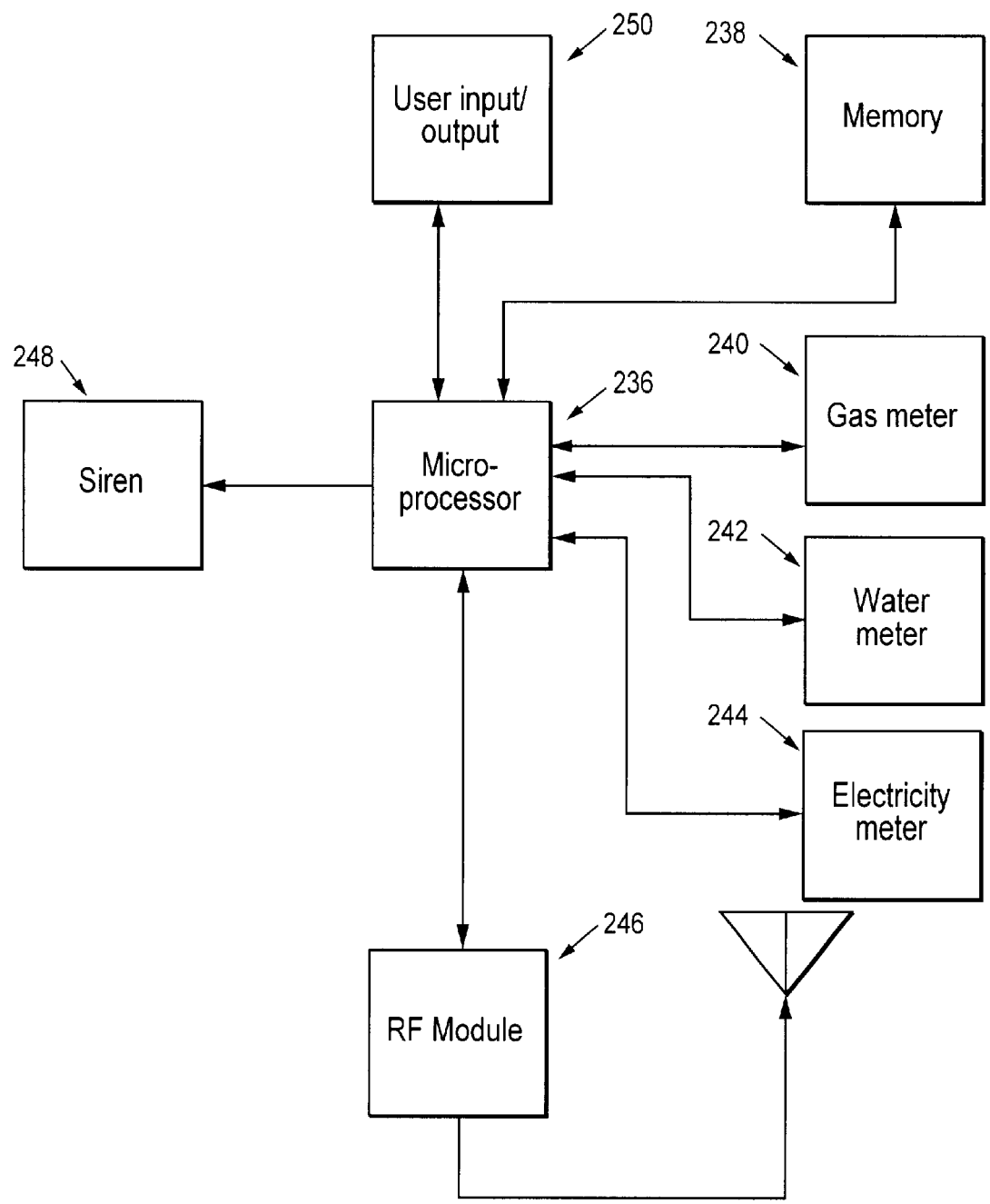
FIG. 10 is a block diagram of gas, water and electricity systems of FIG. 1.

Referring to FIG. 10, there is shown a block diagram of the meter sensor systems including the gas meter, electricity meter and water meter. The meters sensor systems monitor meters which are typically used in gas, electric or water companies. The meters calculate the amount of gas, electricity or water which has been used. The meter sensor systems 21, 23, 25 have a microprocessor 236, a gas meter 240, a water meter 242, a electricity meter 244, a memory device 238, a user input/output 250, a buzzer 248, and an RF module 246. The meters 240, 242, 244 may be in communication with microprocessor 236 by hardwiring or by wireless communication. In addition, memory 238 is programmed with the time period in which each of the meters is read so that the microprocessor can periodically reads the gas meter 240, water meter 242, and electricity meter 244 at specified intervals. For example, the electricity meter may be read once every month while the water meter may be read once every three months. Therefore, the microprocessor 236 may receive reading(s) from any of the meters 240, 242, 244 and store the readings in a look-up table in memory 238. The readings may thereafter be transmitted to the readings to the command console 10 via the RF module 246. Alternatively, the readings from any of the meters 240, 242, 244 may be stored in a look-up table in memory 45. The look-up table may therefore contain a history of the readings of the gas meter 240, water meter 242 or electricity meter 244. The command console may then send the reading(s) with a central station for processing via a variety of means as discussed above. In this manner, there is no need for someone to physically read the meters.

In an alternative embodiment, the microprocessor 236 analyzes the readings from the meters 240, 242, 244 in order to determine whether there is proper operation of the system. For example, the microprocessor 236 analyzes the data from electricity meter 244 on a periodic basis in order to determine whether there are any spikes in the readings from the electricity meter 244. The processor 235, in one embodiment, may compare the readings from the electricity meter with a predetermined value from the look-up table in memory 238. If the reading is greater than the predetermined value, a spike has occurred. Alternatively, a spike may be defined as a jump of a predefined percentage over a certain period of time. For example, if the readings indicate that the electrical output for the electricity meter increases by 200% in a period of a few minutes, this may be considered a spike in the output. If there are spikes in the readings, the microprocessor 236 can immediately notify the command console 10 via the RF module 246. The command console 10 may in turn immediately notify the central station. Alternatively, the processor 42 in the command console may analyze the data from the meters to determine whether there is any spikes in the readings from the electricity meter 244.

In addition, the processor 236 may analyze the readings from the gas meter 240 in order to determine whether there is a gas leak. In one embodiment, the processor may analyze the readings of the gas meter to determine whether the readings of the gas meter indicate a gas leak. In an alternative embodiment, the microprocessor may work in combination with a methane or propane gas detector (fume detector). Once the microprocessor 236 detects a gas leak, the microprocessor 236 can immediately notify the command console 10 via the RF module 246. The command console 10 may in turn immediately notify the central station.

Alternatively, the readings from the gas meter 240, water meter 242, and electricity meter 244 may be processed in conjunction with other readings from the plurality of sensors in order to achieve a symbiotic effect. For example, the output from the electricity meter may analyzed in combination with the output for the electricity sensor so that if the electricity sensor indicates that there is a power outage in a particular circuit, the electricity meter may confirm that power is indeed not being consumed by the entire house.

Attached at Appendix A is the code for the command console which is written in C assembler for the Dallas Semiconductor DS87C530 microprocessor, which is hereby incorporated by reference. After a power reset, the Boot Rom Code, which is resident in ROM 46, performs various initialization functions, and thereafter starts the application program.

As described previously, the command console 10 includes several means for communicating with the customer service center, including via a modem. The modem driver contains code which can be used to send and receive data over the Rockwell modem chip. Before data can be sent, the modem circuit must first be powered up, and a phone connection established with the customer service center. System services, or subroutines, are provided to do these things. The dial service will use pulse or DTMF dialing depending on the system configuration. The dialing type can be changed by a system service. The dial service can also be configured to dial a single digit prefix in case the modem is connected to a PBX and needs to dial a special digit (e.g., 9) to get an outside line.

The RF receiver receives serial data transmitted from the sensors. The data is transmitted at 1200 baud, 8 data bits, 1 stop bit. In an alternative embodiment, the RF receiver may receive data in parallel. The Boot Rom Code contains a driver to receive and buffer data from the sensors. System services are provided which allow the application to determine if data is available and to fetch the data one character at a time if there is data available.

Subroutines which control the RF receiver include (1) powering up and initializing for input; (2) powering down; (3) checking if there is any input data available from the RF receiver; and (4) clearing the sync character received flag (which appears at the start of a data packet and is used to identify the start of a packet from received noise). The handler sets the sync received flag once the sync character is received. The flag stays set until this service is called.

One function of the command console 10 is to forward alarm and status information to the customer service center. This is done via a dial-up phone line which connects the command console to a central computer at the customer service center. In a preferred embodiment, the command console and customer service center communicate using a proprietary communications protocol. The communications protocol follows these general rules:

1) The command console acts as a master, the customer service center as a slave. This means a message transaction consists of a transmission initiated by the command console which elicits a response from the customer service center.
2) Communications can only be established by the command console calling the customer service center. The customer service center cannot call the command console.
3) When the command console transmits a message, it shall send each byte within 15 seconds of the previous byte. If a timeout occurs, the customer service center shall send a NAK message.
4) When the customer service center receives a message from the customer service center, the customer service center shall send the response within 15 seconds, and shall send each character within 15 seconds of the previous character.

5) If there is a timeout while receiving a response from the customer service center, the command console shall transmit the message again. The command console shall send a message up to three times. If no valid response is received after the third try, the command console shall terminate the connection unless the command console is processing an alarm condition.

6) The length of all messages must be ascertainable by the command code and/or a length byte in the message data.

When communicating with the customer service center, there are several message types which the command console uses. The first is the sign-on message. Whenever the command console dials in to the customer service center, it must send this message before doing anything else. It identifies the specific command console to the customer service center. If the command console sends any other type of message prior to sending the sign-on, the customer service center shall treat it as an invalid message. The format of this message includes the serial number of the specific command console, which is burned into the Boot Rom Code EPROM during the manufacturing process.

Another message from the command console is a download message. The purpose of this message is to command the customer service center to download the application software to the command console. In this manner, the command console may continuously receive the latest applications software.

Another command from the command console is to allow the customer service center to send its unsolicited messages to the command console. Since the customer service center is the slave, it is not allowed to initiate any unsolicited message to the customer service center. It is only allowed to respond to commands from the command console. Therefore, if the customer service center wants to send a message, it must wait for a command from the command console.

Another command demands nothing of the customer service center except that the customer service center send an acknowledge. This command can be used for idle polling the customer service center, or to see if the customer service center has any data messages to send to the command console.

Another message sent from the command console is to acknowledge receipt of a data message from the customer service center. The customer service center is to respond with an acknowledge message. When the customer service center sends a data message, it must receive an acknowledge data message from the command console. If any other message is received, the customer service center shall assume the data message was never received and attempt to send it again.

An additional message is a signoff message when the command console wishes to terminate the connection. The customer service center is to respond with an acknowledge message. However, if there is a communication failure, the command console will terminate the connection anyway rather than retransmit the message.

The command console may also forward data from a sensor to the customer service center. Fields in this message include (1) the alarm type (i.e., the reason that the message is being sent: 'A'— Alarm condition; 'M'— Missing alarm (no check in messages received); and 'T'— Test & Registration message was received); (2) the index (The alarm number assigned to the sensor when the sensor is configured and registered with the command console); (3) the sensor type & revision; and (4) the sensor serial number.

Messages are also sent from the customer service center to the command console including (1) acknowledge (the customer service center sends this message in response to commands from the command console. It indicates that the customer service center received the command successfully.); (2) acknowledge with data request (the customer service center sends this message to acknowledge successful receipt of a command from the command console. In addition, the customer service center is informing the command console that it would like to send data.); (3) terminate connection (the customer service center sends this message to acknowledge successful receipt of a command from the command console and further demands that the data connection be dropped); (4) request retransmission (the customer service center received a garbled command and is requesting that the command console retransmit the last command); and (5) data message (this is a data message from the customer service center. It is sent only in response to a Request customer service center Data command).

As previously described, the sensors transmit data via an RF link to the command console. There are various reasons a sensor may transmit data In one embodiment, the sensors are not capable of receiving data, and only capable of sending data. In an alternative embodiment, the sensors both send and receive data. All sensors transmit on the same frequency. This means that there may be collisions when sensors transmit. In the embodiment where the sensors only send data, the sensor does not know if a message is successfully received by the command console. To avoid these problems, when a sensor sends a message, it will always transmit it three times with a random interval between 2 and 6 seconds between transmissions. However, if the sensor is in an alarm mode, the sensor transmits indefinitely, or until the sensor is no longer in an alarm condition. The format of a sensor message includes: the number of bytes in the message; the module type & revision (the low nibble contains the module revision. The upper nibble has the module type, e.g., Smoke detector, Carbon monoxide detector, Burglar sensor, Temperature sensor, Water sensor, Electricity sensor); the serial number; the sensor status (including a message that the sensor has a low battery, the test & registration message, a four hour check in message, and an alarm message) and the sensor type dependent data (e.g., if this is a temperature sensor, this byte contains the temperature, if this is an electricity sensor, this byte contains the number of times the electricity has been out).

Figure 11:
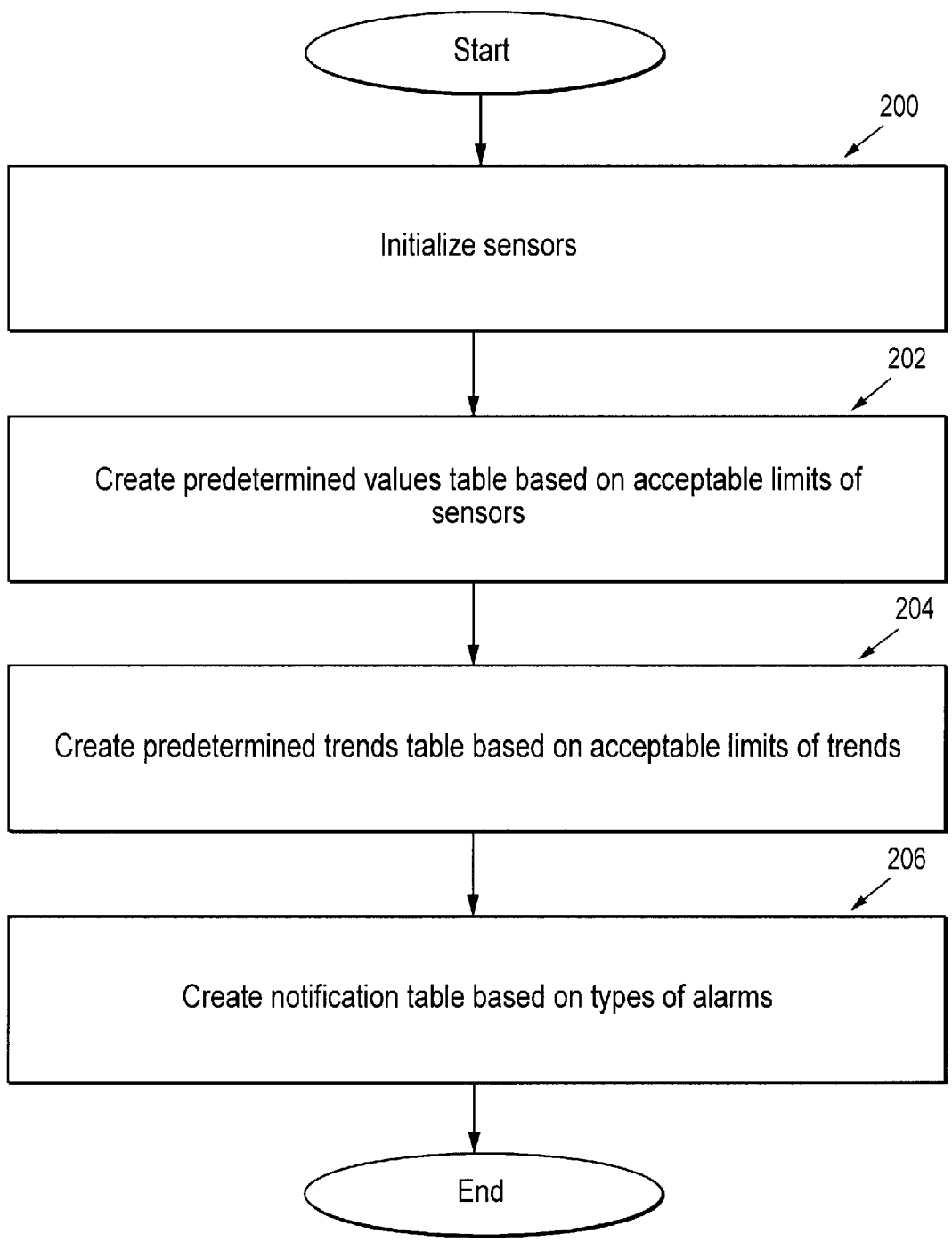
FIG. 11 is a flow chart of the initialization routine for the home monitoring system.

Referring to FIG. 11, there is shown a flow chart of the initialization routine for the home monitoring system. As show at block 200, the sensors are initialized. This may be done in several ways including programming the sensors (such as the burglar alarm sensors, carbon monoxide (CO) detector; electricity alarm, smoke alarm, temperature sensor and water detector) manually at the sensor, programming the command console and sending the initialized values to the sensors via the communication with sensors, as shown at block 38 of FIG. 2. The initialization of the sensors includes calibrating the sensors for proper operation. The predetermined values table is also created based on the acceptable limits of the sensor, as shown at block 202. For example, the temperature sensor senses the temperature of the ambient air. The operator may choose that the acceptable limits of the temperature sensor is from 55° C. to 85° C. These values are considered "predetermined values" which are put in a table in order to compare with the real-time sensor values. The table may reside in the memory 45 of the command console 10. Or, the predetermined values may reside in a table in each of the sensors. For example, for the electricity sensor, the predetermined values table may reside in memory 64. As described subsequently, if the real-time sensor values are outside the predetermined values, an alarm should be sounded.

In addition, the predetermined trends table is created based on the acceptable limits of the sensors, as shown at block 204. Similar to the predetermined values table, the predetermined trends table is based on the acceptable limits of the trends in the sensors for acceptable periods of time. For example, for the carbon monoxide sensor, if the PPM count is steadily increasing over the course of several hours (or several days, depending on operator preference), this indicates a trend of sufficient time to indicate that an alarm should be triggered. Determining whether there is a trend in a sensor's readings involves for example, fitting a line to the data points from the sensor's readings and determining the slope of the fitted line. Other examples include fitting a higher-order mathematical function to the data points of the sensor readings to determine the trend of the readings.

Moreover, a notification table is created based on the types of alarms which are triggered, as shown at block 206. Depending on the type of alarm and the time of triggering of the alarm, different persons may be notified. In particular, the notification table may have different phone numbers for different times of the year. For example, if the alarm is triggered based on the water sensor and if the home monitoring system is in a summer home, two phone numbers are provided, one for when the alarm is triggered in winter and one for when the alarm is triggered in summer. This notification may take the form of an automated phone call or an electronic mail message.

Figure 12:
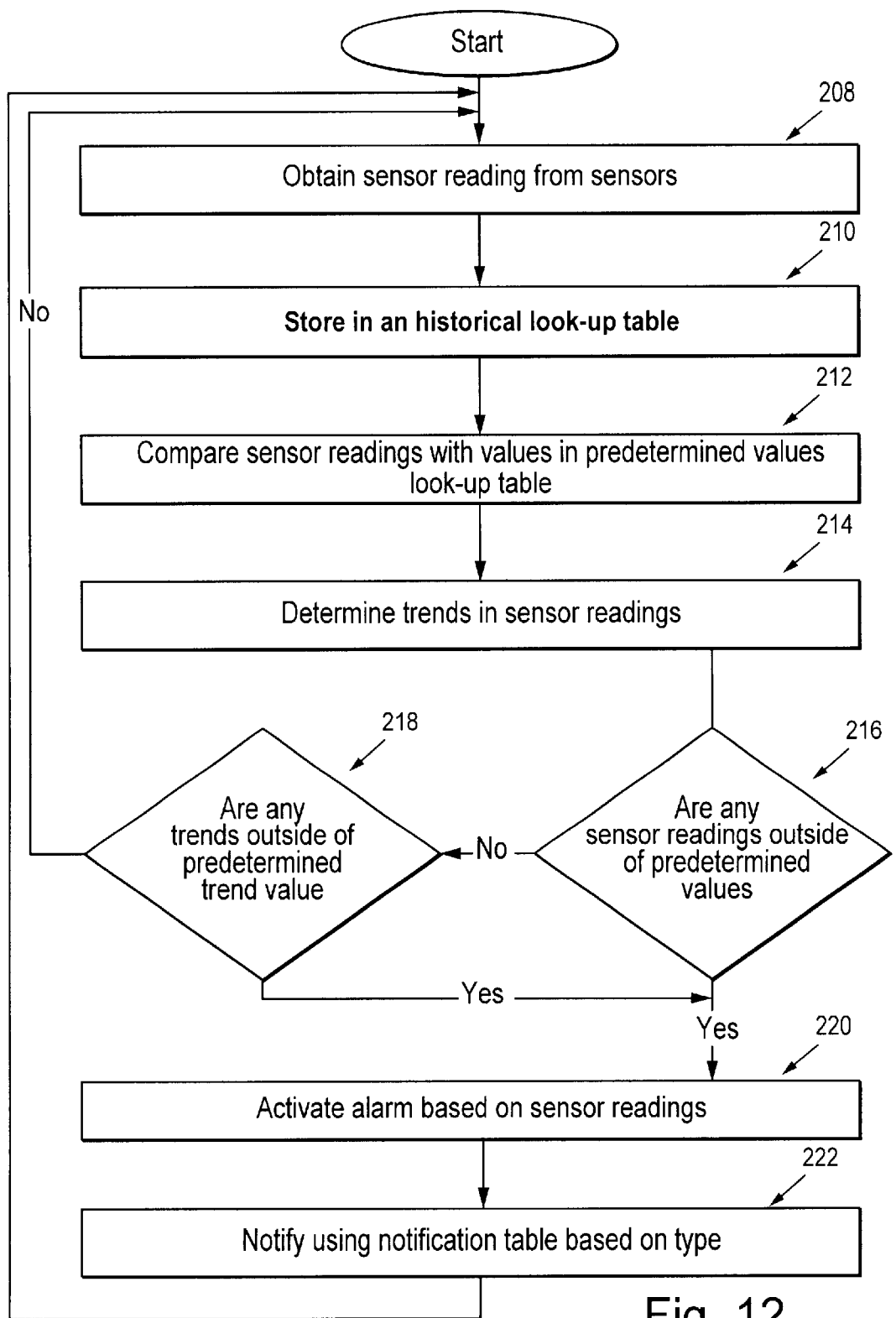
FIG. 12 is a flow chart of the monitoring routine for the home monitoring system.

Referring to FIG. 12, there is shown a flow chart of the monitoring routine for the home monitoring system. The sensor readings are obtained from the sensors, as shown at block 208. For example, the microprocessor 60 periodically reads the sensor readings for the electricity sensor 62. Likewise, the microprocessor 76 periodically reads the sensor readings for the water sensor 84. Thereafter, the reading is stored in a historical look-up table, as shown at block 210. The historical look-up may be resident in memory 45 in the command console 10. If that is the case, the sensor readings are transmitted periodically (either with one sensor reading sent every transmission or with several sensor readings sent during a transmission). In an alternative embodiment, the historical look-up table may be resident in the sensor systems. For example, in the case of the electricity sensor system, memory 64 may include the historical look-up table.

The sensor readings are compared with values in the predetermined values look-up table, as shown at block 212. This comparison may be done at the sensor system if the predetermined values and sensor readings are stored at the sensor system. For example, if memory 64, for the electricity sensor stores both the predetermined values and the sensor readings, the microprocessor 60 may compare the values. Alternatively, the processor 42 in the command console may compare the two values if the command console stores both the predetermined values and the sensor readings. The trends are also determined based on the sensor readings, as shown at block 214. As discussed previously, the trends may be calculated in a variety of ways in order to determine whether the sensor readings indicate a generate movement of the system. This calculation may be performed either at the sensor system or at the command console. For example, if the electricity sensor stores the sensor readings in a historical look-up table in memory 64, microprocessor 60 may calculate the trends, either upward, downward or flat, based on the sensor readings.

Depending on the comparison, it is determined whether any of the sensor readings are outside of the predetermined values, as shown at block 216. Likewise, it is determined whether there are any trends which are outside of the predetermined trends values. If either condition is satisfied, then the home monitoring system has sensed an alarm condition, and the alarm should be activated, as shown at block 220. Different types of alarms may be activated (aural, visual, etc.) depending on the sensor that triggered the alarm condition. In addition, parties are notified of the alarm condition based on the type of alarm, depending on the notification look-up table, as shown at block 222. If no alarm conditions are present, sensor readings are again obtained from the sensors, as shown at block 208.

Figure 13A:
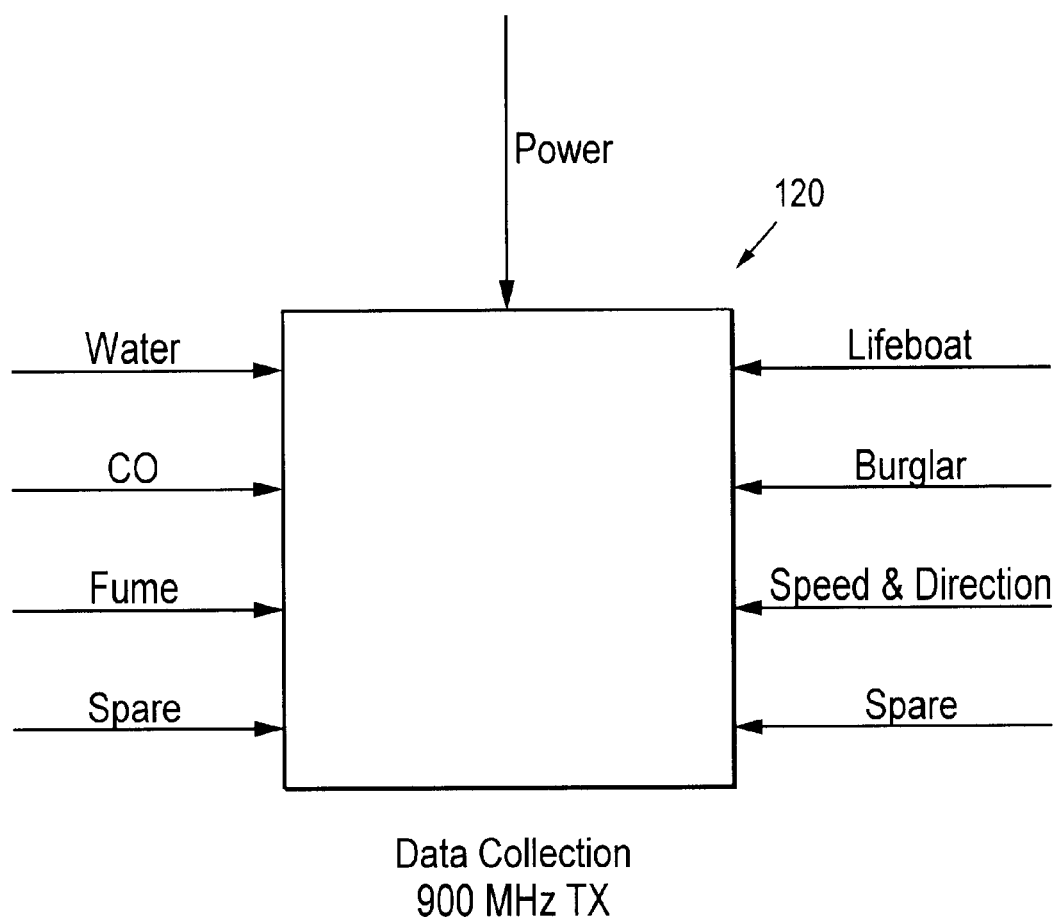
FIG. 13a is a block diagram of a command console in a boat configuration.
Figure 13B:
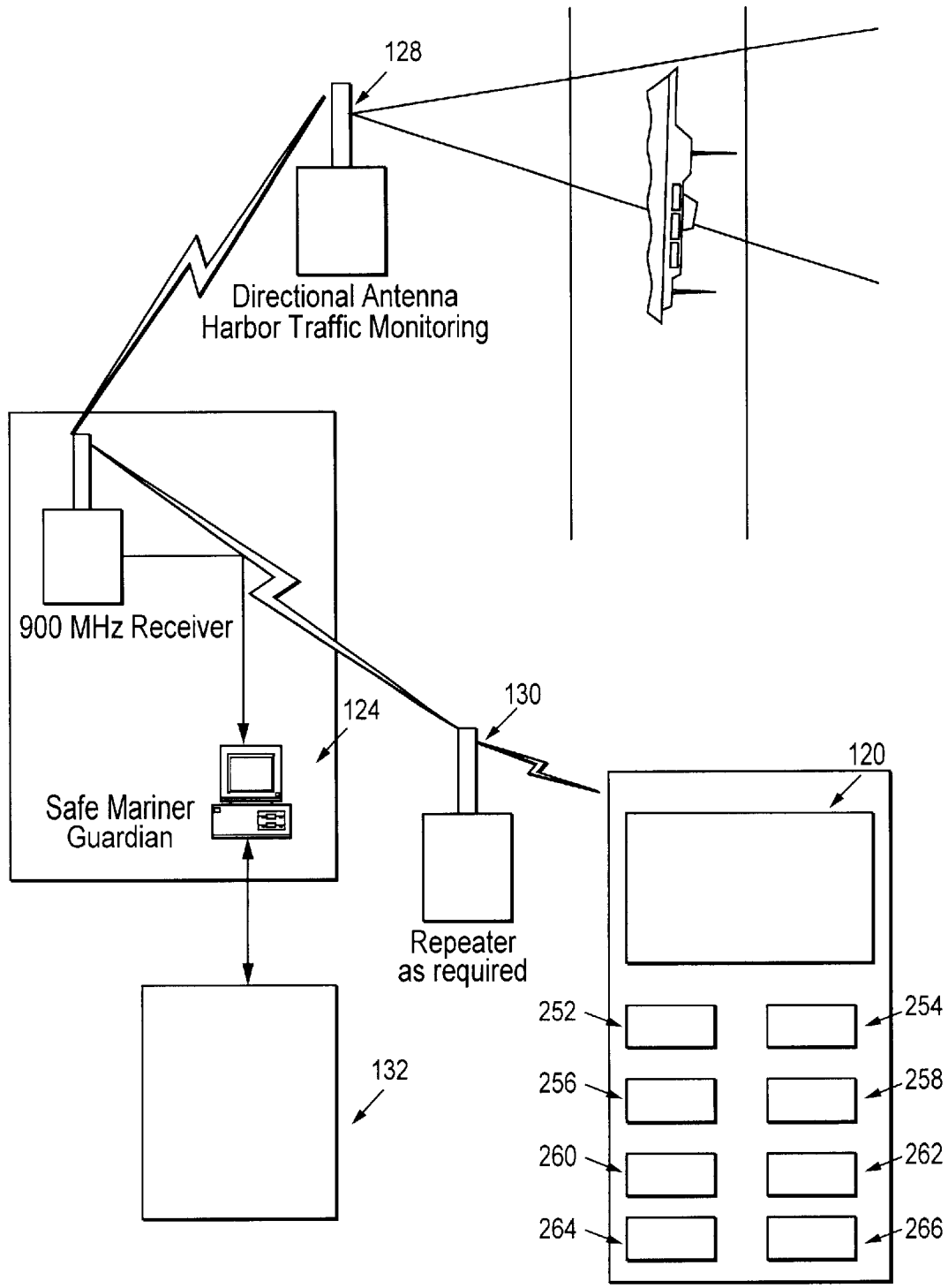
FIG. 13b is a block diagram of the command console in FIG. 13a in a harbor master configuration.

In an alternate embodiment, the command console is the context of a boat configuration whereby, similar to the command console described above, a plurality of sensors send data to the command console. Referring to FIG. 13a, there is shown a block diagram of the inputs to the command console in a boat configuration 120. In particular, an electricity sensor 252 (as shown in FIG. 13b), water level sensor 254, carbon monoxide sensor 256, burglar alarm sensor 258, lifeboat sensor 260, fume detector 262 and a directional and speed sensor 264. The electricity sensor 252, water level sensor 254, carbon monoxide sensor 256, burglar alarm sensor 258 are similar to those described previously. The lifeboat sensor 260 in one embodiment is a pressure sensor that detects the removal of the lifeboat. In order to guard against the theft of the lifeboat, the pressure sensor is configured so that upon removal of the lifeboat, the sensor is tripped, sending an alarm condition to the command console. The pressure sensor in the preferred embodiment is a microswitch, or in an alternate embodiment, the pressure sensor may include magnetic contacts or any other type of switch configuration. The pressure sensor may be connected between the lifeboat and the boat so that when the lifeboat is removed from the boat, pressure is removed from the sensor and the sensor is activated. The fume detector 262 detects gas or diesel leak by detecting ambient fumes. The directional and speed sensor 264 senses the direction of the boat and the speed of the boat. In addition, similar to the carbon monoxide system as described above, the water sensor 252, carbon monoxide sensor 256, and fume sensor 262 each determine trends in the sensor readings as described above. For example, with the fume sensor 262, the command console receives periodic readings regarding the level of gas or diesel vapors and extrapolates the recent readings to determine whether there is an upward, downward or stable trend. Similar to the command console in FIGS. 1 and 2, the command console receives the data from the sensor, checks whether the data is within acceptable limits (e.g., Carbon monoxide is below acceptable levels, fume is below acceptable levels, water sensor does not register water, etc.). In addition, as described above, the command console 120 determines trends based on the sensor input. Under ordinary circumstances, the command console periodically reports the status of the sensors to the harbor master, as discussed with respect to FIG. 13b. In the event that there is an alarm condition (i.e., the sensor readings are outside of acceptable limits or sensor readings indicate an unfavorable trend), the command console signals the harbor master of the alarm condition and/or the customer service center.

Referring to FIG. 13b, there is shown a harbor master configuration for the command console in a boat environment. Each of the boats is configured with a command console 120 and plurality of sensors. The command console 120 in either of the boats periodically transmits a signal to the harbor master 122. The harbor master 122 includes a general purpose computer 124 or other processor-based device. The general purpose computer, similar to the control device of FIG. 2a, includes a processor and a memory device with a look-up table. The harbor master 122 further includes an RF receiver 126 or other means for communication between the command console 120 and the harbor master 122. The harbor master configuration transmits at 900 MHz, as opposed to 433 MHz in the command console embodiment in a home, using directional antennas 128. The boats also transmit at 900 MHz using omnidirectional antennas 266. The directional antennas 128 track the speed and direction of the boats and transmit this information to the harbor master 122 for storage in the look-up table of the general purpose computer 124. In this manner, the harbor master 122 may compile data to track boat traffic both in and out of the harbor. Alternatively, the speed and direction information for individual boats may be transmitted directly from the command console 120 to the harbor master 122 since, in one embodiment, the command console 120 includes a directional and speed sensor 264.

This configuration also includes a repeater 130, as required, in order for the signal from the command console 120 to transmit to the RF receiver 126 the information from the sensors. The general purpose computer 124 records the sensor information sent from the command console 120 in a look-up table and similar to the customer service center 12 of FIG. 1, notifies emergency services (such as police or fire departments), customer designated contacts or the consumer in the event of an alarm condition. In the event that the harbor master 122 is unavailable to process the incoming signals from command consoles 120, a call center 132 may service the incoming messages from the command consoles 120.

In another embodiment, the command console is integrated into a prescription reminder system. The prescription reminder system may be used in homes or institutional medical facilities (assisted living or nursing homes) to provide patients with a manner to remind them to take pharmaceutical drugs at prescribed times. In particular, the prescription reminder system should provide a reminder mechanism via a flashing light, audio and/or screen display to patients in order for them to take their medications as needed for their general health and well-being.

Figure 14A:
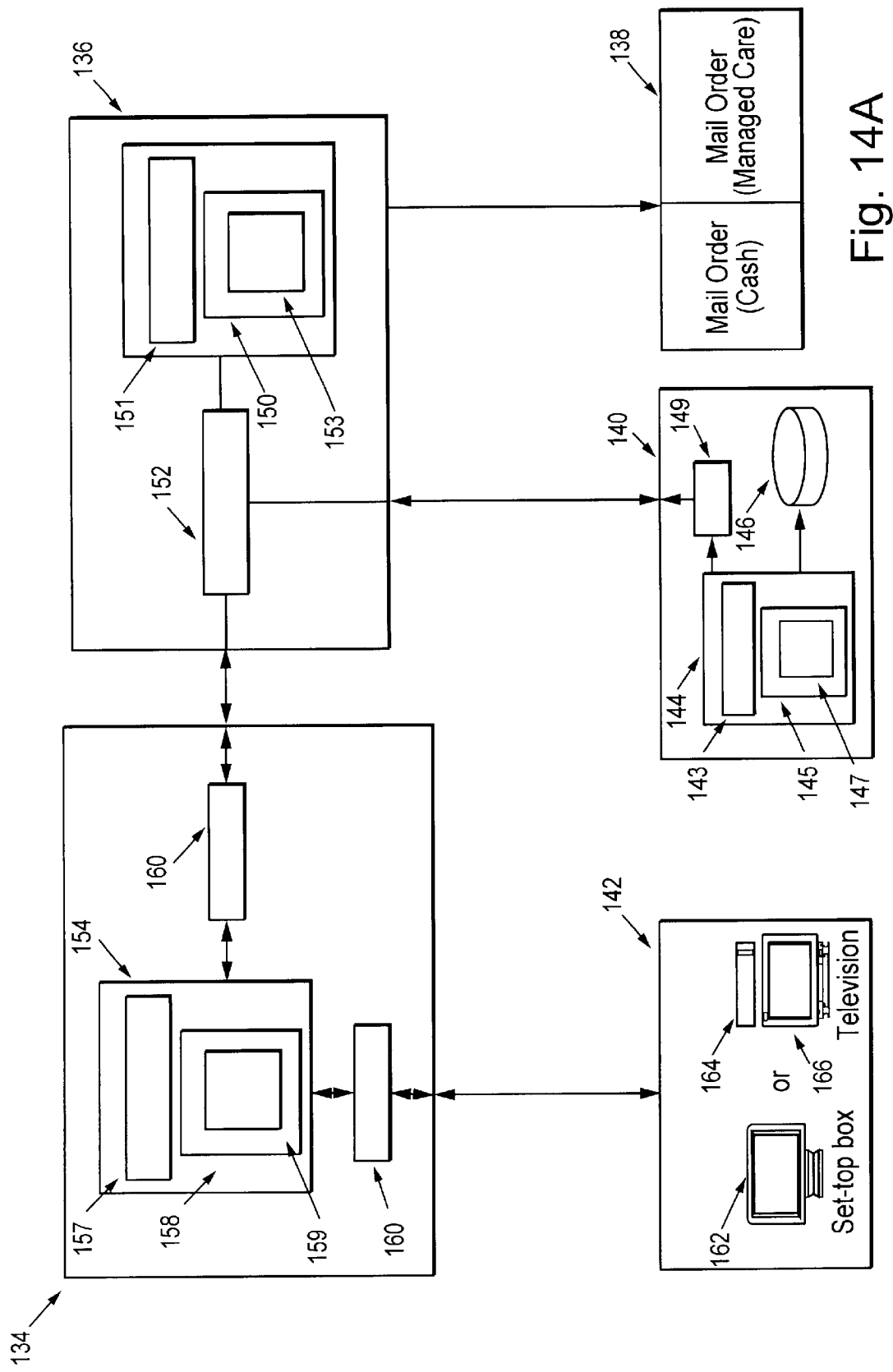
FIG. 14a is a block diagram of a prescription reminder system architecture.

Referring to FIG. 14a, there is shown a block diagram of a prescription reminder system architecture including a customer service center 134 (which is similar to the customer service center 12 of FIG. 1), a prescription data device 136, a pharmacy branch 140, a mail order facility 138, and a patient home 142. Typically, a patient orders his or her prescriptions from a pharmacy branch 140 which includes a computer 144, having a processor 143 and a memory device 145, to transmit the patient's order to the prescription data device 136. The patient's prescription data (which includes the type of prescription, the frequency of use, instructions for taking the prescription (i.e., SIG or the actual prescription order), the physician prescribing the prescription, and insurance information) is stored in the memory device 145 in a look-up table 147 for the particular patient. In addition, the pharmacy branch 140 gives a pill vial 146 to the patient in barcoded form. The barcode stores information necessary to identify the prescription. The pharmacy branch communicates with the prescription data device 136 via modems 149, 152. The prescription data device 136 includes a general purpose computer 148, having a processor and a memory device 150. The memory device 150 includes a look-up table 153 which compiles data from the look-up table 147 of memory device 145 in the pharmacy branches 140 (which contain the patient's prescription data) and stores the information in a look-up table in a memory device 150. After communication with the pharmacy branch 140, the look-up table 153 in the prescription data device contains all relevant prescription information for the patient, such as the type of prescription, the frequency of use, instructions for taking the prescription, the physician prescribing the prescription, and insurance information. The look-up table may also contain other additional information such as drug interactions, descriptions of drugs (in the form of text describing the color/shape of the pills or in the form of pictures of the pills). In addition, the prescription data device 136 may communicate with one or multiple pharmacy branches.

As shown in FIG. 14a, the customer service center 134 at least one computer having a processor 157 and a memory device 158. In one embodiment, the computer 154 communicates with the prescription data device 136 and patient home 142 (or a plurality of patient homes 142) via modems 160. In an alternative embodiment, the computer 154 may communicate with the prescription data device 136 via a network (such as a local area network or a wide area network) or the computer 154 may share a common memory with the prescription data device 136.

The computer 154 communicates with the prescription data device 136 to obtain patient data regarding a patient's prescription data from the look-up table 153 in memory 150. After communication with the prescription data device, memory device 158 contains patient data regarding prescriptions (such as the type of prescription, the frequency of use, instructions for taking the prescription, the physician prescribing the prescription, insurance information, drug interactions, descriptions of drugs) which are obtained from memory 150. In addition, the memory device 158 may also contain information regarding other patient data such as the modem address of the particular patient, the configuration of the home monitoring system (e.g., values for limits of temperature sensor smoke alarm, carbon monoxide sensor, etc.), emergency services (e.g., numbers for police and fire departments) and patient designated contacts (such as closest relative or friend to contact in case of emergency). Therefore, memory 158 may include patient data corresponding to both prescription data and home monitoring data.

The computer 154 may communicate with patient home 142 by a variety of methods. In one embodiment, the computer 154 communicates with patient home 142 via modems 160. The patient home 142 as described above may be a residence or an institutional medical facility (assisted living or nursing homes). In addition, the patient home 142 may be in a variety of formats, two of which include a set-top box 162, as described subsequently in FIG. 14b, or a cable set-top box 164 in combination with a television 166, as described subsequently in FIG. 14c. In either configuration, the patient home 142 receives information from computer 154 of patient data regarding prescriptions and patient data regarding configuration of the home monitoring system.

Figure 14B:
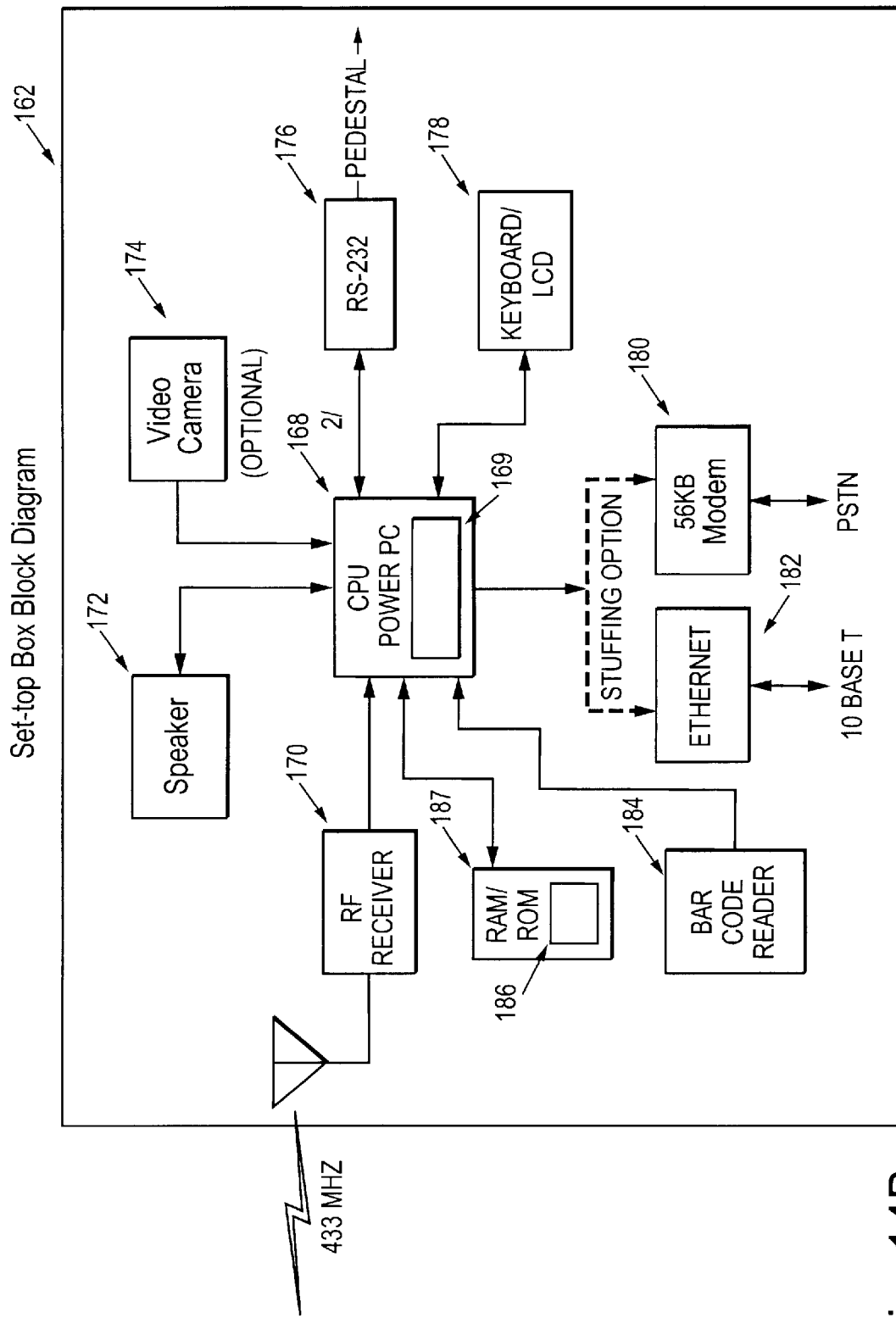

Referring to FIG. 14b, there is shown a block diagram of a set-top box configuration. Similar to the command console in FIG. 1, a plurality of sensors (e.g., smoke alarm, burglar alarm, carbon monoxide, temperature sensor, water sensor, electricity sensor) communicate with the set-top box 162 via an RF receiver 170. In addition, the set-top box 162 includes a processor 168 with a clock 169. The processor communicates with a speaker 172, a video camera 174, external communication (via an Ethernet 182, a modem 180 and an RS-232 connection 176), input/output 178 (via a keyboard/LCD), memory 186 (in the form of ROM and RAM) and a barcode reader 184. Patient data may be downloaded through the telephone network via modem 180 or though ethernet 182 and stored in memory 186. In particular, memory 186 in the patient home 142 includes a look-up table 187 regarding the types of drugs the patient is taking, the schedules when the drugs should be taken and information regarding the drugs (e.g., compressed picture files of the drugs so that the patient may identify, by sight, the proper drug to take information regarding how to take the drug (e.g., with food or on an empty stomach)). The information regarding patient data is obtained from look-up table 159.

Moreover, the set-top box accepts bar-code data from the bar-code reader 184 so that barcoded drug vials 146 may be scanned in. The bar-code data may be entered either when the drug vial 146 is first brought to the patient's home or when the patient takes the medication, as described subsequently. The bar-code data is compared with the look-up table 187 in memory 186 (which was received from memory 158 from the customer service center 134). In this manner, there is a check between the drug vial 146 that is at the patient's home and the prescription in the customer service center 134 to ensure that there are no mistakes in the medication the patient is taking.

The set-top box 162 further includes a speaker 172 and an input/output 178 (such as a keyboard, LCD and LEDs). The set-top box, in one embodiment, is used for individuals who are not technically adept and in some cases have lost some percentage of their cognitive abilities and reasoning skills. In practice, the processor 168 reads the memory 168 and determines, based on the schedule for taking medication downloaded from the customer service center 134, when the patient should take medication. When the scheduled time for taking medication arrives, as determined by monitoring the clock 169, the set-top box notifies the user with a flashing light, audio and/or screen display using the input/output 178. In the instance of using a display such as an LCD or video monitor, the display will display a picture of the medication (in order for the patient to identify the pill by color, size etc.) and any pertinent information (e.g., how many pills to take, take with milk, take before meals, etc.) As previously discussed, this pertinent information was downloaded to memory 186 from the customer service center 134. Optionally, the patient may wave the bar-coded drug vial 146 by the bar-code reader 184 in order to confirm that the pill the patient is taking is the correct pill at the scheduled time. If it is not the correct pill, the input/output 178 will notify the user via a flashing light, audio and/or screen display.

The set-top box, in one embodiment, may include a video camera 174. The video camera 174 would allow the customer service center to monitor patients when requested either by the patient, family or health professionals. One may then determine if the patient is taking medications as prescribed or if the patient is in good health. The video camera 174 may utilize a pinhole aperture to mitigate the need for a focusing lens. Either a black & white or a color camera may be used. Still pictures or running video/audio may be transmitted from the video camera 174 to the processor 168 for transmission to the customer service center 134. In addition, in the event that a panic button is depressed, the video camera 174 will be activated. Moreover, the video camera may be activated when the patient swipes a drug vial 146 by the bar-code reader 184.

In an alternate embodiment, a pager accessory may be used. The pager accessory docks in the set-top box and synchronizes the times when a patient is away from the set-top box. Each time the set-top box receives new information regarding a new prescription or revised drug schedule, the pager accessory is updated by the set-top box. This includes when there is an update in the prescription information from the customer service center 134 or when the patient used the set-top box to take medications. In the event that the patient travels away from the set-top box with the pager accessory, the pager accessory will remind the patient when to take his or her medication. The pager accessory displays the type of pill and necessary instructions for its use. A conventional pager may be used or a personal digital assistant such as a PalmPilot® by Palm Computing, Inc.

Figure 14C:
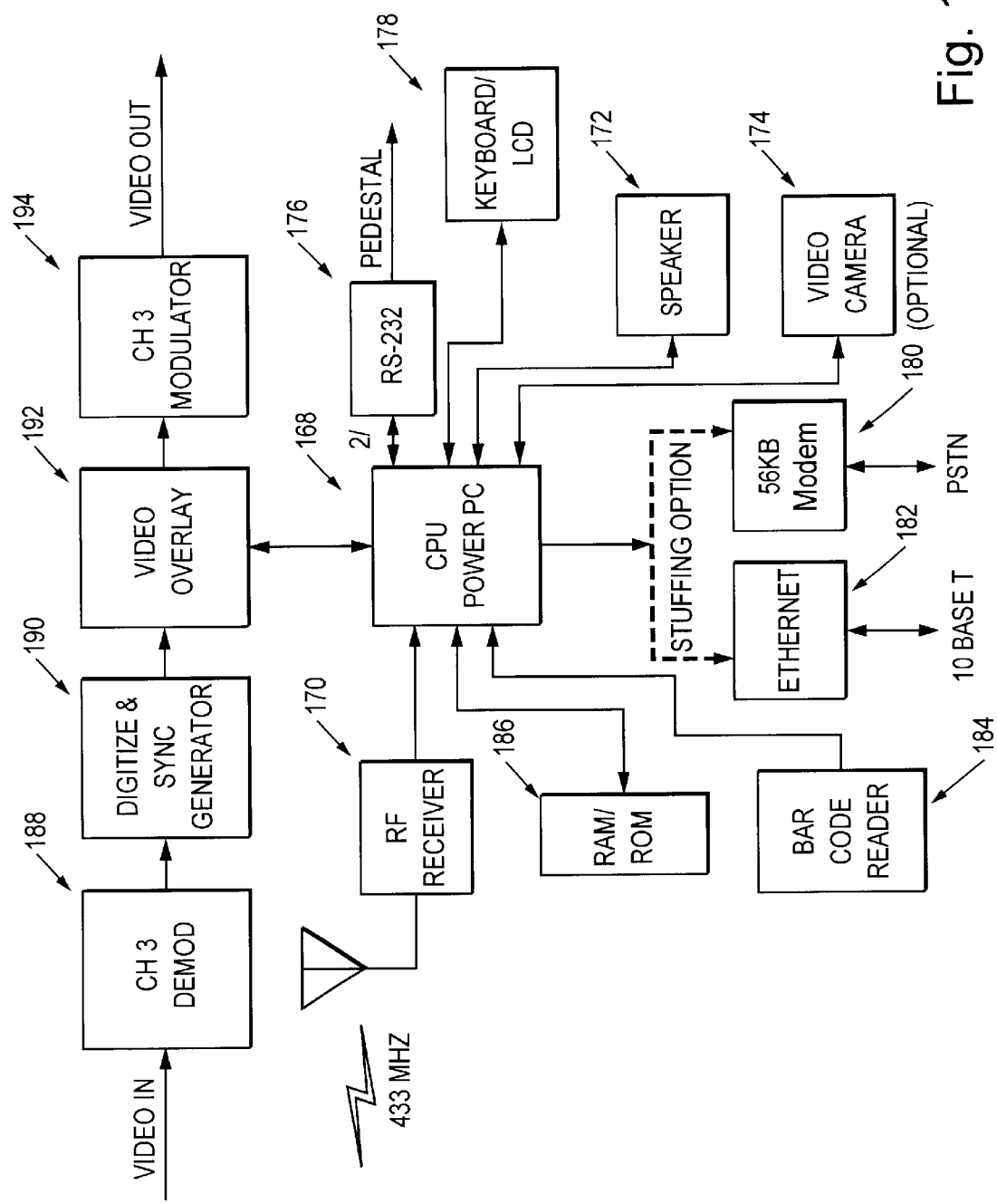

Referring to FIG. 14c, there is shown a block diagram of a cable set-top box configuration. The operation of the cable set-top box is similar to the set-top box 142 in FIG. 14b with the additional graphics included through video overlay for the television. The video in signal is a typical cable television signal and is input to the television CH 3 Demod, as shown at block 188. The CH 3 Demod 188 demodulates the signal in the video in signal for Channel 3. Thereafter, the signal is sent to a Digitize & Sync Generator, as shown at block 190. The portion of the demodulated signal is digitized for easier manipulation of the television signal and the sync is generated for formatting with the television. The signal is thereafter sent to a video overlay, as shown at block 192. The processor 168 generates the portion of the video for the overlay, which may include a text message stating that a certain pill must be taken now, instructions for how to take the pill, or a picture of pill in order for the patient to identify the pill. The signal is thereafter sent to a CH 3 Modulator, as shown at block 194. The signal at the output of block 194 is in a similar format as the video in signal, with the addition of the video overlay. In this manner, the message may be sent to the television with minimal interruption to the video signal.

From the foregoing detailed description, it will be appreciated that numerous changes and modifications can be made to the aspects of the invention without departure from the true spirit and scope of the invention. For example, those skilled in the art of electrical design may design alternative circuits to those disclosed in the detailed description. This true spirit and scope of the invention is defined by the appended claims, to be interpreted in light of the foregoing specification.

I claim:

1. Patient monitoring system comprising in combination:

service center device including a service center processor and a service center memory device connected to the service center processor, the service center memory device including a patient data look-up table containing patient data regarding types of prescriptions taken by the patient and times for taking the prescriptions by the patient;

prescription data device including a prescription data processor, means for communicating with the service center device and a prescription data memory device, the prescription data memory device electrically connected to the prescriptions data processor and including a prescription data look-up table:

pharmacy branch device including a pharmacy branch processor, means for communicating with the prescription data device, and a pharmacy branch memory device, the pharmacy branch memory device electrically connected to the pharmacy branch processor and including a pharmacy branch look-up table:

wherein the pharmacy branch look-up table contains patient data regarding prescriptions and wherein the prescription data look-up table obtains the patient data regarding prescriptions from the pharmacy branch look-up table: and at least one patient home device including a patient home processor having a clock, a patient home memory device connected to the patient home processor, means for notifying a patient, and means for communicating with the service center device in order to transfer patient data, wherein the patient home memory device includes a patient home look-up table containing patient data regarding types of prescriptions taken by the patient and times for taking of the prescriptions, the patient data being obtained from the patient data look-up table via the means for communicating with the service center device and wherein the processor notifies the patient via the means for notifying a patient based on the patient data in the patient home look-up table and based on the clock.

2. A patient monitoring system as claimed in claim 1 wherein the patient home look-up table contains scheduled times in which to take the prescription and wherein the patient home processor reads the scheduled times from the patient home look-up table and activates the means for notifying based on the output of the clock.

3. A patient monitoring system as claimed in claim 1 wherein the patient home look-up table further contains directions for taking the prescription and wherein the means for notifying outputs the directions for taking the prescription.

4. A patient monitoring system as claimed in claim 1 wherein the means for communicating with the service center device includes a modem.

5. A patient monitoring system as claimed in claim 1 wherein the means for notifying a patient includes an aural alarm.

6. A patient monitoring system as claimed in claim 1 wherein the at least one patient home device further includes a means for identifying a prescription.

7. A patient monitoring system as claimed in claim 6 wherein the means for identifying a prescription includes displaying a picture of medication to be taken.

8. A patient monitoring system as claimed in claim 6 wherein the means for identifying a prescription includes reading a bar code on a drug vial.

9. Patient monitoring system comprising in combination:

service center device including a service center processor and a service center memory device connected to the service center processor, the service center memory device including a patient data look-up table containing patient data regarding types of prescriptions taken by the patient and times for taking the prescriptions by the patient: and at least one patient home device including a patient home processor having a clock, a patient home memory device connected to the patient home processor, means for notifying a patient, and means for communicating with the service center device in order to transfer patient data, wherein the patient home memory device includes a patient home look-up table containing patient data regarding types of prescriptions taken by the patient and times for taking of the prescriptions, the patient data being obtained from the patient data look-up table via the means for communicating with the service center device, wherein the processor notifies the patient via the means for notifying a patient based on the patient data in the patient home look-up table and based on the clock, and wherein the means for notifying a patient includes a television.

10. A patient monitoring system as claimed in claim 9 Wherein the television is receiving a television signal and wherein the means for notifying a patient further includes a textual message for overlay on the television signal.

11. A patient monitoring system as claimed in claim 9 wherein the means for notifying a patient further includes a picture of a pill in order for the patient to identify the type of prescription to take.

12. In a system having a service center and at least one patient home, a method of monitoring a patients taking of prescriptions comprising the steps of:

compiling a look-up table at the service center that contains prescription data schedules for taking the prescription;

sending the prescription data to the patient home;

compiling a look-up table at the patient home that contains prescription data including schedules for taking the prescription;

determining when to notify the patient to take the prescription based on the schedules in the look-up table at the patient home; and notifying the patient when the patient is scheduled to take the prescription by producing a textual message and a picture of medication on a screen.

13. A method of monitoring a patient's taking of prescriptions as claimed in claim 12 wherein the step of notifying the patient includes activating an aural alarm.

14. A patient monitoring system, comprising in combination:

a pharmacy branch device including a first computing platform, wherein the first computing platform can access a first database containing prescription data regarding types of prescriptions taken by a patient and times for taking prescriptions;

a prescription data device including a second computing platform, wherein the second computing platform can access a second database containing prescription data obtained from the first database;

a service center device including a third computing platform, wherein the third computing platform can access a third database containing prescription data obtained from the second database; and a patient home device including a fourth computing platform having a clock and a means for notifying a patient, wherein the fourth computing platform can access a fourth database containing prescription data obtained from the third database, wherein the patient home device notifies the patient based on the prescription data in the fourth database and the clock.

15. A patient monitoring system as claimed in claim 14 Wherein the means for notifying a patient includes producing a textual message and a picture of medication on a screen.

16. A patient monitoring system as claimed in claim 14 wherein the means for notifying a patient includes an aural alarm.

17. A patient monitoring system as claimed in claim 14 wherein the patient home device further includes a means for identifying a prescription.

18. A patient monitoring system as claimed in claim 17 wherein the means for identifying a prescription includes displaying a picture of medication to be taken.

19. A patient monitoring system as claimed in claim 17 wherein the means for identifying a prescription includes reading a bar code on drug vial.

* * * * *